July 7, 1953 T. M. BUTLER 2,644,637
ACCOUNTING MACHINE
Original Filed April 7, 1949 24 Sheets-Sheet 1

INVENTOR.
THOMAS M. BUTLER
BY
ATTORNEYS

July 7, 1953 T. M. BUTLER 2,644,637
ACCOUNTING MACHINE
Original Filed April 7, 1949 24 Sheets-Sheet 2

INVENTOR.
THOMAS M. BUTLER
BY Fidler, Crane
& Beardsley
ATTORNEYS

July 7, 1953 T. M. BUTLER 2,644,637
ACCOUNTING MACHINE
Original Filed April 7, 1949 24 Sheets-Sheet 3
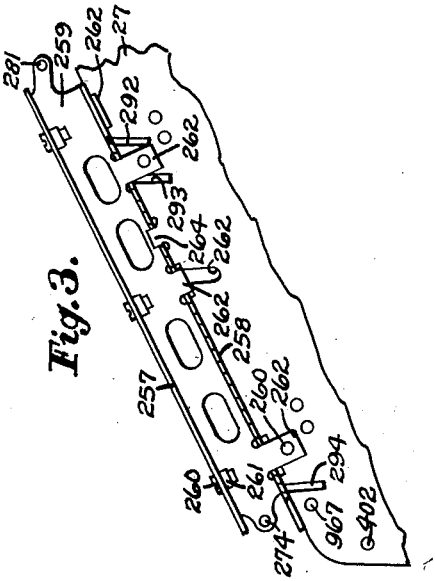
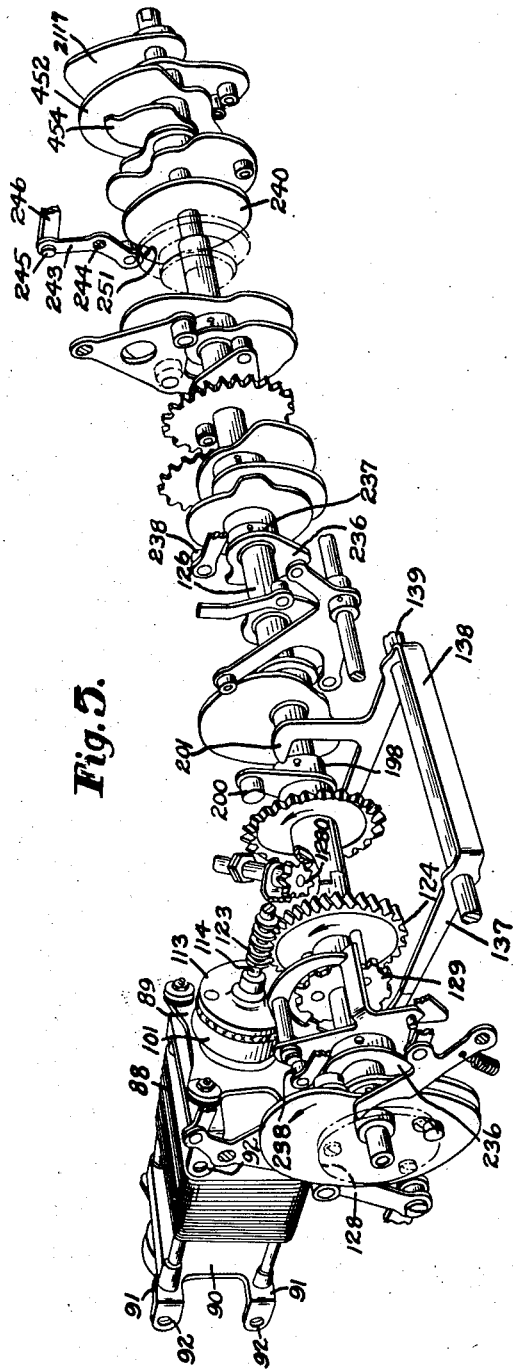
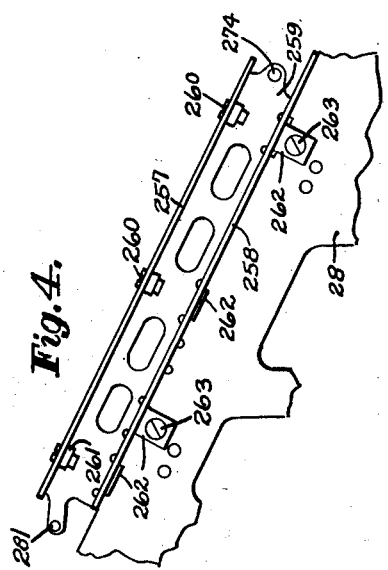
INVENTOR.
THOMAS M. BUTLER
BY Fidler, Crousse
& Beardsley
ATTORNEYS

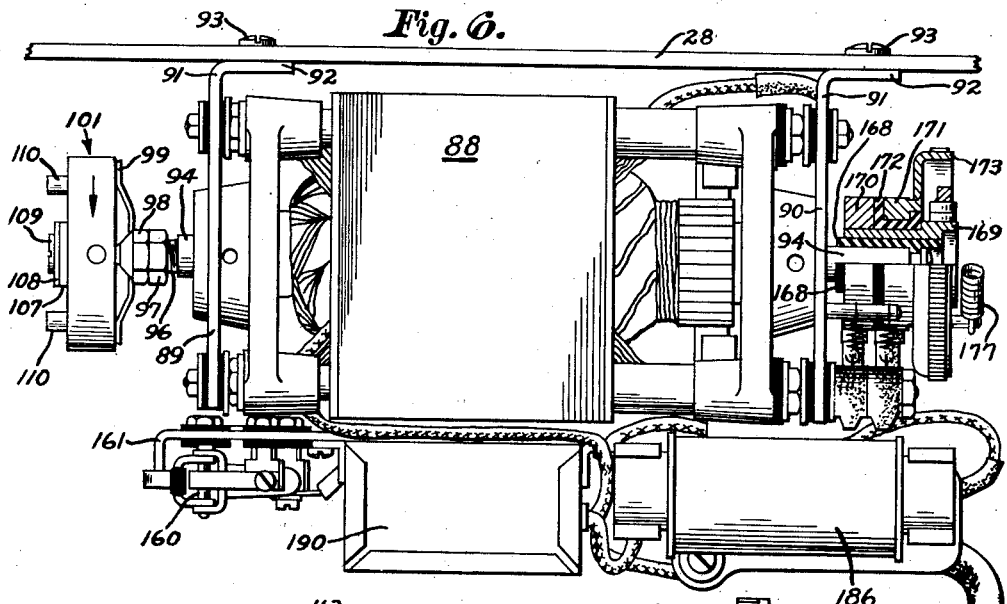
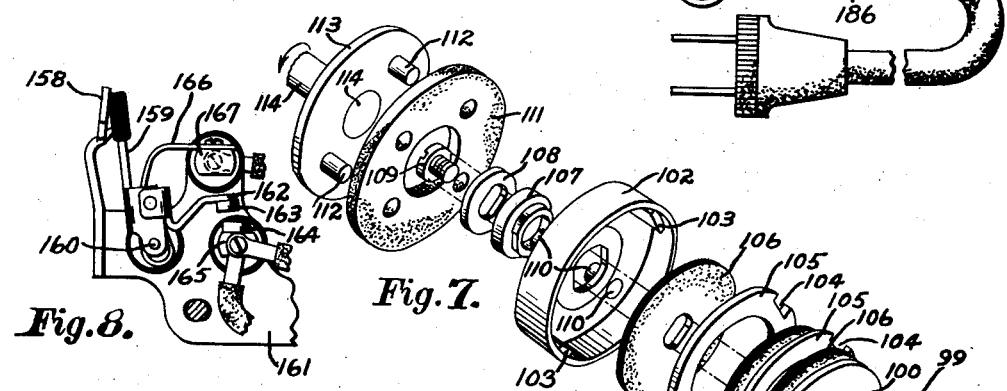
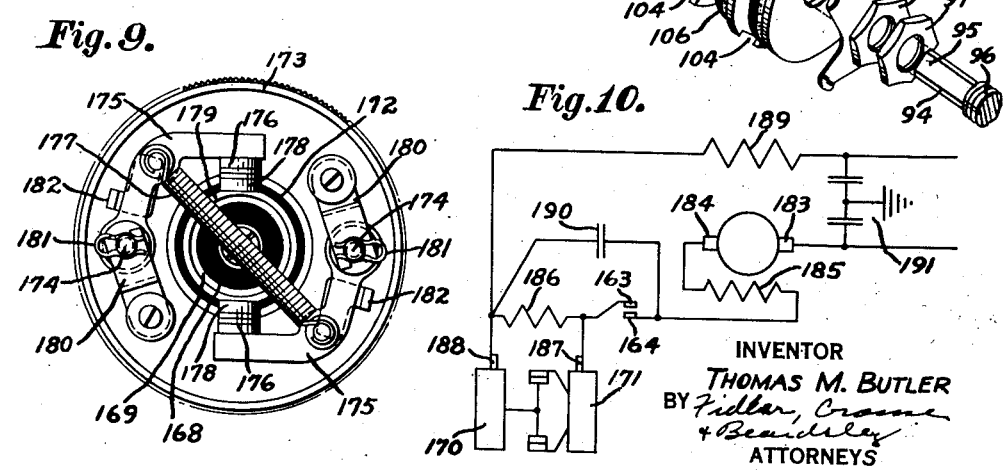

July 7, 1953  T. M. BUTLER  2,644,637
ACCOUNTING MACHINE
Original Filed April 7, 1949  24 Sheets-Sheet 5
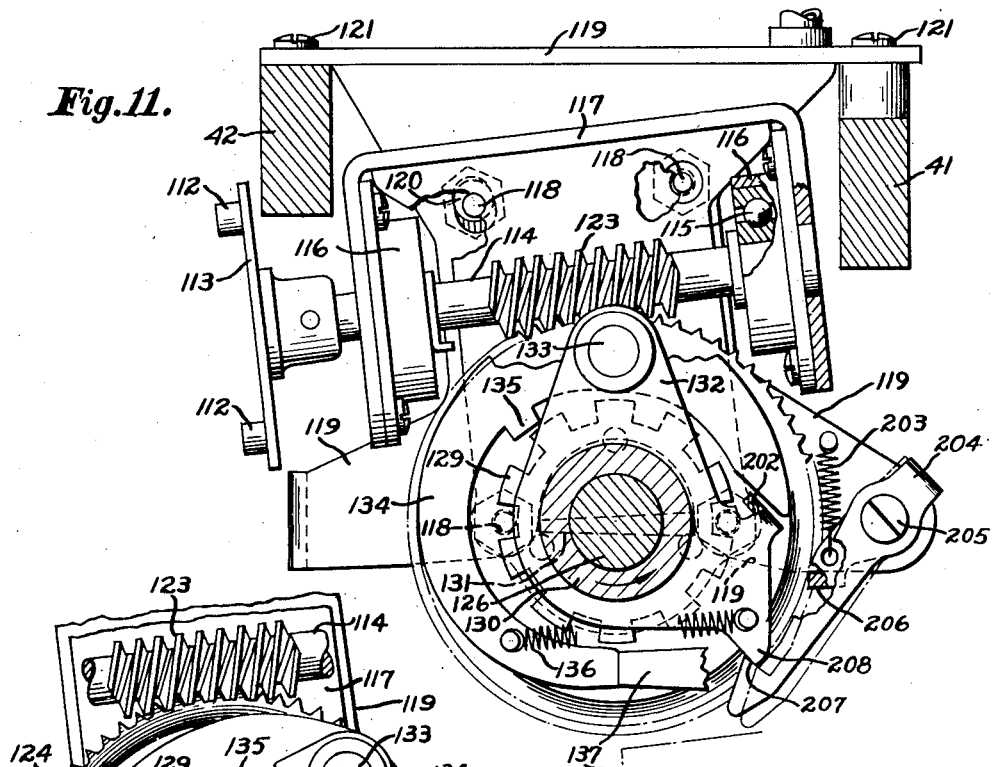
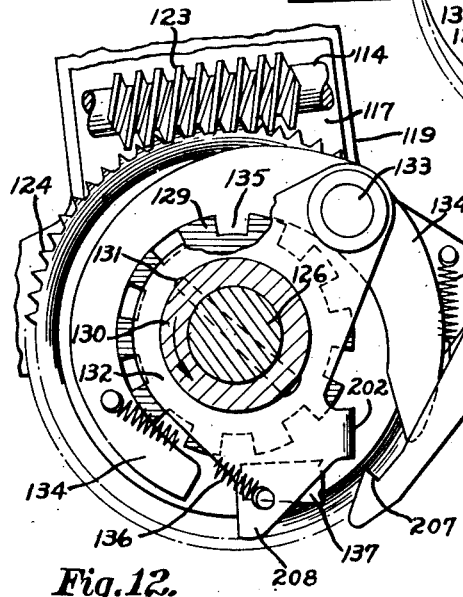
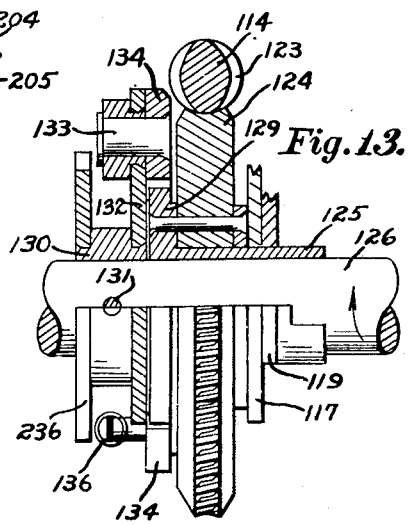
INVENTOR
THOMAS M. BUTLER
BY Fidler, Crouse
 & Beardsley
ATTORNEYS July 7, 1953
T. M. BUTLER
2,644,637
ACCOUNTING MACHINE
Original Filed April 7, 1949
24 Sheets-Sheet 6
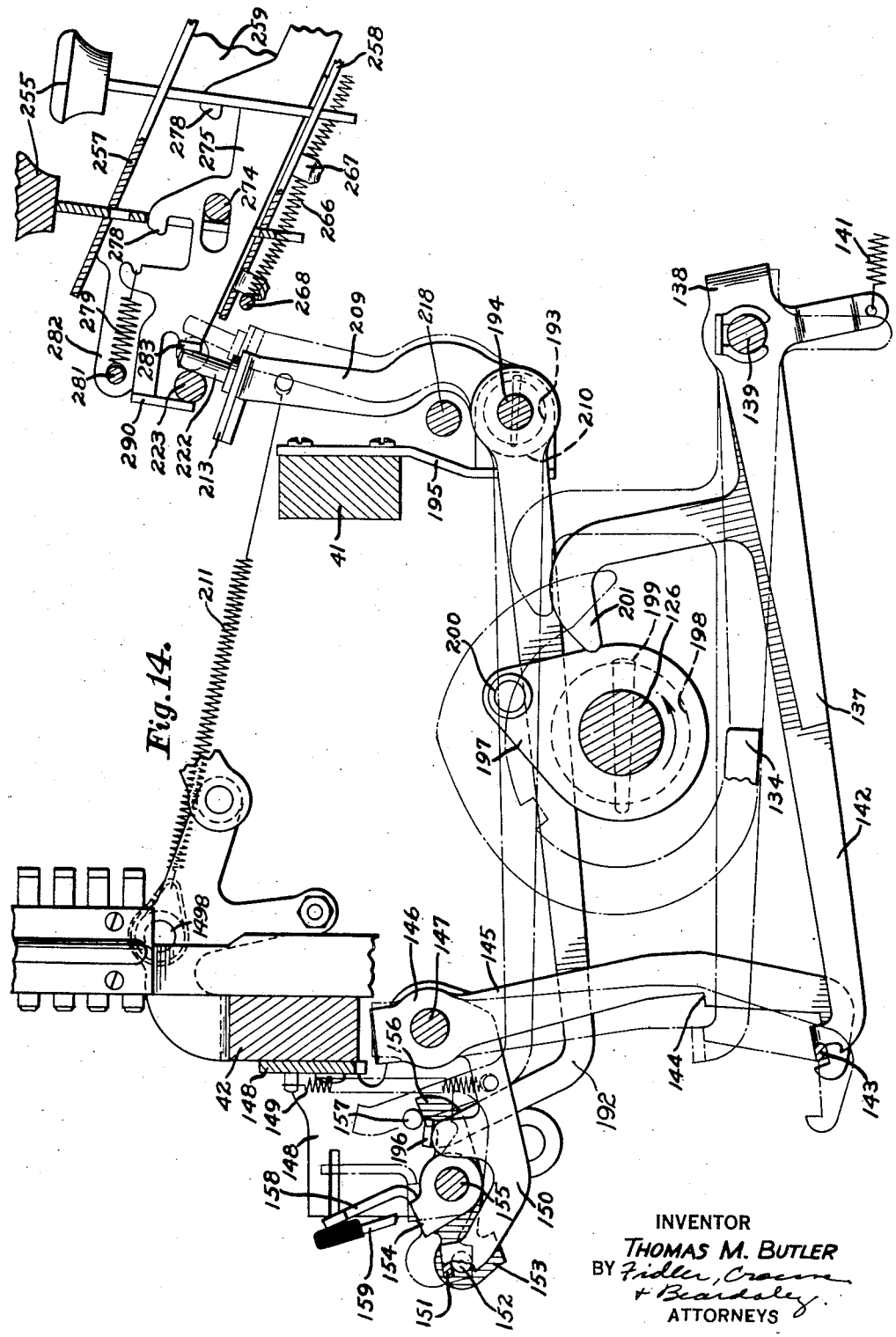
INVENTOR
THOMAS M. BUTLER
BY Fidler, Croese
+ Beardsley
ATTORNEYS July 7, 1953 T. M. BUTLER 2,644,637
ACCOUNTING MACHINE
Original Filed April 7, 1949 24 Sheets-Sheet 7
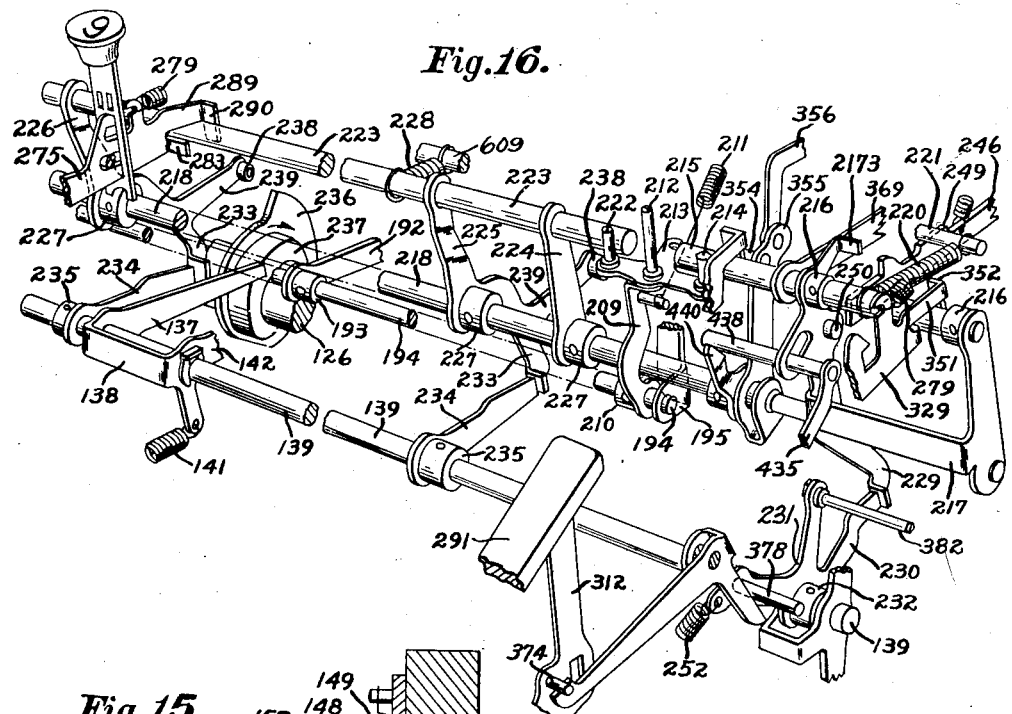
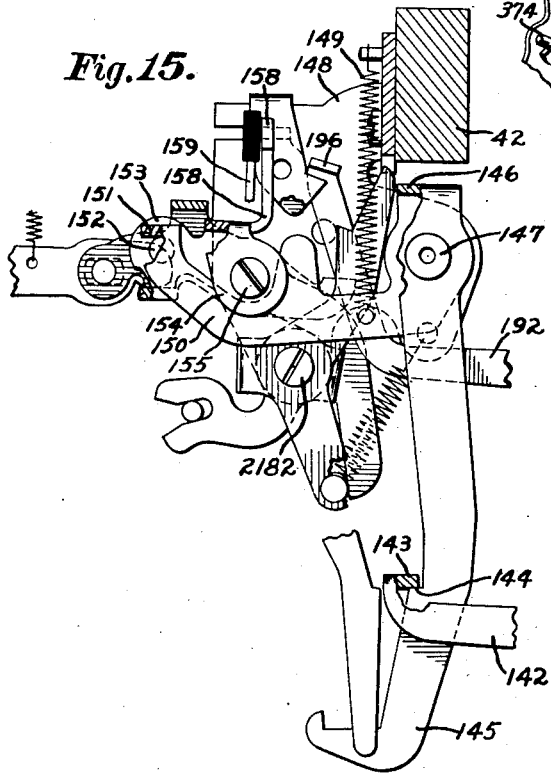
INVENTOR.
THOMAS M. BUTLER
BY
ATTORNEYS

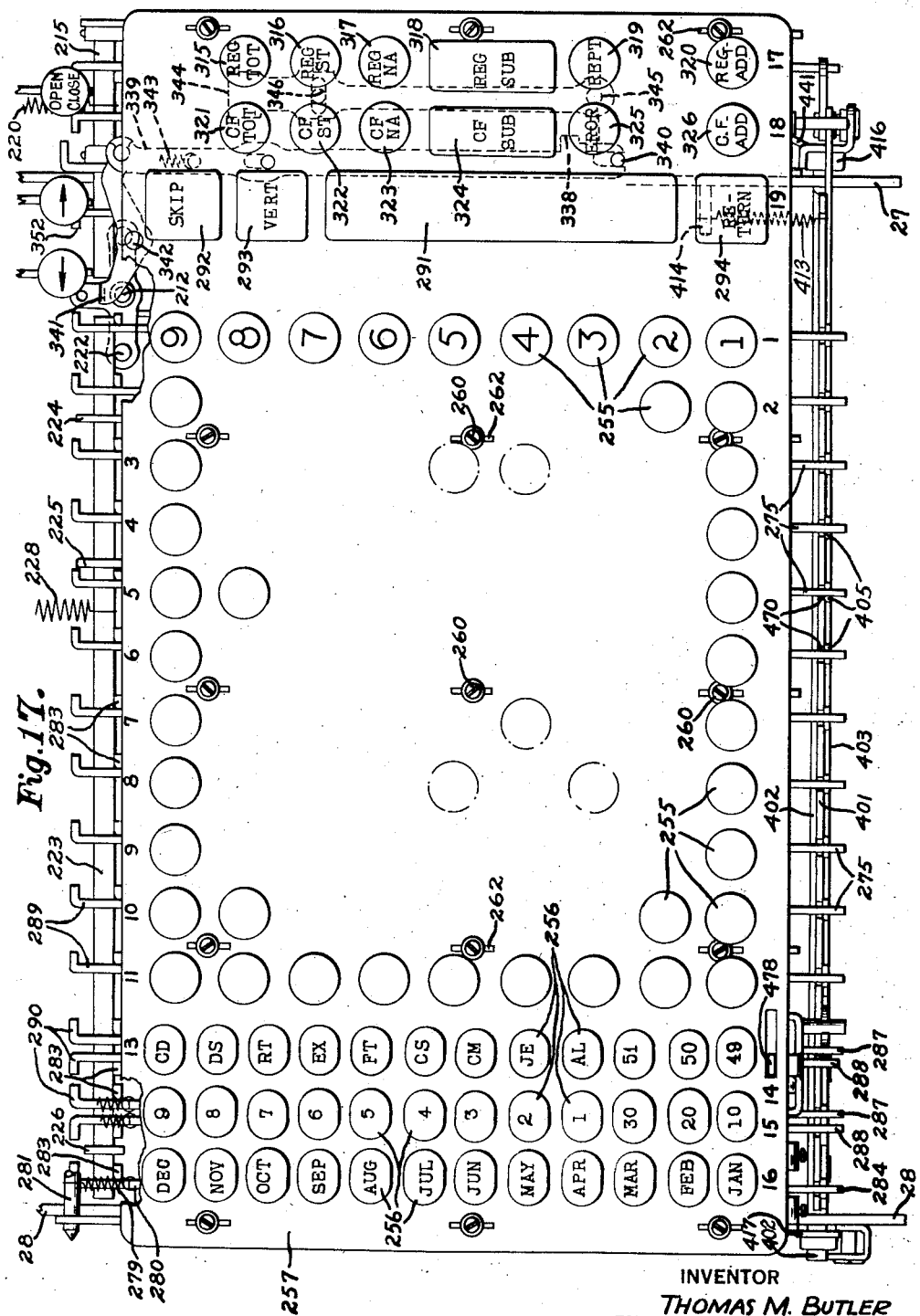

July 7, 1953  T. M. BUTLER  2,644,637
ACCOUNTING MACHINE
Original Filed April 7, 1949  24 Sheets-Sheet 9
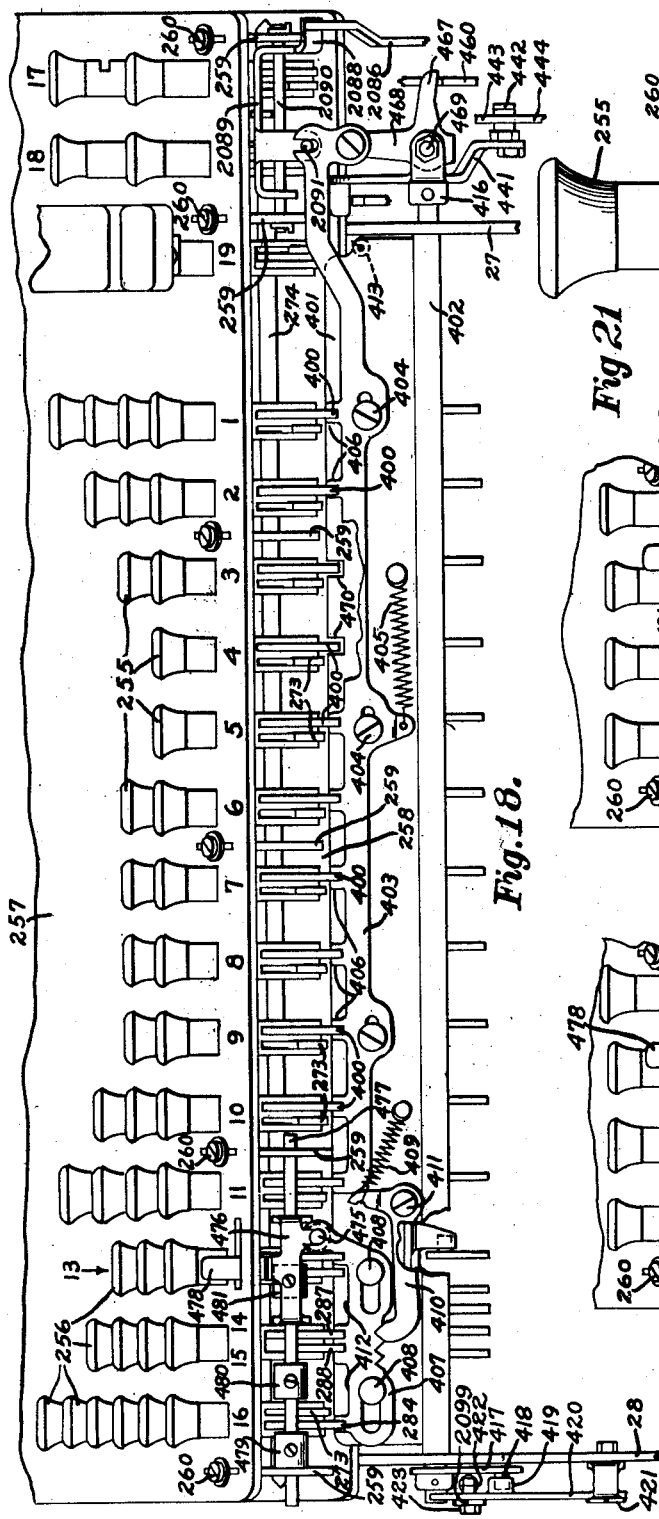
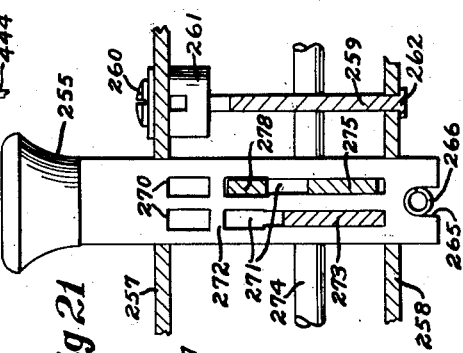
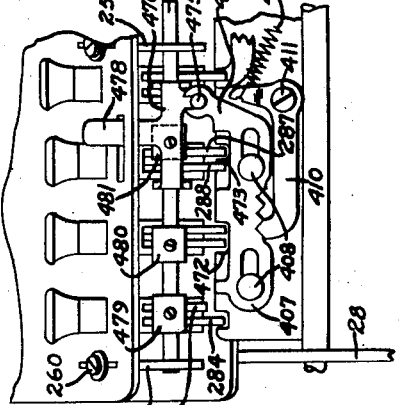
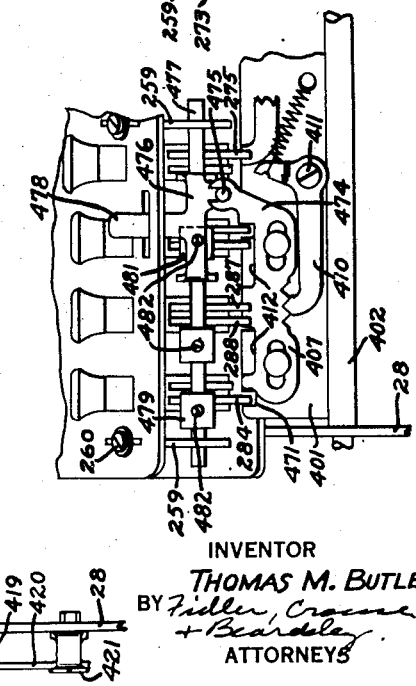
INVENTOR
THOMAS M. BUTLER
BY Fidler, Crosse
 + Beardsley
ATTORNEYS July 7, 1953  T. M. BUTLER  2,644,637
ACCOUNTING MACHINE
Original Filed April 7, 1949  24 Sheets-Sheet 10

INVENTOR
THOMAS M. BUTLER
BY
ATTORNEYS

July 7, 1953  T. M. BUTLER  2,644,637
ACCOUNTING MACHINE
Original Filed April 7, 1949  24 Sheets-Sheet 11

INVENTOR
THOMAS M. BUTLER
BY
ATTORNEYS

July 7, 1953 T. M. BUTLER 2,644,637
ACCOUNTING MACHINE
Original Filed April 7, 1949 24 Sheets-Sheet 12

INVENTOR.
THOMAS M. BUTLER
BY
ATTORNEYS

July 7, 1953      T. M. BUTLER      2,644,637
ACCOUNTING MACHINE
Original Filed April 7, 1949      24 Sheets-Sheet 13

INVENTOR.
THOMAS M. BUTLER
BY Fidler, Crowne
& Beardsley
ATTORNEYS

July 7, 1953  T. M. BUTLER  2,644,637
ACCOUNTING MACHINE
Original Filed April 7, 1949  24 Sheets-Sheet 14

INVENTOR
THOMAS M. BUTLER
BY Fidler, Crouse
& Beardsley
ATTORNEYS

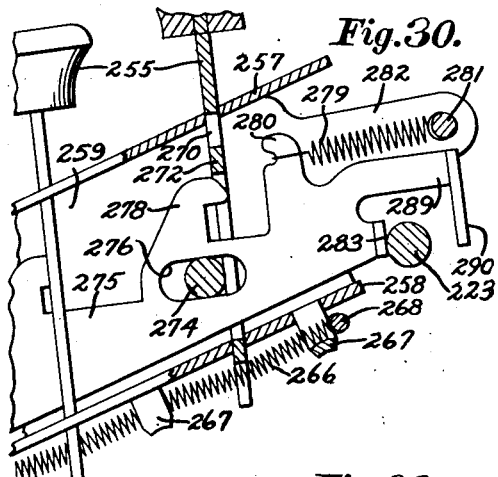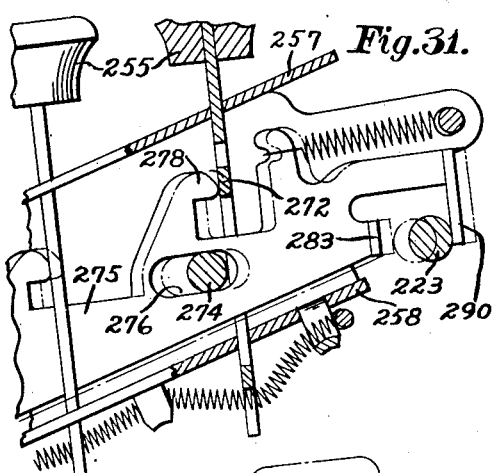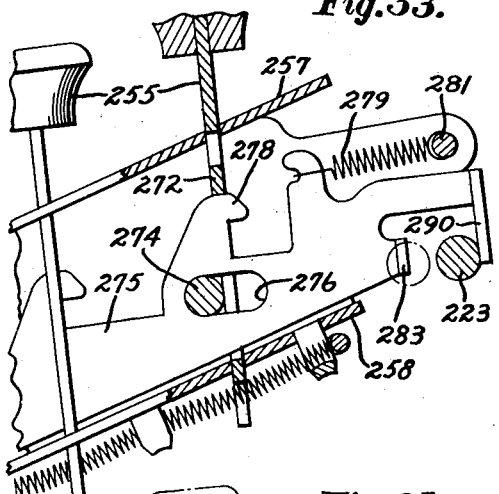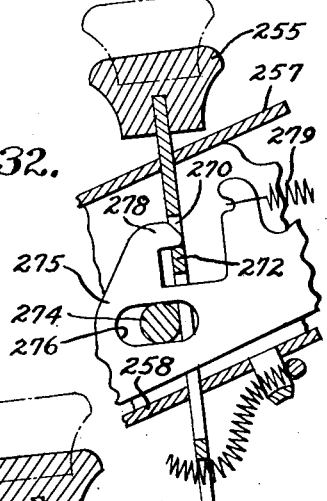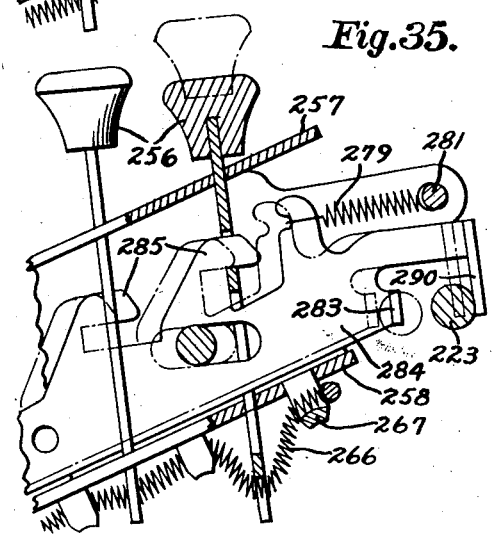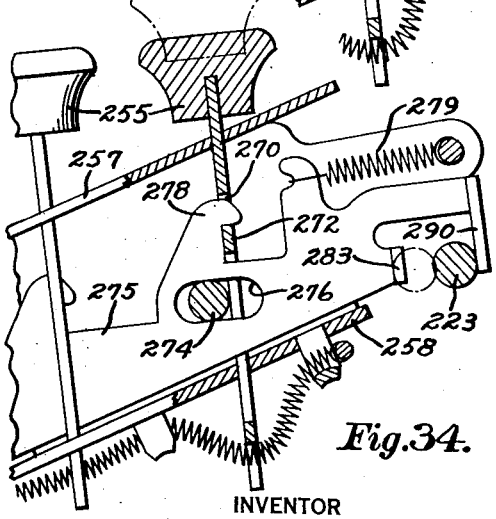
INVENTOR
THOMAS M. BUTLER
ATTORNEYS July 7, 1953 T. M. BUTLER 2,644,637
ACCOUNTING MACHINE
Original Filed April 7, 1949 24 Sheets-Sheet 16
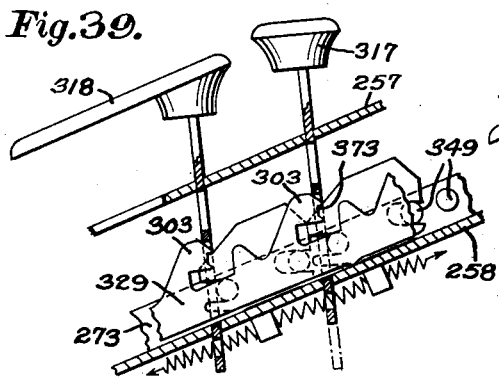
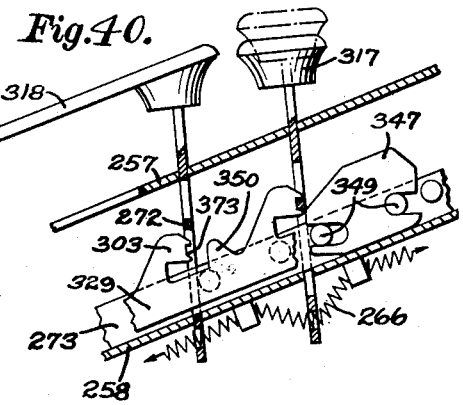
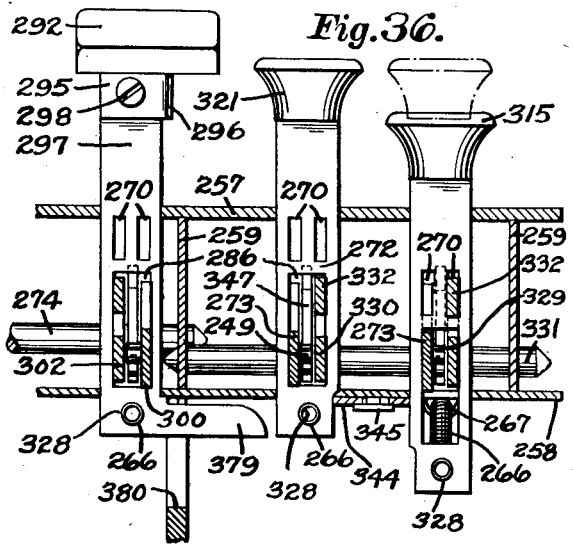
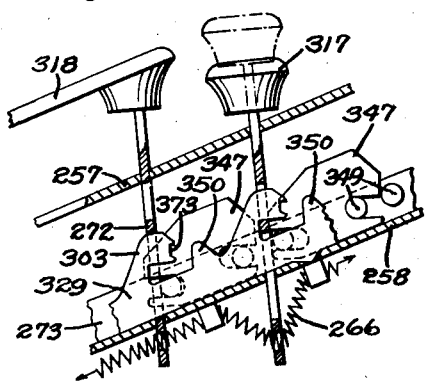
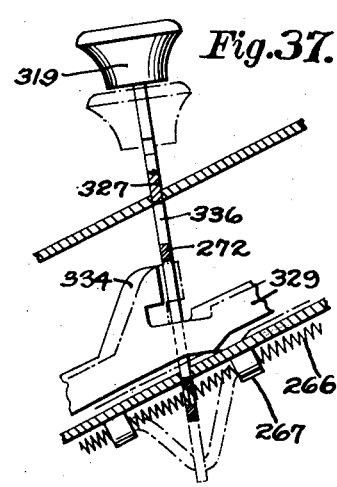
INVENTOR
THOMAS M. BUTLER July 7, 1953 T. M. BUTLER 2,644,637
ACCOUNTING MACHINE
Original Filed April 7, 1949 24 Sheets-Sheet 17
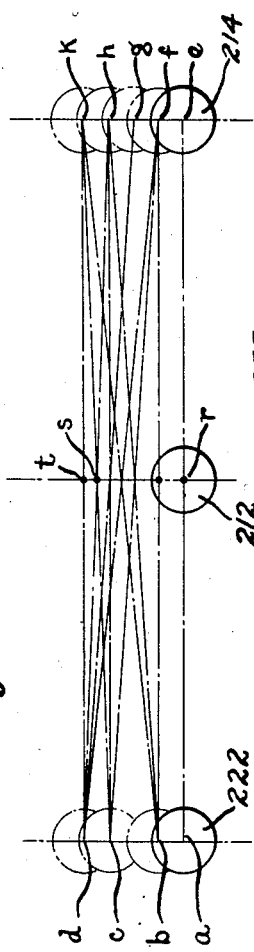
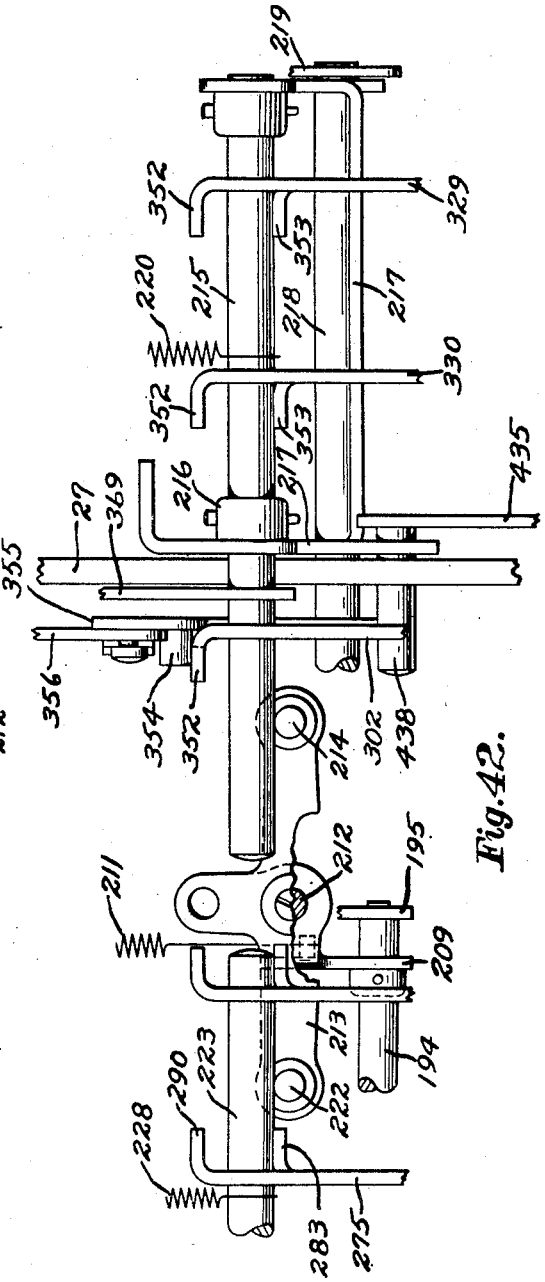
INVENTOR.
THOMAS M. BUTLER
BY Fidler, Crouse
& Beardsley
ATTORNEYS

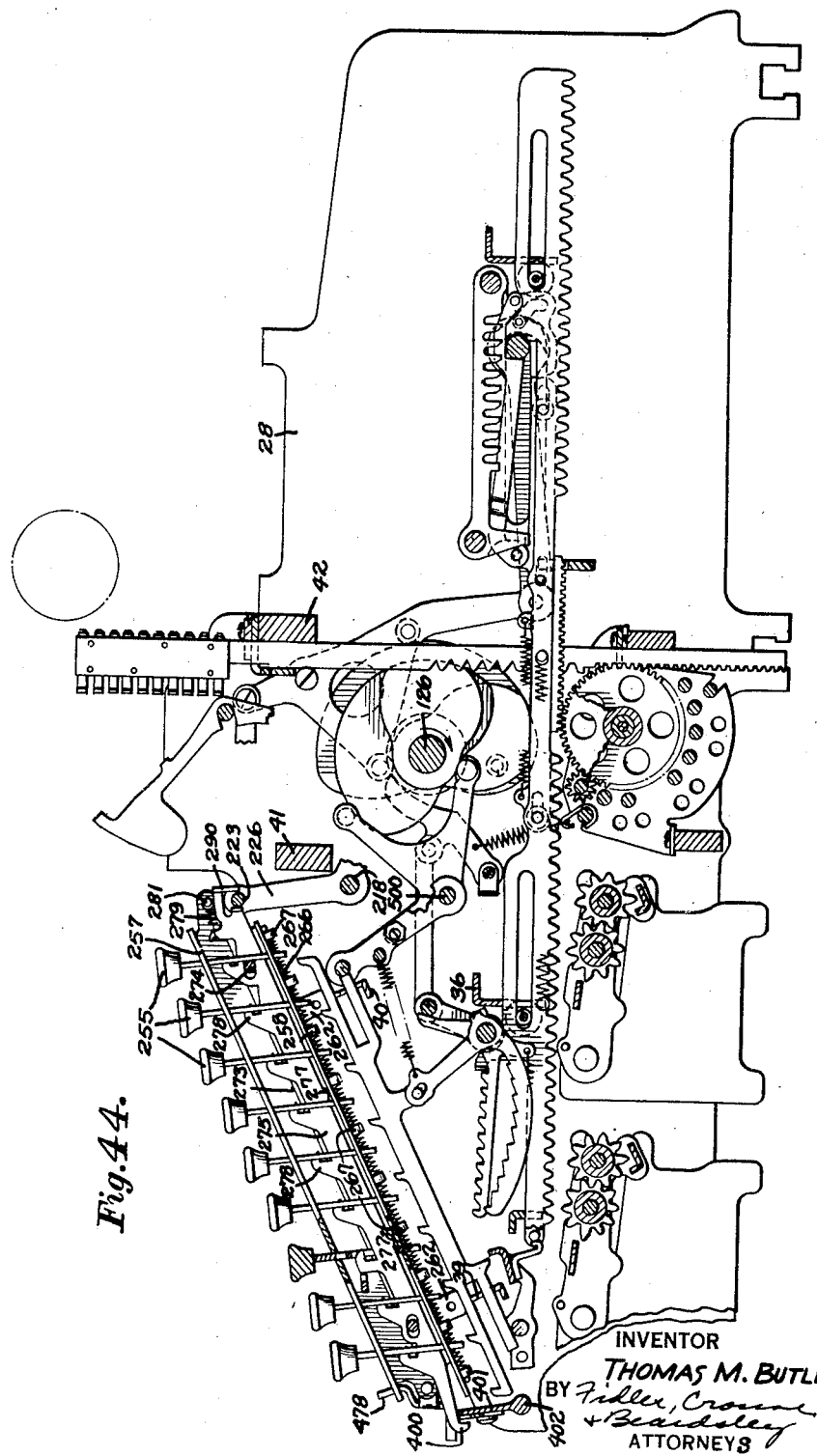

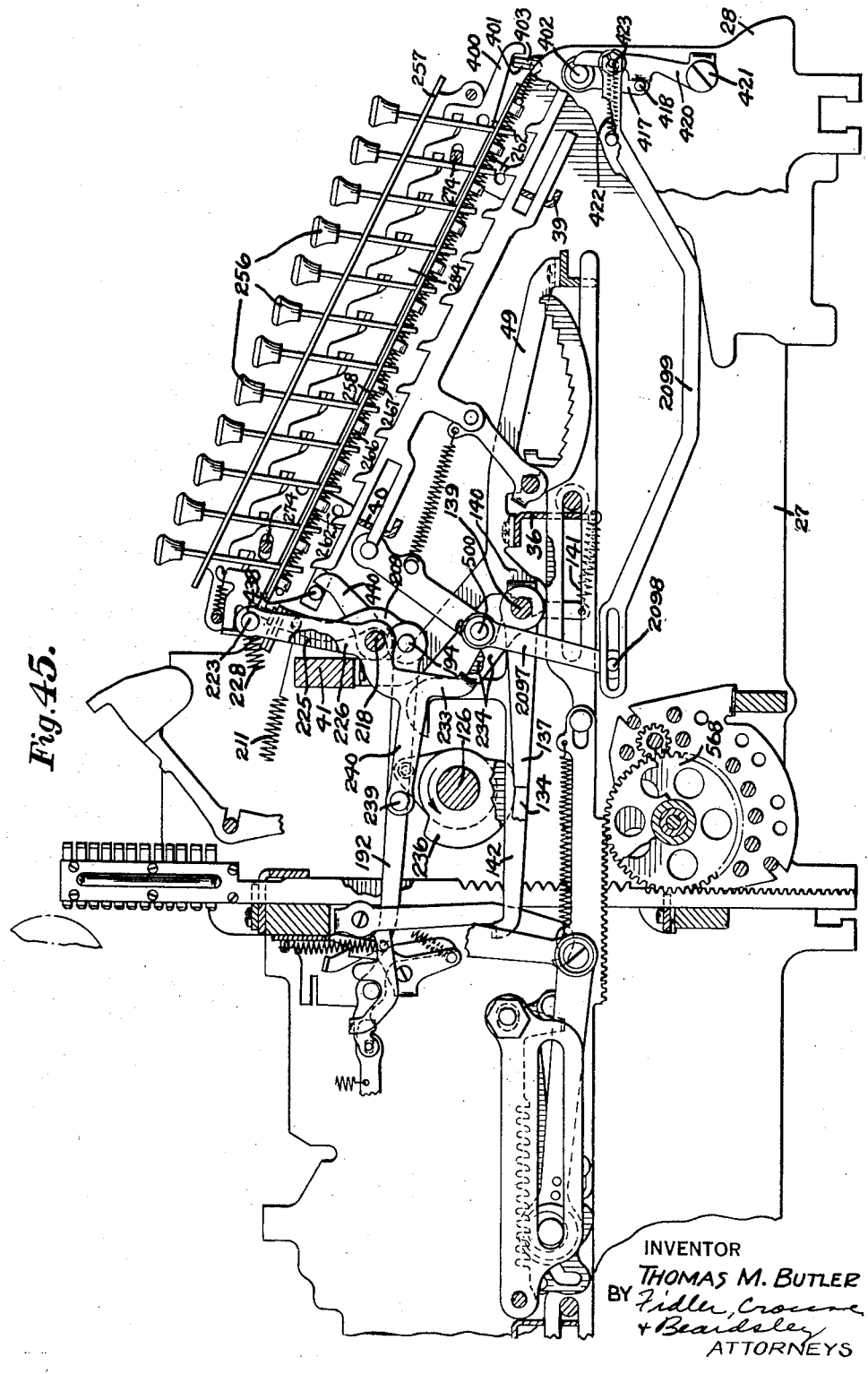

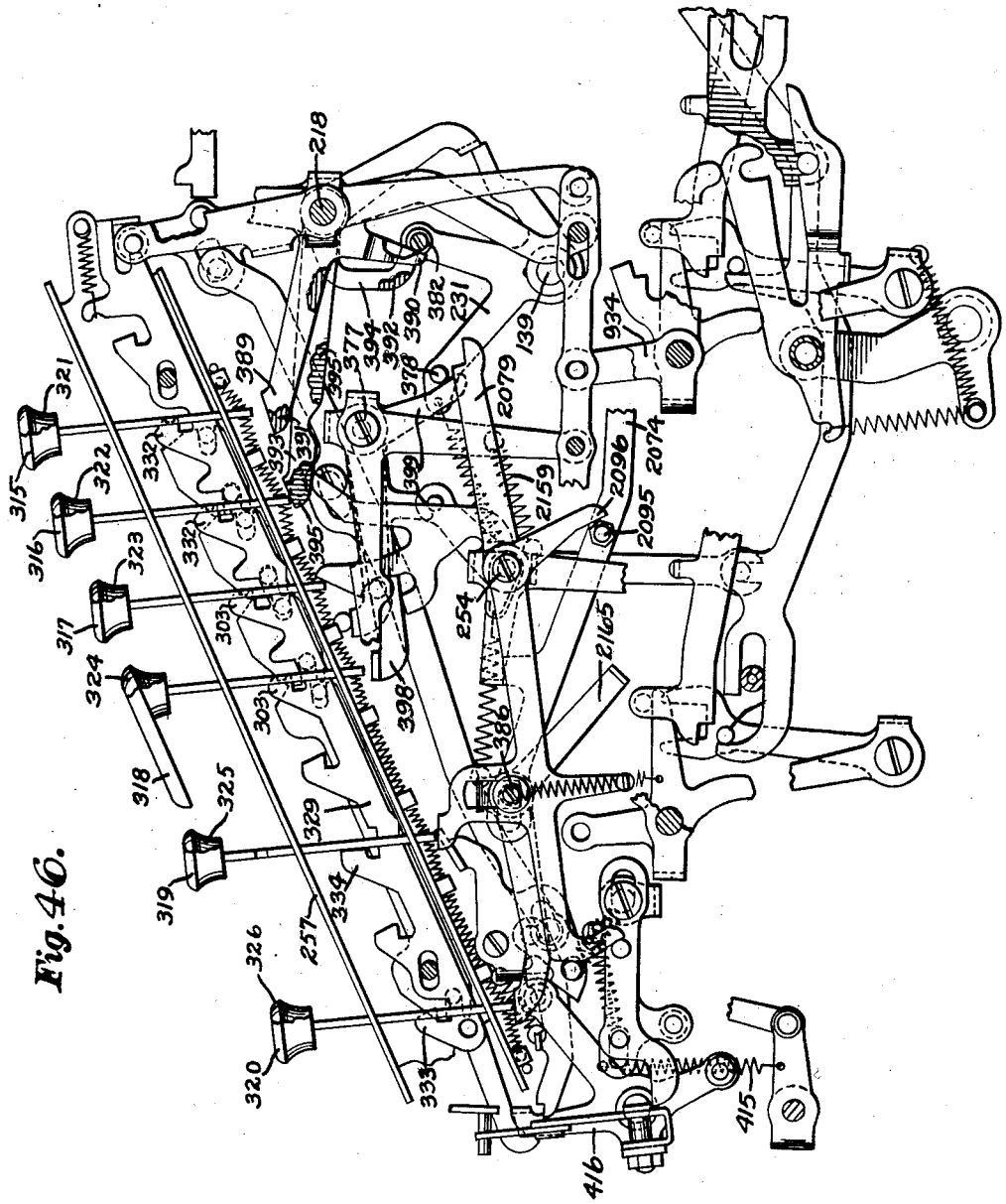

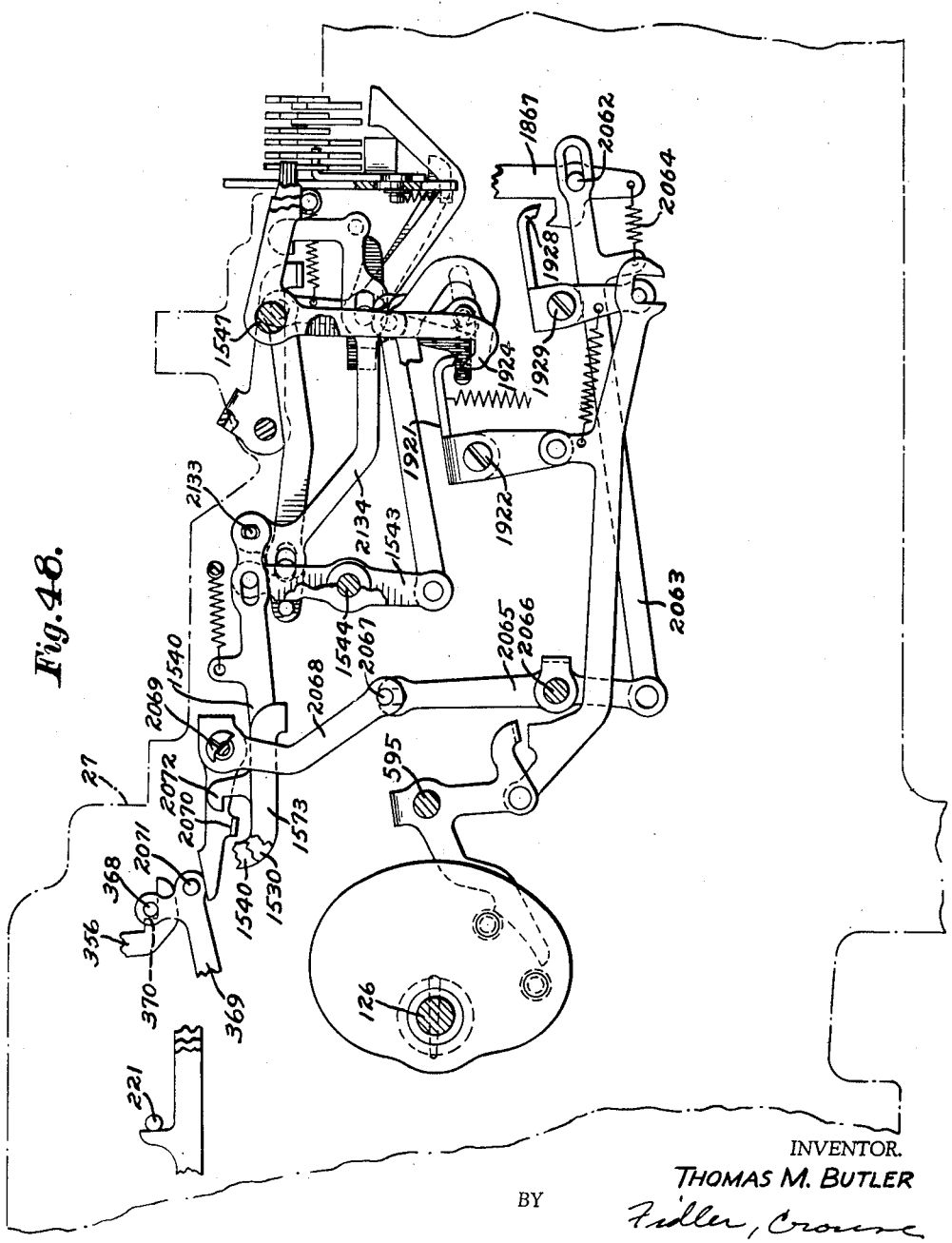

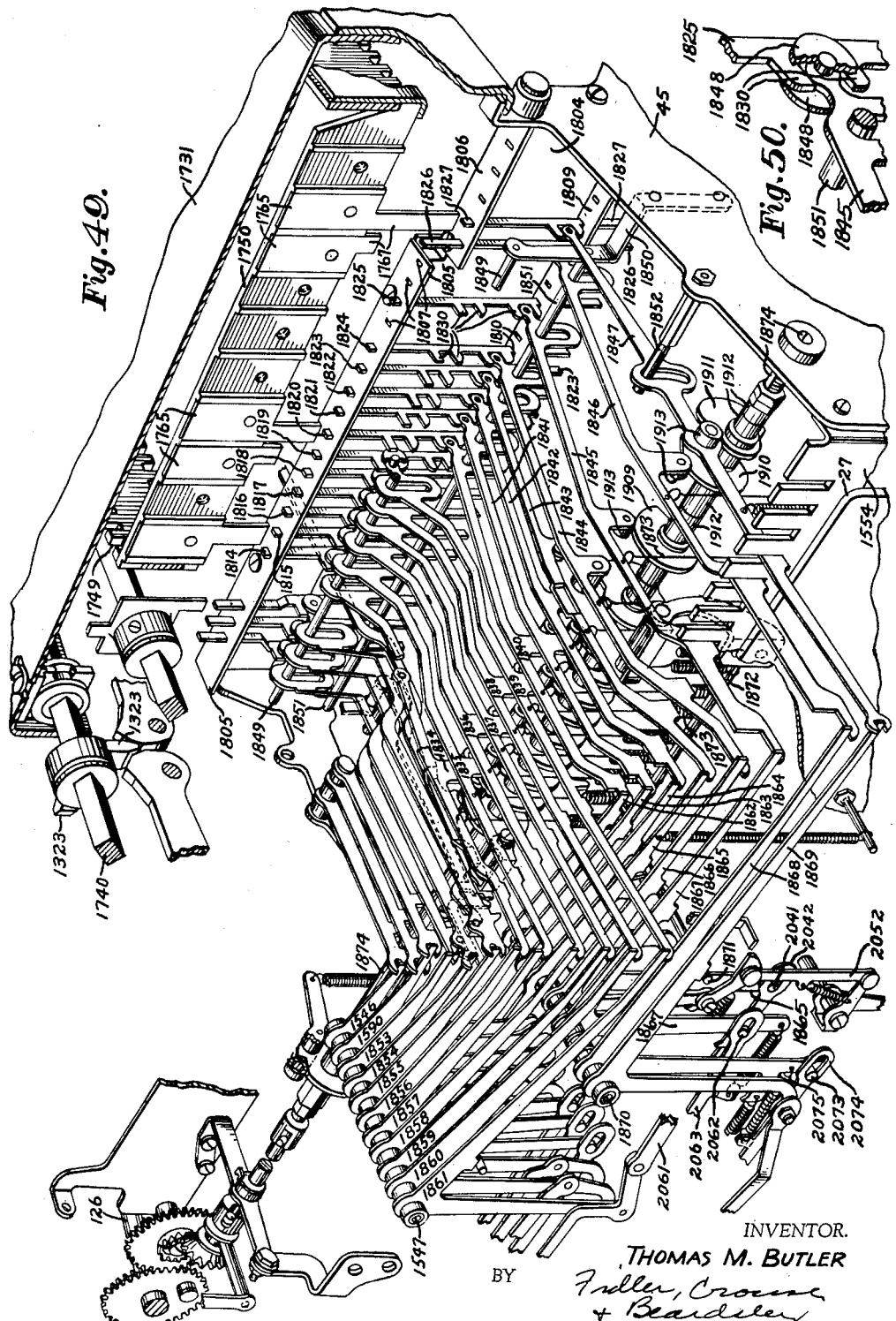

July 7, 1953 — T. M. BUTLER — 2,644,637
ACCOUNTING MACHINE
Original Filed April 7, 1949 — 24 Sheets-Sheet 24

INVENTOR.
THOMAS M. BUTLER
BY Fidler, Crouse & Beardsley
ATTORNEYS

Patented July 7, 1953

2,644,637

UNITED STATES PATENT OFFICE 2,644,637

ACCOUNTING MACHINE

Thomas M. Butler, Detroit, Mich., assignor to Burroughs Adding Machine Company, Detroit, Mich., a corporation of Michigan Original application April 7, 1949, Serial No. 85,971. Divided and this application November 21, 1950, Serial No. 196,844

11 Claims. (Cl. 235—60.49)

This invention relates to improvements in calculating machines, especially power driven calculating machines.

The present application is a division of my original application Serial No. 85,971, filed April 7, 1949, now abandoned. Other divisions and continuations-in-part of said original application are Serial No. 167,875, filed June 13, 1950; Serial No. 174,696, filed July 19, 1950; Serial No. 181,401, filed August 25, 1950; Serial No. 252,713, filed October 23, 1951; Serial No. 278,260, filed March 24, 1952; and Serial No. 282,843, filed April 17, 1952.

An object of the present invention is to provide improved means to prevent cycles of operation of a calculating machine from being initiated while the machine keyboard is improperly conditioned for operation.

A further object is to provide improved means to lock the keyboard against alteration of its condition from a time prior to the start of a cycle of operation of the machine until a time when the conditioning of the keyboard for a subsequent cycle of operation of the machine may properly begin.

A further object of the invention is to provide means to prevent premature alteration of a keyboard setting which should be maintained unaltered for a plurality of cycles of operation of the machine.

A further object is to provide means to prevent depression of keys or release of depressed keys at all times between an automatic keyboard repeat operation of the machine and the start of the next preceding operation of the machine.

A further object is to provide an improved repeat control means settable to suppress automatic release of depressed keys in selected group of keys.

The foregoing and other objects and advantages of the invention will become apparent from the following description with reference to the accompanying drawings in which:

Fig. 3 is a right side elevation of a portion of the right side frame member of the machine with the keyboard mounted thereon;

Fig. 5 is a perspective of the drive motor and main operating shaft with the cams and gears for operating various portions of the machine assembled thereon, the lateral separation of some of said cams and gears being exaggerated to reveal them more clearly;

Fig. 6 is a plan view of the motor and certain parts associated therewith;

Fig. 7 is a perspective view of various elements of a friction drive coupling in axially spread relationship;

Fig. 8 is a detail of the right side elevation of the motor-starting switch;

Fig. 9 is a rear elevation of the centrifugal governor switch of the motor;

Fig. 10 is a circuit diagram of the motor and motor governing means;

Figs. 11, 12 and 13 are detail views of the main operating clutch, Fig. 11 showing the clutch in its normal disengaged condition, and Fig. 12 showing the clutch in engaged condition near the end of a cycle of operation;

Figs. 14 and 15 illustrate some elements of the motor-starting switch operating means;

Fig. 16 is a perspective view of certain elements associated with and controlled from the keyboard for operating the motor-starting switch, as viewed from a point above, forward and rightward thereof;

Fig. 17 is a plan view of the keyboard;

Fig. 18 is a front elevation of the keyboard and certain elements of the key latching and releasing means;

Figs. 19, 20 and 21 are details of the keyboard;

Figs. 30 to 41 are detail sections illustrating particularly the construction and operation of the key latching, interlocking and restoring means;

Fig. 42 is a plan view of portions of the keyboard controlled means controlling the motor-starting switch;

Fig. 43 is a diagram illustrating operation of the elements of Fig. 42;

Fig. 44 is a vertical longitudinal section of the machine revealing certain details of the key latching and releasing means, the illustrated parts being viewed from the right;

Fig. 45 shows certain of the parts of Fig. 44 as viewed from the left and showing certain additional elements on the left side of the machine;

Fig. 46 is a right side elevation particularly illustrating the keyboard repeat control means;

Fig. 47 shows in right side elevation portions of the automatic machine cycling and keyboard repeat control means;

Fig. 48 shows in right side elevation portions of the automatic control means for certain of the small motor bars;

Fig. 49 is a spread perspective of the automatic function control sensing means and connections operable by such sensing control means to control various portions and mechanisms of the machine;

Fig. 50 is a detail of Fig. 49;

The present invention is herein illustrated and described as embodied in the calculating and accounting machine disclosed in full detail in my above-mentioned applications Serial No. 85,971 and Serial No. 174,696. Those structures and mechanisms of the machine with which the present invention is concerned are illustrated and described herein to the extent required for a full understanding of the present invention. To provide for simple and easy identification of the various elements of the machine in the present and the above-mentioned applications, the parts illustrated and described herein are designated by the same reference numbers as in my above-mentioned applications to which reference may be had for disclosure of those features of the machine which are not shown and described herein.

Throughout the following description, consistently with the description in my above-mentioned applications the words clockwise and counterclockwise will be used to describe positions and motions of elements of the machine as seen by an observer in front of, at the right, or above the moving parts in the positions in which they are located in the machine. The words right, rightward, left and leftward will be employed to describe positions and motions as seen by an observer in front of the machine. The words above, up, upward, below, down, downward, front, forward, rear, rearward, and behind will be employed to describe positions and motions as they occur in the machine when it is in its normal upright position.

Figure 4T:
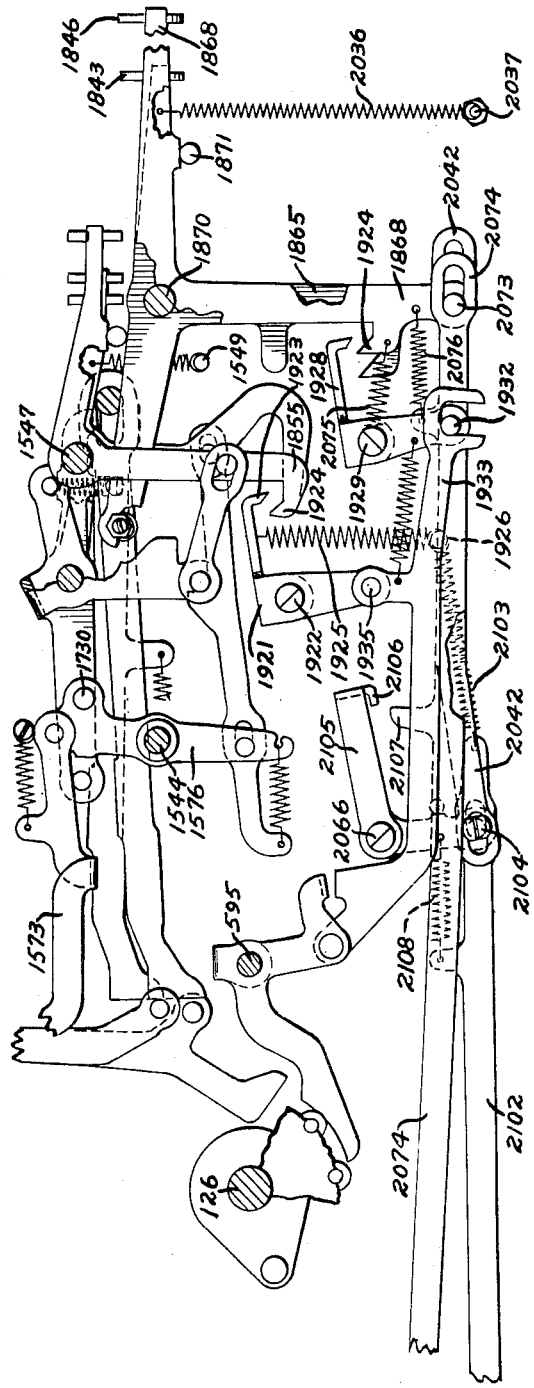
Fig. 4 is a left side elevation of a portion of the left side frame member of the machine with the keyboard mounted thereon.

The various mechanisms of the illustrated machine are supported on or within a frame comprising right and left side frame plates 27 and 28, respectively (Figs. 3, 4 and 18), which are secured to and supported on a base pan 29 (Fig. 2) and which are further secured together in rigid spaced relation by various transverse members as described in detail in my applications Serial Nos. 85,971 and 174,696. The base pan 29 and a casing comprising a plurality of panels or sections 51, 52, 53 and 54 (Figs. 1 and 2), substantially completely enclose the machine excepting the keyboard and paper carriage.

*Machine drive (Figs. 5–16)*

The machine is adapted to be driven through cycles of operation by an electric motor 88 (Figs. 5 and 6), the frame of which comprises front and rear end plates 89 and 90 each having a pair of lateral extensions 91 with feet 92 bent at a right angle, the motor being secured to the left-hand main side frame member 28 by headed screws 93 passing through the member 28 and threaded into the feet 92. The forward end portion of the motor armature shaft 94 is flattened on opposite sides as at 95 (Fig. 7) and, just rearwardly of the flattened portion 95, is threaded at 96 to receive a pair of nuts 97 and 98. The forward nut 98 serves as a stop for a four-armed leaf spring 99 which has a center opening through which the shaft 94 passes and presses against an end closure plate 100 of a friction coupling designated generally by the reference number 101 (Figs. 5 and 6).

The coupling 101 comprises a housing member 102 (Figs. 5 and 7) having interior key splines 103 engaging in notches or keyways 104 in annular plates 105. Disks 106, apertured to fit on the flattened end of the motor armature shaft 94 so as to be driven thereby, are placed between the forward end wall of the housing 102 and the first plate 105, between successive plates 105, and between the last plate 105 and the closure plate 100. The housing 102 is rotatably supported on the end of the armature shaft by shouldered bushing 107 which is nonrotatably fitted in the end wall of the housing 102 and rotatably held on the end of the armature shaft by means of a washer 108 which is nonrotatably fitted to the end of the armature shaft and held in place by the head of a screw 109 threaded into the end of that shaft. After the above-described parts are all assembled on the armature shaft, the compression of the spring 99 may be adjusted by turning the nut 98 which can be locked in the desired position by the nut 97.

The housing 102 carries two studs 110 projecting from the outer face of the end wall thereof into holes in a flexible coupling disk 111 having two more holes receiving studs 112 of a rigid disk 113 nonrotatably secured on the end of a worm shaft 114.

The worm shaft 114 (Fig. 11) is mounted in anti-friction bearings 115, the outer races of which are supported in flanged sleeves 116 secured as by screws to opposite parallel portions of a cradle 117 pivotally supported by four headed screws 118 threaded into the cradle 117 after passing through a vertical portion of a supporting bracket 119. The upper rear one of the screws passes through a bushing 120 which has an eccentric portion located in an aperture in the bracket 119 and can be rotated, prior to final tightening of the screws 118, to a position to provide a solid connection between the cradle 117 and bracket 119 to receive the axial counterthrust of the worm shaft 114. The upper substantially horizontal portion of the bracket 119 is secured to the tops of the cross-members 41 and 42 by headed screws 121 passing through the bracket and threaded into the cross-members, the front two screws 121 also passing through spacing collars 122 placed between the bracket 119 and the cross-member 41.

A worm 123 on the shaft 114 meshes with a worm gear 124 which is riveted to a sleeve 125, rotatably supported on the machine's main operating shaft 126 which is journalled in antifriction bearings secured in the side frame members 27 and 28, respectively. The sleeve 125 has a flange 129 which has a plurality of notches spaced around its periphery. A collar 130 is secured to the shaft 126 by a tapered pin 131. The collar has rigidly secured to it a plate 132 carrying a stud 133, which pivotally supports a C-shaped clutch pawl 134 having on its long arm a clutch tooth 135 adapted to engage in the notches of the flange 129. A spring 136 connected at one end to a stud carried by the plate 132 and at the other end to a stud carried by the long arm of the pawl 134, urges the pawl 135 clockwise (counterclockwise as viewed in Fig. 11) about the stud 133 to engage the tooth 135 into a notch in the flange 129.

Normally, that is, while the machine is at rest, the pawl 134 is held in its disengaged position of Fig. 11 against the tension of the spring 136 by engaging against the end of an arm 137 of a control yoke 138. When the arm 137 is depressed sufficiently to release the pawl 134, the spring 136 rocks the latter to engage the tooth 135 into a notch in the flange 129. At that time, due to the closing of the motor supply circuit in a manner to be described later, the motor will be running and driving the worm gear 124 and flange 129 clockwise through the driving connections described above. The notched flange 129 will, therefore, entrain the pawl 134 and plate 132 and thus drive the shaft 126 from which all mechanisms of the machine, excepting those for operating the paper carriage or part thereof, are driven.

The yoke member 138 is freely rockably supported on a shaft 139 which is journalled in the side frame members 27 and 28 and additionally supported intermediate its ends by engagement forwardly and downwardly against depending lugs 140 (Fig. 45) of the brace members 49. The yoke 138 is urged clockwise (counterclockwise as viewed in Fig. 14) by a tension spring 141 connected at its rear end to a downward arm on the right side of the yoke member 138 and anchored at its forward end (Figs. 45 and 44) in an aperture in the lower edge of a cross-member 36 of the machine frame. A rearward arm 142 on the right side of the yoke member 138 has, on its rear end, a lateral lug 143 normally engaged on an upper shoulder 144 on one arm 145 of another yoke 146 whereby the yoke 138 is normally held in the dot-dash line position of Fig. 14 with its arm 137 engaging the end of the long arm of the pawl 134.

The yoke 146 is rockably supported on a shaft 147 which is journalled in the right-hand frame plate 27 and, near its left end, in a bracket 148 secured upon the rear side of the frame cross-bar 42. The yoke 147 is urged counterclockwise (clockwise as viewed in Figs. 14 and 15) by a tension spring 149 connected at its lower end to a second arm 150 of the yoke 146 and at its upper end to a stud in the bracket 148. The arm 150 has on its rear end a lateral lug 151 overlying a stud 152 projecting leftwardly from one arm 153 of a small yoke 154 rockable on a stud 155 carried by the bracket 148. The yoke 154 has a second arm 156 which cooperates with a stud 157 secured in the bracket 148 to limit switch-closing movement of the yoke 154 which has also a third arm 158 extending upwardly and leftwardly in front of the insulation-coated upper end of an operating lever 159 of a switch (Fig. 8) controlling the supply circuit of the electric motor.

The operating lever 159 has a small yoke portion which is pivoted on a pin 160 mounted in a supporting plate 161 in insulated relation thereto. The yoke portion of the operating arm 159 pivotally carries another arm 162 which carries a contact 163 which cooperates with a contact 164 carried on a stud 165 supported on the plate 161 in electrically insulated relation thereto. A spring strip 166 electrically connects the contact arm 162 to a stud 167 which is mounted on the plate 161 in electrically insulated relation thereto. When the switch is closed, the circuit therethrough extends from the stud 167 through the parts 166, 162, 163 and 164 to the stud 165.

A centrifugal governor switch structure (Figs. 6 and 9) comprises a sleeve 168 of insulating material secured on the rear end of the motor shaft 94. A conducting sleeve 169 is tightly fitted on the sleeve 168 and has around its forward end a tightly fitted slip ring 170. A second slip ring 171 is tightly fitted on a second insulating sleeve 172 which in turn is tightly fitted on the sleeve 169 and has a radial flange on its forward end filling a space between the slip rings 170 and 171. To the rear side of the slip ring 171 there is conductively secured a conducting annulus 173 having a rearwardly turned outer axial flange, the outer surface of which is knurled to serve as a hand wheel for slowly manually turning over the motor shaft to drive the machine parts slowly for purposes of inspection and adjustment. Two pivot studs 174 secured in the rear inner face of the annulus 173 pivotally support two conducting arms 175 each carrying a contact 176. A tension spring 177 connected between studs secured in the arms 175 normally holds each of the contacts 176 engaged with a companion contact 178 conductively secured on a conducting ring 179 tightly fitted on the rear end of the conducting sleeve 169, thus completing a circuit between the two slip rings 170 and 171.

To insure good conductive connection between the annulus 173 and each of the contact arms 175, two copper or spring bronze strips 180 are secured, each at one end, to the rear inner face of the annulus 173 and their opposite slotted ends are held against the sides of the respective arms 175 on opposite sides of the pivot studs 174 by spring clips 181 engaged in grooves in the studs 174. Stop lugs 182 secured to the rear inner face of the annulus 173 limit outward movement of the arms 175.

When the contacts 163 and 164 of the starting switch are closed, they complete a circuit (Fig. 10) through the motor. One side of the supply line is tied to one brush 183 of the motor and the other brush 184 is connected to one end of one field winding 185 of the motor, the other end of that field winding being connected to the switch contact 164. The other switch contact 163 is connected to one terminal of a resistor 186, this same resistor terminal being also connected to a brush 187 which bears on the slip ring 171. The opposite terminal of the resistor 186 is connected both to a brush 188 which bears on the slip ring 170 and to one end of a second field winding 189 of the motor, the other end of the latter winding being tied to the other side of the current supply line. The last-mentioned terminal of the resistor 186 is also connected to one terminal of a spark-suppressing condenser 190, the other terminal of which is connected to that contact 164 of the starting switch which is not directly connected to the resistor 186.

When the speed of the motor rises above the desired speed, the spring 177 yields to the centrifugal force acting on the contact arms 175 and allows the contacts 176 to move away from the contacts 178, thereby cutting the resistor 186 into the motor circuit and thereby reducing the motor current sufficiently to prevent the speed of the motor from exceeding a desired safe value even when running without load. When the motor is under load, as when cycling the machine, the pairs of contacts 176, 178 open and close repeatedly at such a frequency and for such times as to keep the motor running, within rather close limits, at the speed required to drive the machine at the desired speed.

Radio interference eliminating means 191 is connected across the current supply line just ahead of the motor.

The spring 166 urges the contact 163 away from the contact 164 and, by urging the lever 159 to the position of Fig. 8, also serves to urge the lever 159 to its dot-dash line position of Fig. 14.

The motor switch is closed and the machine clutch is engaged for giving the machine a cycle of operation under control of an arm 192, secured at its forward end on a hub 193 pinned to a shaft 194 journalled at its left end in the side frame member 28 and at its right end in a forwardly turned ear on a bracket 195 (Figs. 14 and 16) depending from the cross-bar 41, to the forward face of which it is secured as by a pair of screws. The arm 192 has on its rear end a lateral lug 196 overlying the arm 150.

When the shaft 194, as hereinafter explained, is rocked clockwise, the rear ends of the arms 192 and 150 are depressed, thereby rocking the yoke 154 to operate the switch lever 159 to close the motor switch and also rocking the arm 145 to remove its upper shoulder 144 from beneath the lug 143 on the arm 142 of the clutch-control yoke 138, whereupon the spring 141 rocks the yoke 138 to move the rear end of its arm 137 below the end of the long arm of the clutch pawl 134 which is then moved by its spring 136 to engage its clutch tooth 135 in a notch in the perimeter of the clutch disk 129. Thus the motor is enabled to drive the main operating shaft 126 of the machine clockwise.

An arm 197 (Fig. 14) is fixed on a collar 198 mounted on the shaft 126 and secured thereto by a pin 199. The arm carries a roller stud 200, which, near the end of each revolution of the shaft 126, engages a projection 201 extending upwardly and then rearwardly from an intermediate portion of the arm 142. The yoke 138 is thereby rocked to raise the rear end of its arm 142 to re-engage the lug 143 on the shoulder 144, assuming that the yoke 146 has been restored by the spring 149. The rear end of the arm 137 likewise is raised into the path of the end of the long arm of the pawl 134 so that, as the shaft 126 completes its single revolution, the pawl 134 engages the arm 137 and is thereby rocked on the stud 133 to disengage its tooth 135 from the notched disk 129 whereby the shaft 126 is disconnected from the motor. Such disengaging movement of the pawl 134 is limited by engagement of the end of its shorter arm with a lug 202 (Fig. 11) on the arm 132 so that the arm 137 engaging the pawl 134 prevents continuing rotation of the arm 132 and shaft 126.

A spring 203, connected at one end to a stud secured in the bracket 119, is connected at its other end to a detent yoke 204 which is rockably supported on a stud 205 secured in the bracket 119. The spring 203 normally holds a rightwardly turned lug 206 on the right side arm of the yoke 204 against a lower edge of the bracket 119 whereby a cam edge of the end of the left side arm of the yoke 204 below a detent shoulder 207 thereon is in the path of rotation of a projection 208 on the member 132. Upon completion of the revolution of the shaft 126 and arm 132, the spring 203 moves the shoulder 207 behind the projection 208 and so prevents reverse rotation of the arm 132 and shaft 126.

When the yoke 146 (Fig. 14) and its arm 150 are restored by the spring 149, the spring 166 (Fig. 8) also restores the switch-operating lever 159 to open the switch and also restores the yoke 154.

Figure 27:
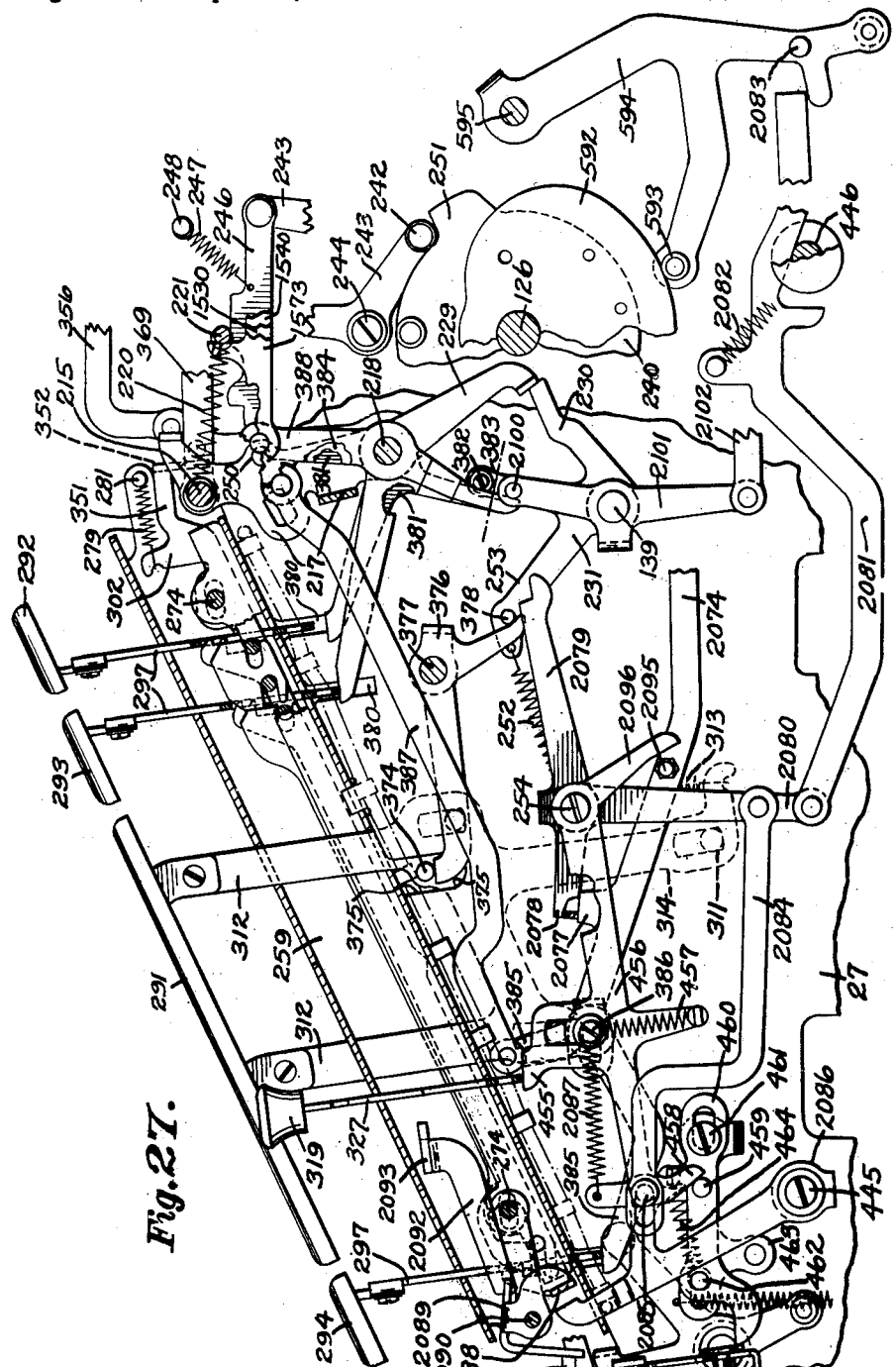
Fig. 27 is a right side elevation of the motor bars and the repeat key of the machine and of various parts associated with said bars and key, many other elements being omitted for clearness of illustration.
Figure 28:
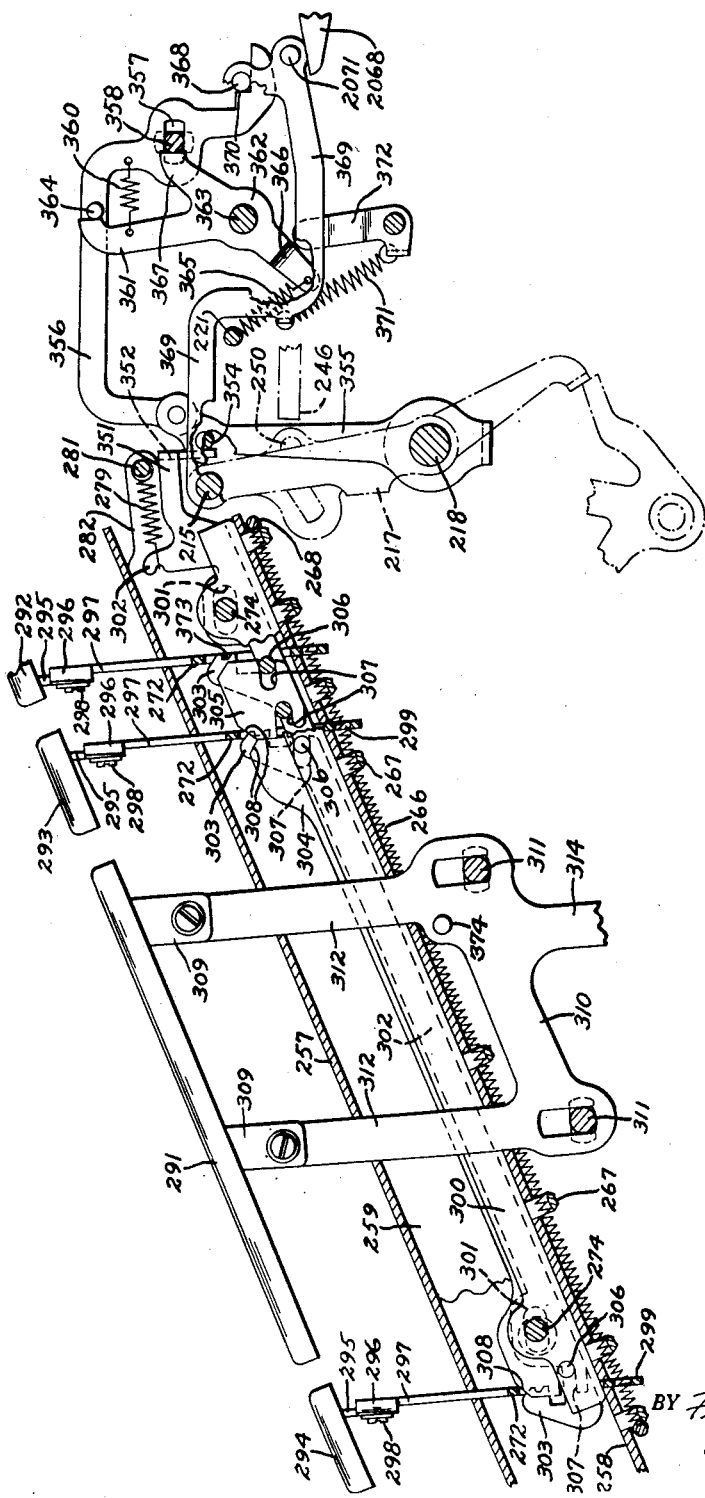
Fig. 28 is a right side elevation of the motor bars and portions of the motor bar latching and releasing means.

An arm 209 (Figs. 14 and 16) is fixed on a hub 210 pinned on the shaft 194 and is connected to the front end of a tension spring 211 which has its rear end anchored on a shaft 1498 and urges the arm 209 clockwise. The upper, rightwardly bent upper end of the arm 209 (Figs. 43 and 16) carries a stud 212. A two-armed lever 213, pivoting on the stud 212 between the end of the arm 209 and an annular flange on the stud 212, carries at one end an upstanding stud 214 normally engaging rearwardly against an end of a rod 215 pinned in two bushings 216 fixed, respectively, to the two side arms of a yoke 217 pivotally supported on the rightward end portion of a shaft 218 journalled in the side frame plates 27 and 29 and extending rightwardly of the plate 27, the left side of the yoke 217 being immediately rightward of the plate 27 and the right side of the yoke 217 being immediately at the left of a brace member 219 (Fig. 2) which is secured to the rightward end of three studs 446, 447 and 595 and in which the rightward end of the shaft 218 is rotatably supported. The rod 215 is urged rearwardly by a tension spring 220 connected at its forward end to said rod and at its rear end to a stud 221 (Figs. 27 and 29) fixed in the side frame plate 27. The other end of the lever 213 carries an upstanding stud 222 normally engaging rearwardly against an end of a rod 223 carried by three arms 224, 225 and 226, each fixed upon an individual hub 227 pinned on the shaft 218. The rod 223 is urged rearwardly by a tension spring 228 connected at its forward end to the rod 223 and anchored at its rear end to a fixed tie rod 609.

The left-hand side arm of the yoke 217 has a downward extension 229 with a laterally bent end normally engaged against the rear end of an arm 230 of a three-armed lever 231 fixed on a hub 232 pinned on the shaft 139 close to the right side of the frame side plate 27, whereby the rod 215 is normally held against being moved rearwardly by the spring 220. Each of the arms 225 and 226 has a downward extension 233, the laterally bent end of which normally engages against the rear end of a respective one of two arms 234 fixed to hubs 235 pinned to the shaft 139, whereby the rod 223 is normally held against being moved rearwardly by the spring 228.

The various means of control of the rods 215 and 223 and of the shaft 139 will be described hereinafter. However, when the shaft 139 is rocked (by means to be described hereinafter) to lower the rear ends of the arms 230 and 234 below the ends of the arms 229 and 233 and if the rods 215 and 223 are not restrained, the springs 220 and 228 move the rods 215 and 223 rearwardly sufficiently to permit the arm 209 and the lever 213 carrying the studs 214 and 222 to be swung rearwardly by the spring 211 to rock the shaft 194 to depress the rear end of the arm 192 sufficiently to couple the machine cycling clutch and close the motor switch in the manner previously described to give the machine a cycle of operation.

A pair of cam disks 236 (Figs. 5 and 16) fixed on hubs 237 pinned on the main shaft 126 are so arranged that while the machine is at rest, the low edges of the cam disks 236 are under roller studs 238 carried by rearwardly extending branches 239 of the arms 233 so that the cams 236 do not interfere with rearward movement of the rod 223. However, from about the 154° point to about the 196° point of the revolution of the shaft 126, the high portions of the cams 236 act on the rollers 238 to return the shaft 218, the arms 233 and the rod 223 counterclockwise beyond their normal positions and move the lateral lugs on the arms 233 rearwardly far enough to permit the arms 234 to be returned to their normal positions when, later in the machine cycle, the shaft 139 is released for return to normal as described hereinafter. At about the 225° point of the revolution of the shaft 126, the high portions of the cams 236 move out from under the rollers 238 to release the shaft 218 and rod 223 to the action of the springs 228 and 211.

A cam disk 240 (Figs. 5, 27 and 29) fixed on a hub 241 pinned on the shaft 126 cooperates with a roller 242 carried by the rearward arm of a bell crank 243 pivoted on a stud 244 secured in the side frame plate 27. The upper arm of the bell crank 243 carries a stud 245 on which is pivoted a link 246. A tension spring 247 which is connected between the forward portion of the link 246 and a stud 248 fixed in the side frame plate 27, urges the forward portion of the link 246 rearwardly and upwardly to maintain the upper straight edge of a raised portion 249 thereon in contact with the stud 221 whereby the forward end of the link 246 is normally maintained at the height of a stud 250 (Fig. 16) secured in the left-hand side arm of the yoke 217. The spring 247 also urges the link 246 rearwardly to maintain the roller 242 normally in contact with the edge of the cam disk 240.

The form and arrangement of the parts are such that, while the machine is at rest, the forward end of the link 246 does not prevent the rod 215 from moving rearwardly sufficiently to permit the machine cycle to be started as previously described. However, from about the 300° point to about the 320° point in the revolution of the shaft 126 and while the cams 236 still hold the shaft 218, rod 223 and arms 233 in their returned positions, the rise to a high point 251 on the cam 240 acts on the roller 242 to rock the bell crank 243 counterclockwise and thrust the link 246 forwardly to engage the stud 250 and rock the yoke 217, the rod 215 and the arm 229 counterclockwise against the tension of the spring 220 and beyond their normal positions. The rods 223 and 215 acting on the studs 222 and 214, respectively, also rock the arm 209, the shaft 194 and the arm 192 counterclockwise beyond their normal positions against the tension of the spring 211. When the arm 229 as well as the arms 233 have thus been returned rearwardly of the rear ends of the arms 230 and 234, respectively, and if the return of the shaft 139 is not otherwise impeded, a tension spring 252, connected between a forward arm 253 of the three-armed member 231 and a screw stud 254 (Fig. 27) threaded into the side frame plate 27, rocks the shaft 139 counterclockwise against limits mentioned later to again position the rear ends of the arms 230 and 234 in front of the laterally turned ends of the arms 229 and 233 so as to hold the arms 229 and 233 in their normal positions when the high portions of the cams 236 and 240 pass from beneath the rollers 238 and 242, thus leaving the above-described mechanism in its normal condition when the shaft 126 has completed its revolution.

The various means and devices for controlling the shaft 139 to cause cycling of the machine will be described in detail hereinafter.

*Keyboard (Figs. 1, 2 and 17–46)*

The keyboard (Fig. 17) of the illustrated machine is provided with eleven rows or banks of amount keys 255, each row containing nine keys, the tops of which bear the numerals from 1 to 9, consecutively, from the front to the rear. In Figs. 17 and 18 these eleven rows or banks of amount keys have been numbered from 1 to 11, consecutively, from right to left, the lowest order bank of amount keys being numbered 1 and the highest order bank being numbered 11.

The keyboard of the illustrated machine also has, at the left, three key-rows 13, 14—15 and 16, of substantially the same length from front to rear as the amount key-rows 1 to 11 but each containing twelve keys 256 which may be used for setting up desired designations or data, such as dates, item-designation characters, or the like. In the particular example illustrated, these three rows of keys 256 serve both for dates and characters, the row of keys 16 being related to the months, the row 14—15 to the days, and the row 13 in part to years and in part to item-designating characters.

On the right-hand portion of the keyboard of the illustrated machine, there are three rows 17, 18 and 19 of control keys and bars. The keys and bars of rows 17 and 18 are function control keys and bars which will be described more particularly hereinafter. The row 19 contains four motor bars which also will be described more particularly hereinafter.

It will, of course, be understood that the numbers of rows of keys on the keyboard may be varied according to circumstances to suit the particular requirements, such as the numerical capacity of the machine, the data which the machine is to print, and the number of totalizers or crossfooters with which the machine is provided, and that the number and arrangement of the keys will conform to the construction and manner of operation of other portions of the machine, as will be apparent to persons skilled in the art considering the present description and drawings.

The top and bottom plates 257 and 258 of the keyboard are held in spaced relation by five spacing plates 259 to which the top and bottom plates 257 and 258 are secured to form a keyboard frame in and on which the other elements of the keyboard are assembled prior to the mounting of the keyboard unit on the machine. Headed screws 260 (Figs. 2, 3, 4, and 17–21) passing through the upper keyboard plate 257 are threaded into nuts 261 secured in the upper portion of each of the spacing plates 259 flush with the upper edges of the latter and at points spaced fore and aft of the keyboard to secure the upper keyboard plate 257 to the spacing plates 259. Each of the spacing plates 259 has four lugs 262 (Figs. 3, 4, 44 and 45) all but the second rearmost one of which are secured, as by staking, in openings in the lower keyboard plate 258. All of the lugs 262 of the rightmost spacing plate 259 and the rearmost and second foremost of the lugs 262 of the remaining spacing plates 259 are cut off substantially flush with the bottom surface of the plate 258 as shown in Fig. 21. The remaining lugs 262 are extended downwardly and, excepting those of the plate 259 at the left edge of the keyboard and of the plate 259 between the key-rows 18 and 19, bear against the frame cross members 39 and 40 (Figs. 44 and 45). The downwardly extended foremost and second rearmost of the lugs 262 of the spacing plate 259 located between the key-rows 18 and 19 and of the spacing plate 259 located adjacent the left edge of the keyboard are apertured to receive screws 263 to secure the keyboard detachably on the side frames 27 and 29, respectively. Upward projections 264 on each of the side plates 27 and 28 are received in slots formed in the keyboard bottom plate 258 for accurately locating the keyboard on the machine frame.

Figure 1:
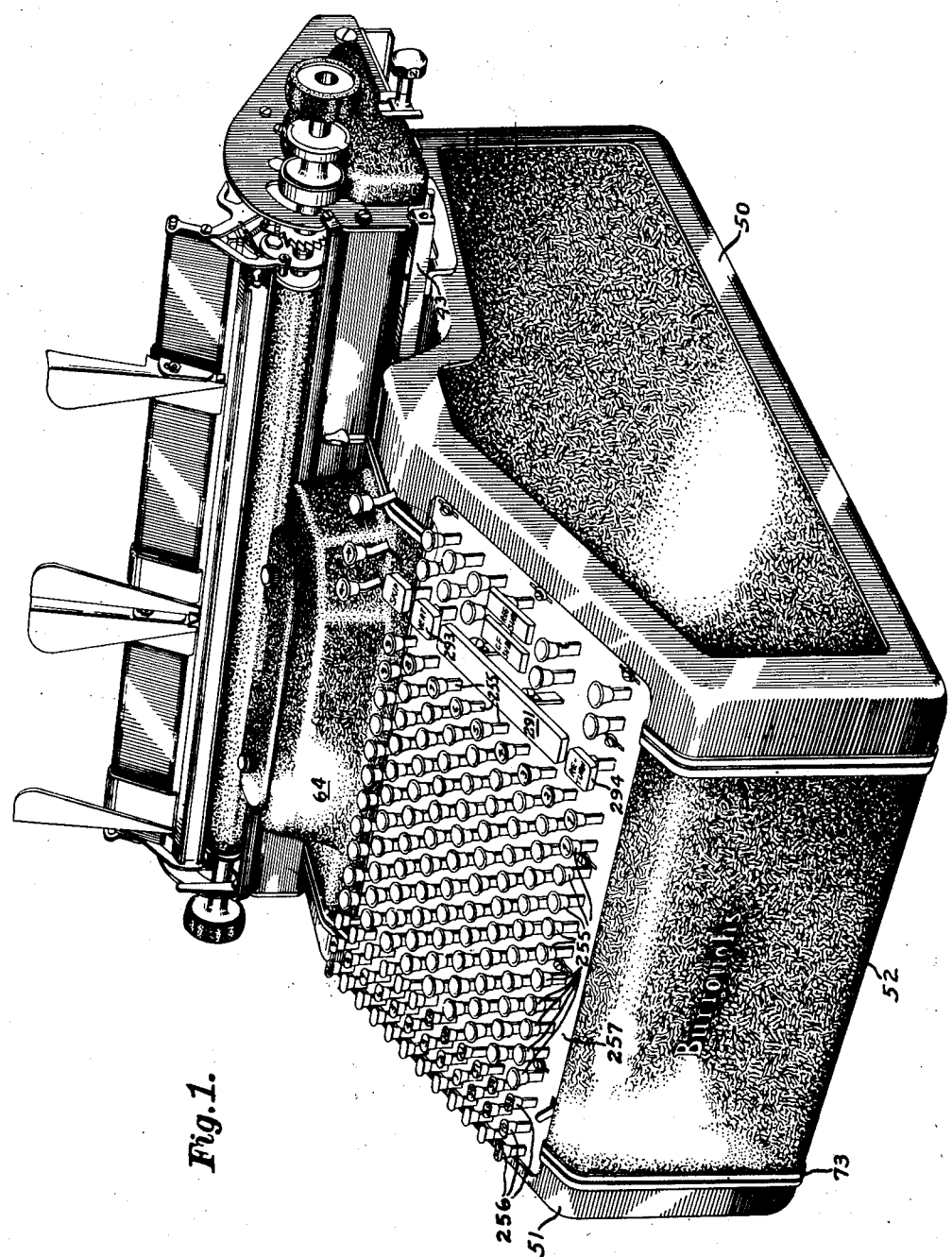
Fig. 1 is a perspective view of a machine enclosed in its casing, embodying the present invention, and as seen from a point forwardly, above and to the right thereof.
Figure 2:
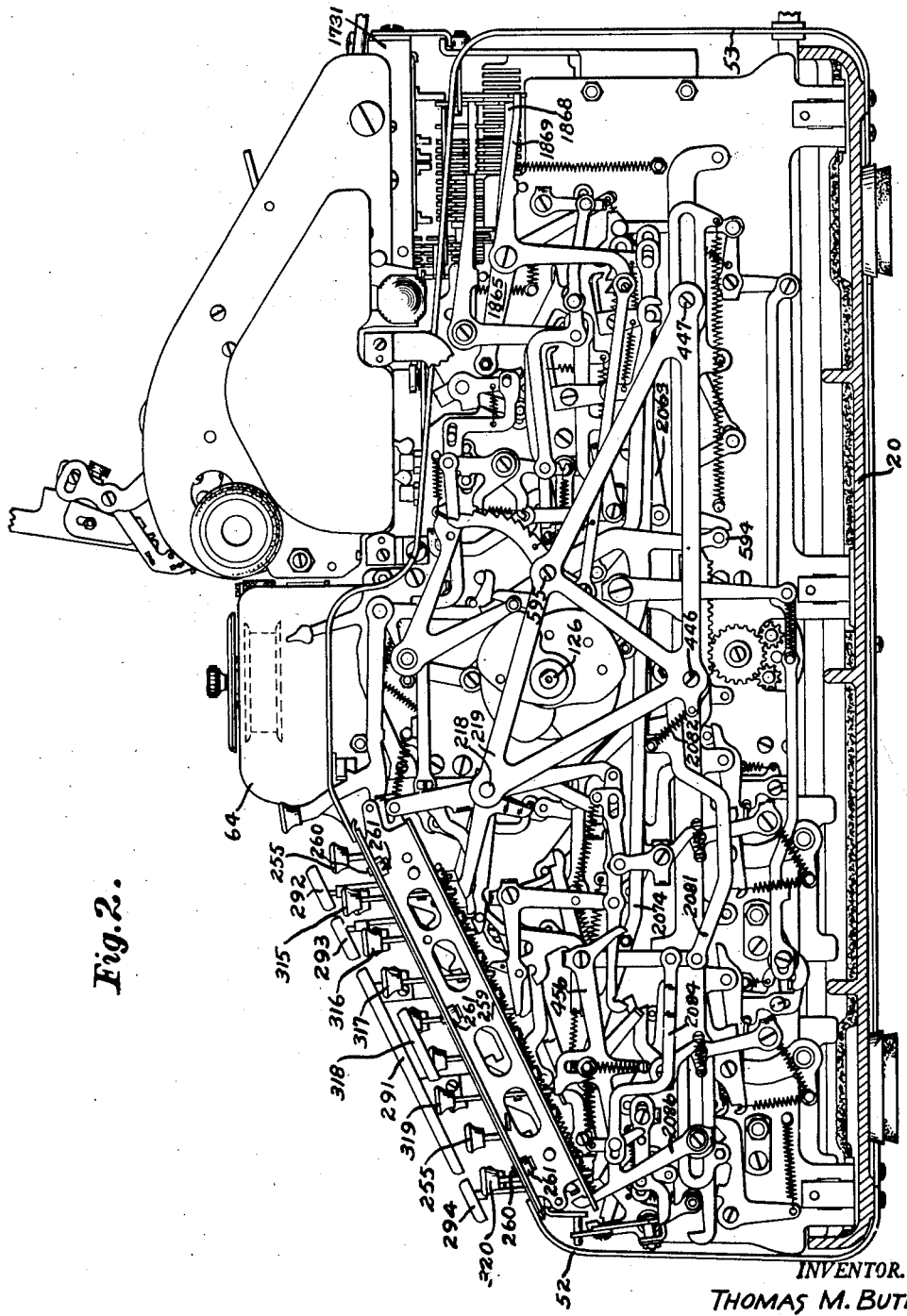
Fig. 2 is a right side elevation of the machine with the right side of the casing removed.

The keyboard, when mounted in place on the machine, slopes downwardly and forwardly as shown in Figs. 1 and 2, and the longitudinal axes of the stems of the keys 255 and 256 which are inclined rearwardly upwardly relative to lines normal to the planes of the top and bottom plates 257 and 258 of the keyboard are, nevertheless, inclined forwardly upwardly relative to lines normal to a plane surface on which the machine is supported. The keyboard is inclined downwardly forwardly at an angle found most convenient for operators, and the keys 255 and 256 are depressible in a rearwardly downward direction permitting economy of manual effort, while at the same time the tops of the keys 255 and 256 in the several key-rows have a stepped arrangement along the key-row so that the chances of depressing two keys in the same row by a single finger depression are minimized. From Fig. 34 it will be seen that the top of the depressed key 255 is not below the plane of the top of the next key 255 forward of the depressed key in the same key-row. Even in the key-rows 13, 14—15 and 16, the top of a depressed key 256 (Fig. 35) is well above the operator's line of sight to the top of the next key forward of the depressed key. This facilitates rapid and easy setting up of amounts and other data on the keyboard.

The stems of the keys 255 and 256 pass through aligned openings in the top and bottom plates 257 and 258 of the keyboard, and the lower ends of the key stems have notches 265 to receive the key-restoring springs 266 (Figs. 21, 30 and 44) which extend along the underside of the bottom plate 258 of the keyboard from the front to the back thereof under each row of keys. In front and in back of the lower end of each key stem the springs 266 are supported by lugs 267 (Figs. 30 and 44) which are struck out of the bottom plate 258 of the keyboard. To anchor the ends of the springs 266, small rods 268 pass through the end coils of the springs beyond the last lug 267 at each end of each row of such lugs except under the key-rows 16 and 14—15 where the ends of the springs 266 are anchored by individual wire clips 269 (Fig. 29) to the foremost and rearmost lugs 267.

The stems of the amount keys 255 (Fig. 21) have a pair of shorter upper vertical slots 270 and a pair of longer lower vertical slots 271, each of the longer lower slots 271 being separated from the upper shorter slot 270 above it by a small crossbar 272. In each amount key-row, a plate 273 passes through the left-hand lower slot 271 of each key stem of the row to limit the up and down movements of the keys. Near the front and rear edges of the keyboard, cross rods 274 extend across the keyboard from side to side and pass through openings in the plates 273 as well as through openings in the spacing plates 259 to retain the plates 273 in correct position.

In each amount key-row, a key latching slide 275 passes through the right-hand lower slot 271 of each key stem in the row. The cross rods 274 pass through substantially horizontal slots 276 (Figs. 30 and 44) in the key latching slides 275, which are thus supported for sliding movement lengthwise of their respective key-rows. The formation of the slots in the latch slides 275 through which the cross rods 274 pass is such that the line of forward and rearward movement of the latch slides is substantially normal to the key stems rather than parallel to the upper and lower plates 257 and 258 of the keyboard. Each of the latch slides 275 is also slidably supported on the bottom plate 258 at two points (near the "3" and "6" keys) intermediate the rods 274, at each of which points the lower edge of each latch slide 275 is formed with a small triangular projection 277 (Fig. 44) the forward edge of which is parallel to the line of movement of the slide 275 and rests on the forward edge of a small aperture in the plate 258.

Each of the key latching slides 275 is formed with a series of nine latch hooks 278 (Figs. 44 and 30), one for each key 255 in the key-row, and each adapted to cooperate with the crossbar 272 between the right-hand slots 270 and 271 in the stem of the respective key. Each key latch slide 275 is urged rearwardly by a spring 279 (Fig. 30) connected between a lug 280 projecting upwardly from the latch slide near its rear end and a rod 281 extending across the rear end of the keyboard from side to side thereof and supported by rearward extension 282 of the spacing plates 259. Each key latch slide 275 has at its rear end a laterally turned lug 283 which normally engages against the rod 223 whereby the latch slides 275 are normally held in a position such that their latch hooks 278 occupy the position indicated in Fig. 30, with the downwardly rearwardly inclined cam portion of the upper edge of each latch hook 278 positioned under the crossbar 272 of the respective key stem to permit depression of the keys 255.

Upon depression of a key 255, the crossbar 272 of the key stem, acting on the upper rear cam edge of the corresponding latch hook 278 of the latch slide 275 for the key-row, cams the latch slide forwardly to the position in which it is shown in Fig. 31, while the rod 223 remains in the position of Fig. 30 (dot-dash lined position in Fig. 31) thereby releasing any previously depressed key in the same key-row and causing the keyboard to be what is known as a "flexible" keyboard. Full depression of the key carries the crossbar 272 of the key stem below the nose of the latch hook 278, whereupon the spring 279 again returns the latch slide 275 to its normal position, as shown in Fig. 32, so that the nose of the latch hook 278 projects into right-hand slot 270 in the key stem above the crossbar 272 and thus latches the depressed key 255 in depressed position.

Figure 22:
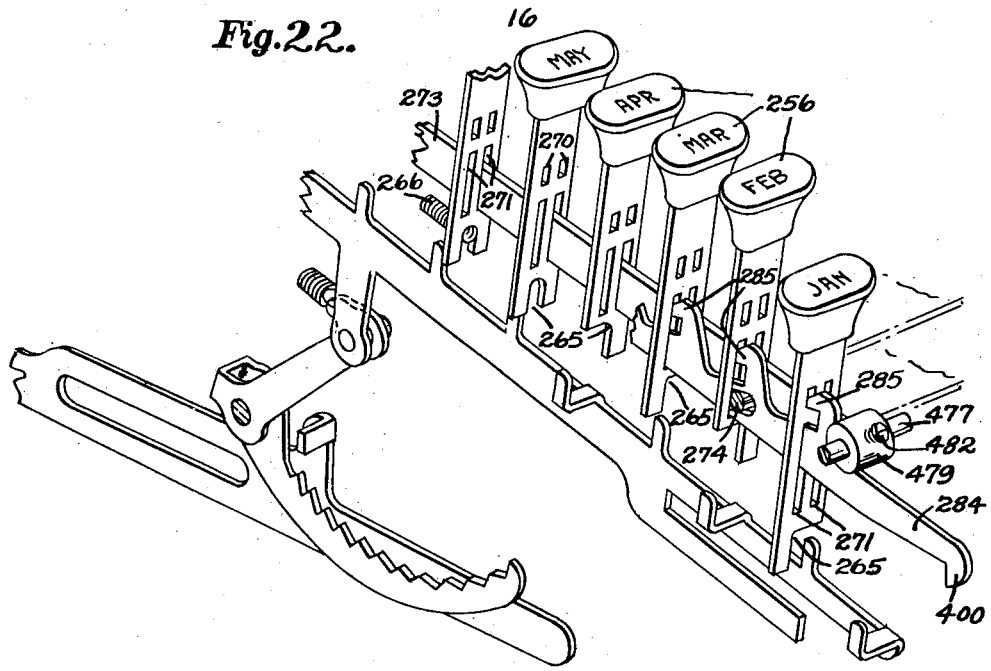
Figs. 22, 23 and 24 are detail perspectives of portions of the key latching means associated with three rows of date keys.

In the key-row 16, the twelve keys 256 are like the keys 255 of the key-rows 1 to 11 except that the tops of all twelve keys 256 are narrower in the fore-and-aft direction than the keys 255 and except that the right-hand one of the two downward projections, formed on the lower end of the stems of the keys 255 by forming the notch 265 therein for the spring 266, is absent from the stems of the first and third keys 256 at the front of the key-row 16 as shown in Fig. 22, and the left-hand one of such downward projections is absent from the lower ends of the stems of the second and fourth keys 256 of that key-row, for a purpose which will be explained hereinafter. The latch slide 284 for the key-row 16 is like any of the latch slides 275 except that it has twelve latch hooks 285 instead of nine latch hooks 278. Also, the latch slide 284 passes through the left-hand slots 271 and a plate 273 passes through the right-hand slots 271 in the stems of the keys 256 of the row 16. In other respect, the keyboard construction in the key-row 16 is comparable to that in the key-rows 1 to 11.

Figure 23:
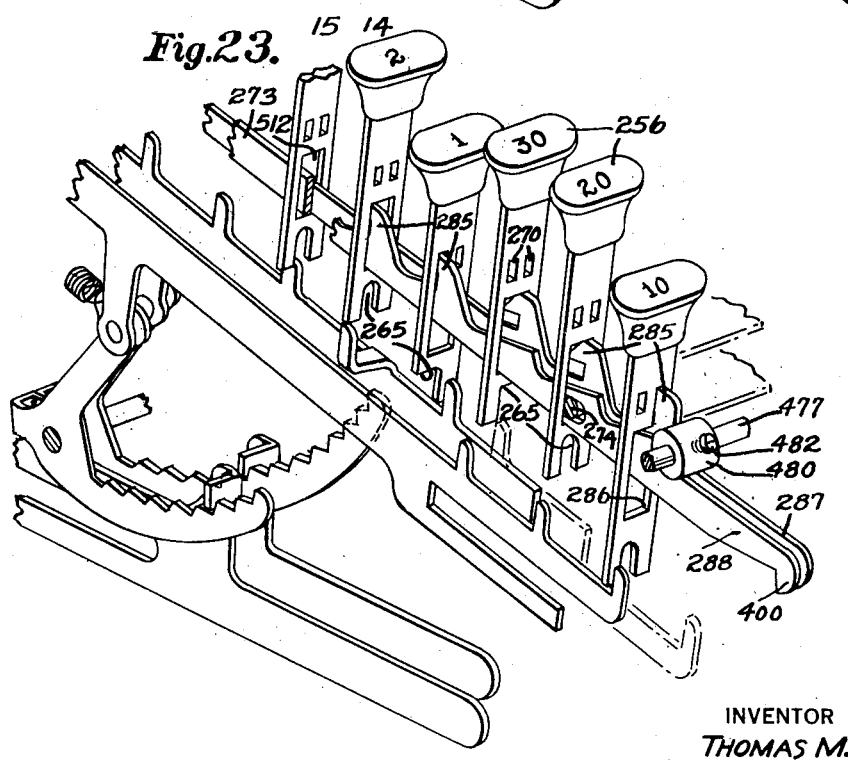

The twelve keys 256 in the key-row 14—15 are like the keys of the key-row 16 except in two respects. First, the portion of the key stem which is located between the two lower slots 271 in the stem of each of the keys 255 of the rows 1 to 11 and of each of the keys 256 of the row 16 is absent from the stems of the keys 256 in both of the key-rows 13 and 14—15 as shown in Figs. 23 and 31 so that in each of the latter key-rows, the stems of the keys 256 each have a single relatively wide lower slot 286 through which pass two key latch slides 287 and 288 and a plate 273 located between the two latch slides. Secondly, in the key-row 14—15, the right-hand one of the two downward projections at the sides of the notches 265 in the lower ends of the key stems is absent from only the third key 256 and the left-hand one of such projections is absent from only the fourth key 256 from the front of the key-row. The latch slides 287 and 288 are generally like the latch slide 284 except that each of the right-hand latch slides 287 has only three latch hooks 285 for the front three keys 256 of the respective key-row 13 or 14—15, whereas the left-hand latch slide 288 has nine latch hooks 285, one for each of the rear nine keys 256 of the row. Similarly to the key latch slides 275 for each of the key-rows 1 to 11, each of the key latch slides 284, 287 and 288 is urged rearwardly by a spring 279.

In consequence of the construction in the key-rows 13 and 14—15, depression of any one of the rear nine keys 256 in either of these key-rows will release any previously depressed key among the said nine keys of the same key-row without disturbing a previously depressed key among the first three keys 256 of the same key-row, and depression of any one of the front three keys 256 will cause release of any other previously depressed key of the three without, however, releasing any previously depressed key among the rear nine keys 256 of the same row.

The illustrated construction and arrangement of the keys and key latch slides for the key-rows 13, 14—15 and 16 is especially advantageous to permit of using the keys of the three rows of both dates and characters, the twelve keys 256 of the row 16 being allotted to the months, the rear nine keys of the row 14—15 for units-of-days, the first three keys of the key-row 14—15 for ten, twenty and thirty days, the first three keys of the row 13 for year numbers and the last nine keys of the same row for such characters as may be desired for designating the classes of items entered on the keyboard. The printing type may be arranged in a corresponding manner, that is, the tens and units-of-days numbers may be on two separate type bars.

The rear end portion of each key latch slide 275, 284, 287 and 288 has, above its laterally turned lug 283, a rearward extension 289 which has a laterally turned and downwardly extending lug 290 (Fig. 32) rearwardly of the lug 283. The lugs 290 of all of the key latch slides 275, 284, 287 and 288 (Fig. 17) are positioned behind the rod 223, and, while the rod 223 remains in its normal position, forward movement of any latch slide 275 produced by depression of a key will not bring its lug 290 into contact with the rod 223. The lugs 283 and 290 are spaced to permit a definite limited amount of relative movement between the key latch slide and the rod 223 as will be explained hereinafter. When the key latch slides 275, 284, 287 and 288 are in their normal positions in which their lugs 283 are held engaged with the rod 223 by their springs 279, the rods 274 are substantially centered in the guide slots in the key latch slides, the guide slots being of such dimension as to permit of movement of the key latch slides a short distance in either direction from their normal positions as will be explained hereinafter.

In the row 19 of motor bars, next to the right of the units order row of amount keys 255, are a main motor bar 291 and three small motor bars 292, 293 and 294. Each of the three small motor bars 292, 293 and 294 has a downwardly directed lug 295 (Figs. 28 and 36) on a lateral edge of which is a rearwardly turned flange 296 adapted to engage a lateral edge of the upper end of a stem 297 to which the lug 295 is secured by a screw 298. At its lower end, the stem 297 of each small motor bar has an aperture 299 through which the restoring spring 266 for the row 19 passes.

Below the upper keyboard plate 257, each small motor bar stem 297 (Fig. 36) has two parallel slots 270 and, below the latter, a single large slot 286. A fixed guide plate 300 through which the rods 274 pass, extends through the right side of the slots 286 of the small motor bar stems. The rods 274 also pass through slots 301 in a latch slide 302 which is slidably supported on the rods 274 and extends through the left side of the slots 286 in the small motor bar stems. The latch slide 302 has a latch hook 303 (Fig. 28) for each small motor bar 292, 293 and 295 but none for the main motor bar 291.

Two interlock slides 304 and 305 are supported between the fixed plate 300 and the latch slide 302 on pairs of studs 306 secured in the fixed plate 300 and extending into slots 307 formed in the ends of the plates 304 and 305. At the front and rear ends of their upper edges, each of the plates 304 and 305 is formed with cam edges 308. Each plate 304 and 305 is of a length equal to the distance between the stems 297 of the adjacent small motor bar plus the thickness of one of such stems. Thus, the cross-bar 272 of the stem of any one of the small motor bars when depressed will shift one or both of the interlock plates 304 and 305, when necessary, to permit depression of that one small motor bar alone but will prevent simultaneous depression of more than one small motor bar 292, 293 or 294.

The main motor bar 291 has two downwardly extending lugs 309 (Fig. 28) which have their broad sides parallel with the sides of the machine. A slide 310 (Figs. 27, 28 and 29) is supported for vertical sliding movement on the left-hand side of the right-hand side frame plate 27 by three studs 311 and has a pair of arms 312 extending upwardly through both keyboard plates 257 and 258. The lugs 309 are secured flatwise to the upper ends of the slide arms 312 by screws. The slide 310 is urged upwardly by a spring 313 having one end hooked in a notch in a rearward projection of the lower arm 314 of the slide and its other end connected to the leftward end of the stud 254 inwardly of the frame side plate 27. The main motor bar and slide 310 do not cooperate with the plate 300, latch slide 302, interlock slides 304 and 305, or spring 266 of the motor bar row 19. The main motor bar 291 is freely depressible at all times and always restores to normal position immediately when the operator removes manual pressure therefrom.

The repeat key 319 and the error key 325 are keyboard control keys. All of the other keys and bars in the key-rows 17 and 18 are function control keys and bars for the rear and front crossfooters, respectively. The keyboard construction is the same for both of these key-rows except with respect to the repeat key 319 of the row 17 and the error key 325 of the row 18.

The key-row 17 includes, from the rear to the front, a total key 315, a subtotal key 316, a non-add key 317, a subtract bar 318, the repeat key 319 and an add key 320. The key-row 18 contains a total key 321, a subtotal key 322, a non-add key 323, a subtract bar 324, the error key 325 and an add key 326. The stem 327 of each of these keys of the two key-rows 17 and 18 has in its lower end portion an aperture 328 (Figs. 36 and 38) through which the restoring spring 266 for the respective key-row passes. The stem of each of these keys has a single wide lower slot 286 to accommodate a fixed guide bar 273 like that of each of the amount key-rows and a key latch slide 329 for the key-row 17 or 330 for the key-row 18. The latch slides 329 and 330 (Figs. 29, 36 and 38) are slidably supported on short rods 331 which pass through slots in the front and rear portions of the slides 329 and 330 and are in turn supported by the two partition plates 259 located to the right of the key-row 17 and to the left of the key-row 18 respectively. The latch slides 329 are also slidably supported on the plate 258 in the same manner as the latch plates 275.

Each of the latch slides 329 and 330 has two latch hooks 332, one for the total key 315 or 321 and one for the subtotal key 316 or 322, two latch hooks 303, one for the non-add key 317 or 323 and one for the subtract bar 318 or 324, and a latch hook 333 for the add key 320 or 326.

The latch slide 330 has no latch hook for the error key 325 because the error key is not to be latched down at any time.

On the latch slide 329, the rear portion of a latch hook 334 for the repeat key 319 (Fig. 37) is cut off vertically substantially flush with the front surface of the repeat key stem so that it will not latch the repeat key in depressed position while the slide 329 is in its normal position. The repeat key stem is formed with a rectangular notch 335 (Fig. 38) in its right-hand edge in such position that if the repeat key 319 is rocked slightly rightward while it is depressed, the lower edge of the notch 335 will engage under the edge of the upper keyboard plate 257, to latch the repeat key in depressed position until it is again released by manually shifting the key leftward whereupon it is restored immediately by the spring 263 without interference from the shortened latch hook 334 if the latch slide 329 is in its normal position.

The stem of each of the keys and bars of the key-rows 17 and 18, except only the stem of the repeat key 319 and the stem of the error key 325, has two narrow parallel short vertical slots 270 above the wide lower slot 286, the right-hand one of the slots 270 serving to receive the nose of the latch hook 303, 332 or 333 for the respective key. In the stem of the repeat key 319, a single large slot 336, corresponding in position and area to the two slots 270 and the vertical strip between those slots in the other key stems, is formed to receive the shortened latch hook 334 for the repeat key when the latch slide 329 for key-row 17 moves rearwardly during a machine cycle while the repeat key 319 is depressed regardless of whether or not it is also tilted rightwardly.

The stem of the error key 325 does not require slots 270 because no latch hook is provided for the error key. The error key stem has a rectangular notch 337 (Fig. 38) in its left-hand side just below the upper keyboard plate 257. When the error key 325 is in its normal position, the notch 337 is adapted to receive a rectangular projection 338 on the right-hand edge of a flat slide 339 supported for longitudinal movement fore and aft on the underside of the upper keyboard plate 257 on studs 340 (Fig. 17) secured in the underside of the plate 257 and passing through longitudinal slots in the slide 339. The rear end of the slide 339 is pivotally connected with the right-hand arm of a lever 341 which is pivotally supported on a stud 342 secured in the upper keyboard plate 257. The left arm of the lever 341 has an end turned downward behind the stud 212. A light tension spring 343, connected at its front end to a stud carried by the slide 339 and at its rear end to the rod 281, yieldingly holds the forward end of the slot in the slide 339 rearwardly against the stud 340. While the slide 339 is in its normal position, the projection 338 is rearward of the stem of the error key 325. The slide 339 and its projection 338 function in a manner described hereinafter to prevent depression of the error key 325 during any cycle of machine operation and to prevent cycling of the machine while the error key is in wholly or partially depressed position.

The left-hand edges of the stems of the total key 315 and subtotal key 316 of the key-row 17 and the right-hand edges of the stems of the total key 321 and subtotal key 322 of the key-row 18 are cut away, as shown in Fig. 36, to an equal extent along those portions of the stems which normally are below the lower keyboard plate 258 so that the lower portions of the stems of the two total keys 315 and 321 and the lower portions of the stems of the two subtotal keys 316 and 322 are separated laterally to a greater distance than the upper portions of those pairs of key stems. The upper and lower portions of the left-hand edges of the stems of the keys 315 and 316 and the upper and lower portions of the right-hand edges of the stems of the keys 321 and 322 are joined by short inclines. A flat bar 344 is pivotally supported at its forward end on the underside of the lower keyboard plate 258 by a headed stud 345 secured in the plate 258 between the key-rows 17 and 18. The rear portion of the bar 344 is supported between the stems of the total and subtotal keys of the rows 17 and 18 by a headed stud 346 secured in the plate 258 and passing through a transverse slot in the bar 344.

The portions of the bar 344 located between the stems of the two total keys 315 and 321 and between the stems of the two subtotal keys 316 and 322 are of a width which is greater than the lateral distance between the adjacent edges of the upper portions of the stems of the pairs of total and subtotal keys by nearly the amount by which the width of each of these key stems has been reduced. When all four of these keys are in their normal elevated positions, the rear portion of bar 344 has an amount of lateral swinging play sufficient to permit depression of the total key 315 or subtotal key 316 in the row 17 or depression of the total key 321 or subtotal key 322 in the row 18. Upon depression of a total or subtotal key in either row, the wide upper portion of the stem of the depressed key engages an edge of the bar 344 to move it to or hold it in position to prevent depression of a total or subtotal key in the other row 17 or 18.

In each of the function control key-rows 17 and 18 is a series of four interlock slides (Fig. 29), three of which are designated by the numeral 347 and are positioned between the stems of adjacent ones of the four rearmost keys, i. e., the total key, subtotal key, the non-add key and the subtract bar, of the same key-row whereas the fourth slide, designated by the numeral 348, is longer than the other three and extends from the stem of the subtract bar 318 or 324 to the stem of the add key 320 or 326. Each of the interlock slides 347 and 348 is slidably supported between the guide bar 273 and the latch slide 329 or 330 for the respective key-row on a pair of studs 349 secured in the respective guide bar 273. Each slide 347 and 348 is formed with downwardly sloping cam portions at the front and rear ends of its upper edges whereby each interlock slide may be shifted forwardly or rearwardly by the action upon its front or rear cam edge of the cross bar 272 of either of the key stems with which it cooperates when that key stem is being depressed. Each of the interlock slides 347 and 348 is of a length equal to the distance between centers of the key stems with which it cooperates so that each of the two series of four slides 347 and 348 prevent simultaneous depression of more than one of the five keys with which the interlock slides of that series cooperate.

Each of the key latch slides 329 and 330 is formed with three upward projections 350, one at the side of each of the interlock slides 347 to prevent the latter from possibly tilting toward and interfering with the latch hooks on the key latch slides.

The latch slides 302, 329 and 330 are urged rearwardly by springs 279 like those for the latch slides 275, 284, 287 and 288. Each of the latch slides 302, 329 and 330 has a rearward extension 351 and laterally turned and downwardly extending lug 352 corresponding to the parts 289 and 290 of the key latch slides 275, 284, 287 and 288. The lugs 352 are positioned behind the rod 215. The latch slides 329 and 330 also have lugs 352 corresponding to the lugs 283 of the latch slides 275, 284, 287 and 288 but positioned in front of the rod 215.

The guide slots in the latch slides 329 and 330 through which the rods 331 pass are also so arranged and dimensioned relative to the rods 331 as to permit of movement of each of the latch slides 329 and 330 a short distance both forwardly and rearwardly from its normal position as determined by engagement of the lug 353 against the rod 215 under the urge of the springs 279 for those latch slides.

The small motor bar latch slide 302 has no lug corresponding to the lugs 283 or 353, but its normal position under the urge of its spring 279 is determined by engagement of its lug 352 against the forward side of a stud 354 (Fig. 28) carried by a lever 355 pivotally supported on the shaft 218. The upper end of the lever 355 is pivotally connected with a link 356, the rearward downwardly extending portion of which has a slot 357. The edges of the link 356 above and below the slot 357 are guided in slots in the upper and lower sides of a stud 358 which is secured on the left side of the frame side plate 27.

A tension spring 360, sufficiently strong to overcome spring 279 for the slide 302, is connected at its rear end to the link 356 and at its forward end to an arm 361 of a three-armed lever 362 pivoted on a stud 363 secured in the side frame 27. The spring 360 normally maintains a stud 364 carried by the link 356 in contact with the arm 361. A tension spring 365 connected at its upper forward end to a leftwardly projecting shank of the stud 221 and at its lower rear end to a downward second arm 366 of the lever 362 aids the spring 279 for the slide 302 normally to maintain a rear upper third arm 367 of the lever 362 in contact with the fixed stud 358, whereby the latch slide 302 is normally yieldingly held in the position of Fig. 28. The lower rear end of the link 356 extends under a stud 368 carried by an upward extension of the rear end of a link 369 and is formed with a step or shoulder 370 in front of the stud 368. The forward end of the link 369 is pivotally mounted on the rod 215. The link 369 is urged rearwardly and its rear end is urged downwardly by a tension spring 371 connected at its forward end to a lateral lug formed on the link and at its rearward end to a lateral lug on a guide arm 372 which is secured to the inner side of the plate 27 in spaced relation thereto and extends upwardly at the left of the link 369.

The guide slots in the latch slide 302 through which the rods 274 pass are so arranged and dimensioned relative to the rods 274 as to permit of movement of the latch slide 302 a short distance both forwardly and rearwardly from its normal position determined by engagement of its lug 352 against the stud 354 under the urge of its spring 279.

When any of the keys and bars of the key-rows 13, 14—15, 16, 17, 18 and 19, excepting the main motor bar 291, the error key 325 and the repeat key 319, is depressed while the related one of the latch slides 284, 287, 288, 302, 329 and 330 is in its normal position, just as in the case of depression of a key 255 as previously explained, the cross-bar 272 in its stem acts on the upper rear inclined cam edge of the cooperating latch hook on the latch slide and moves the latter forwardly sufficiently to permit the cross-bar 272 to pass down behind the latch hook. As the full depression of the key or bar is completed, the cross-bar 272 clears the rearward nose of the latch hook and permits the latch slide to be returned rearwardly to its normal position by its spring 279 to latch the depressed key or bar in its fully depressed position. Depression of any key 256 in any one of the five groups of such keys associated with the five latch slides 284, 287 and 288 will result in the release of any previously depressed key 256 controlled by the same latch slide so that that portion of the keyboard comprising the five groups of keys 256 is also "flexible" except as depression of the keys in some of those groups is regulated by interlock means which will be described in detail under the heading "Selective date repeat."

Upon depression of any one of the live keys or bars 315, 316, 318, 321, 322 and 324 of the key-rows 17 and 18 as well as upon depression of any bar 291, 292, 293 or 294 of the row 19, the keyboard becomes locked as will be explained hereinafter.

Each of the latch hooks 303 and 332 for the small motor bars 292, 293 and 294, and for the live keys and bars 315, 316, 318, 321, 322 and 324 has its rearward end formed with a notch 373, the upper end of which is right-angled to catch the crossbar 272 of the stem of the respective key or bar and prevent restoration thereof whenever manual pressure on the latter is released after the key or bar has been only partially depressed to or beyond a predetermined extent. Thus restoration of the partially depressed bar is prevented except by depression of the error key 325 or by operation of the machine after full depression of such key or bar, as will be explained more fully hereinafter. The lower side of each notch 373 is inclined downwardly rearwardly so as not to interfere with full depression of the respective key or bar.

The notches under the latch hooks 332 for the total and subtotal keys 315, 321, 316 and 322 are formed with same depth in the forward direction as the notches under the latch hooks 273 of the latch slides 275 for the amount key-rows 1 to 11, whereas the notches under the latch hooks 286, 303 and 333 on the latch slides 284, 287, 288, 302, 329 and 330 extend farther forwardly relative to the stems of the respective keys and bars than do the notches under the latch hooks 273 of the latch slides 275 for a purpose to be explained hereinafter.

*Manually initiating machine cycles, and keyboard control of machine cycling*

When any motor bar of the row 19 or any one of the total keys, subtotal keys or subtract bars of the key-rows 17 or 18 are depressed while the machine is otherwise properly conditioned for operation, the motor is caused to drive the machine through a cycle of operation.

When the main motor bar 291 is depressed against the tension of the spring 313, a stud 374 secured in the slide 319 is lowered. The stud 374 projects through a slot 375 (Figs. 27 and 29) in the frame member 27 and over the forward end of the forward arm of a two-armed lever 376 having a small yoke portion pivoted on a stud 377 secured in the frame member 27. The stud 374 rocks the lever 376 counterclockwise so that its lower arm acts on a stud 378 secured in the forward arm 253 of the member 231, thereby rocking the member 231 and the shaft 139 clockwise.

The shaft 139 will also be rocked clockwise by depression of any of the small motor bars 292, 293 and 294 or any of the "live" bars and keys 315, 316, 318, 321, 322 and 324.

The stem 297 of each of the three small motor bars 292, 293 and 294 has, at its lower end, a lateral projection 379 (Fig. 36) extending rightwardly through an individual slot 380 in the side frame member 27. The projection 379 of the stem of the uppermost motor bar 292 is positioned above the forward end of the forward arm of a three-armed lever 381 (Fig. 27) pivotally supported on the shaft 218 rightwardly of the left side of the yoke 217. The lower arm of the lever 381 extends downwardly in front of a stud 382 having a screw-threaded eccentric reduced shank passing through the upper end of the middle arm 383 of the three-armed member 231, and adjustably secured therein by a nut threaded onto the shank. When the uppermost motor bar 292 is depressed, the projection 379 on its stem rocks the lever 381 counterclockwise and, through the stud 382, rocks the member 231 and shaft 139 clockwise.

The projection 379 on the stem of the upper motor bar 293 is positioned over the forward arm of a three-armed lever 384 (Fig. 27) which is pivotally supported on the shaft 218 rightwardly of the lever 381. The lower arm of the lever 384 is positioned in front of the stud 382 so that upon depression of the upper motor bar 293, the shaft 139 is rocked clockwise.

The projection 379 of the lower motor bar 294 is positioned above the forward arm of a bell crank 385 having a small yoke portion pivotally supported immediately rightward of the side frame member 27 on a stud 386 secured in the member 27. The upper arm of the bell crank 385 is pivotally connected with the forward end of a link 387 which is pivotally connected at its rearward end to the upper arm of a two-armed lever 388 which is pivotally supported on the shaft 218 at the right of the lever 384. The lower arm of the lever 388 is positioned in front of the stud 382 so that upon depression of the lower motor bar 294, the projection 379 on its stem rocks the bell crank 385 counterclockwise pulling the link 387 forwardly and also rocking the two-armed lever 388 counterclockwise to swing the stud 382 rearwardly and rock the shaft 139 clockwise.

Upon depression of the total key 315 in key-row 17, the lower end of the stem of the total key engages and depresses the forward arm of a lever 389 (Fig. 46) having a small yoke portion pivotally supported on the shaft 218 immediately leftward of the right side of the yoke 217. The forward arm of the lever 389 has a downwardly extending arm 390 which terminates in front of the stud 382 so that as the lever 389 is rocked counterclockwise by the depression of the total key 315, the stud 382 is moved rearwardly and rocks the shaft 139 clockwise.

When the total key 321 of the key-row 18 is depressed, the lower end of its stem engages a forward arm of a three-armed lever 391 (Fig. 46) which has a small yoke portion pivotally supported on the shaft 218 on opposite sides of the group of levers 381, 385 and 388. The lever 391 has a downward arm 392 positioned in front of the stud 382 so that depression of the total key 321 also rocks the shaft 139 clockwise.

Upon depression of the subtotal key 316 in the key-row 17, the stem of the latter engages and depresses the forward arm of a lever 393 (Fig. 46) which has a small yoke portion pivotally supported on the shaft 218 immediately leftward of the lever 389. The lever 393 has a downward arm 394 positioned in front of the stud 382 so that depression of the subtotal key 316 likewise rocks the shaft 139 clockwise.

Upon depression of the subtotal key 322 in key-row 18, the lower end of the stem of that subtotal key engages and depresses the forward arm of a three-armed lever 395 which has a small yoke portion pivotally supported on the shaft 218 immediately rightward of the lever 391. The lever 395 has a downward arm 396 positioned in front of the stud 382 so that depression of the subtotal key 322 also rocks the shaft 139 clockwise.

Under the stems of both of the subtract bars 318 and 324 is a rightwardly extending lug 397 on the front end of a forward arm of a bell crank 398 which has a small yoke portion pivotally supported on the stud 377. The bell crank 398 has a downward arm 399 positioned in front of the stud 378 on the arm 253 of the three-armed member 231 whereby depression of either or both of the substract bars will rock the shaft 139 clockwise.

Clockwise movement of the shaft 139 caused by depression of any of the bars and keys 291, 292, 293, 294, 315, 316, 318, 121, 322 and 324 will swing the rear ends of the arms 230 and 234 (Fig. 16) below the lateral lugs on the lower ends of the arms 229 and 233, thereby permitting the spring 220 to pull the rod 215 rearwardly swinging the yoke 217 clockwise and moving the lower end of the arm 229 forwardly and positioning the lateral lug on the arm 229 over the arm 230. Similarly, the spring 228 is permitted to swing the rod 223 rearwardly, rocking the arms 224, 225, 226 and shaft 218 clockwise and moving the lateral lugs on the lower ends of the arms 233 forwardly over the arms 234. The rollers, 238 carried by the arms 239 move downwardly toward the low portion of the cams 236. Simultaneously, the spring 211 is permitted to rock the arm 209, shaft 194 and arm 192 clockwise if the error key 325 is in its normal position so that the stud 212 can move rearwardly, rocking the lever 341 clockwise and moving the slide 339 forwardly to carry its projection 338 into the notch 337 in the stem of the error key. Through the lever 213 and studs 214 and 222, the spring 211 also assists the rearward movement of the rods 215 and 223.

The rearward movement of the bail rods 215 and 223 releases the amount key latch slides 275, the date key latch slides 284, 287 and 288 and the function control key latch slides 329 and 330 for movement rearward by their springs 279 if such movement of the latch slides is not otherwise obstructed. The bail rod 215, being moved rearwardly by its spring 220 assisted by the spring 211, engages the forward edge of the lever 355 and swings the lever rearwardly thus also moving the stud 354 rearwardly and permitting the small motor bar latch slide 302 to be moved rearwardly by its spring 279 if such movement of the latter latch slide is not otherwise obstructed. The rearward movement of the bail rod 215 carries it against one or more of the lugs 352 of the latch slides 329, 330 and 302 any one of which, if its rearward movement is prevented or limited by the stem of any key or bar in its respective key-row, will limit but not completely prevent such rearward movement of the bail rod 215. Likewise, the rearward movement of the bail rod 223 carries it against one or more of the lugs 290 of the latch slides 275, 284, 287 and 288, any one of which, if its rearward movement is prevented or limited by the stem of any key 255 or 256 in its respective key-row, will limit but not prevent such rearward movement of the bail rod 223.

The extent of clockwise movement of the arm 209 and its stud 212, of the shaft 194 and of the arm 192 is dependent upon the extent of rearward movement of the bail rod 215, the extent of rearward movement of the bail rod 223, as indicated in the diagram of Fig. 43, and upon the condition of certain interlock devices which need not be considered herein but are fully disclosed in my applications Serial Nos. 85,971 and 174,696. Present consideration will be limited to action of the above-described parts when such interlock devices do not prevent sufficient downward movement of the arm 192 and its lug 196 to close the motor switch (Fig. 15) and couple the machine cycling clutch (Fig. 11) to initiate a machine cycle. The diagram of Fig. 43 illustrates the relative extents of limitation of rearward movement of the stud 212 on the arm 209 resulting from various extents of restriction of rearward movements of the studs 214 and 222 by the bail rods 215 and 223 when their rearward movements are restricted by various ones of the latch slides 275, 284, 287, 288, 302, 329 and 330 of the keyboards in dependence upon the condition of the keys or bars in their respective key-rows at the time the shaft 139 rocks clockwise and the arms 230 and 234 release the arms 229 and 233. The normal positions of the studs 222, 212 and 214 are indicated in Fig. 43 at $a$, $r$ and $e$, respectively.

Any key 255 or 256 which is in a partially depressed position such that the crossbar 272 in its stem is behind the rearward nose of the respective latch hook 278 or 285 will hold its latch slide 275, 284, 287 or 288 in a forward position such as shown in Fig. 31 and the forwardly held latch slide will stop the bail rod 223 after a very limited rearward movement. When the crossbar 272 of the stem of a key 255 or 256 is squarely behind the nose of its latch hook 278 or 285 as shown in Fig. 31, the latch slide bearing that latch hook will so limit rearward movement of the bail rod 223 that the stud 222 is stopped at the position $b$ of Fig. 43. Similarly, if any key or bar of the key-rows 17, 18 and 19, other than the main motor bar 291, the error key 325 or the repeat key 319, is in a partially depressed position with the crossbar 272 in its stem behind the nose of its latch hook, than the latch slide 302, 329 or 330 bearing such latch hook, will be held forwardly and the rearward movement of the bail rod 215 will be greatly limited so as to stop the stud 214 after a very short rearward movement, such as in the position $f$ of Fig. 43 in case the crossbar 272 of the stem of a partially depressed non-add or add key is squarely behind the nose of its latch hook. When the repeat key 319 is partially depressed, the crossbar 272 in its stem prevents any substantial rearward movement of the latch slide 329 but the lug 352 of that slide, being held in substantially its normal position, so limits rearward movement of the bail rod 215 that the stud 214 is arrested in the position $g$ of Fig. 43. In any such instance in which the rearwardly moving stud 214 is arrested at or forwardly of the position $g$ or the rearwardly moving stud 222 is arrested at or forwardly of the position $b$, the stud 212 is arrested at a position substantially forwardly of the position $s$ even if the other one of the studs 214 or 222 has moved to its rearmost position $k$ or $d$, respectively. If the error key 325 is fully or partially depressed, even to a comparatively slight extent, the notch 337 in its stem is carried out of alignment with the projection 338 so that forward movement of the latter and of the slide 339 and clockwise movement of the lever 341 are so limited as also to arrest rearward movement of the stud 212 at a point somewhat forwardly of the position $s$. Whenever the stud 212 is arrested forwardly of the position $s$, the correspondingly restricted clockwise movement of the arm 209, shaft 194, arm 192 and lug 196 is insufficient to close the motor switch or couple the machine drive clutch and a machine cycle is not initiated.

If amount keys 255 are in fully depressed position as the bail rod 223 and latch slides 275 move rearwardly, the cross bars 272 in the stems of the depressed keys 255 will be engaged by the forward edges of the notches under the corresponding latch hooks 278 when the latch slides 275 bearing those hooks reach positions where they, through their lugs 290 and the bail rod 223, will arrest the stud 222 in the position c. If any one of the total and subtotal keys 315, 316, 321 and 322 is depressed, the crossbar 272 in its stem will be engaged by the forward edge of the notch under the respective latch hook 334 and will arrest the rearwardly moving latch slide 329 or 330 in a position such that the stud 214 will be stopped at the position h. If the studs 222 and 214 are both stopped at the positions c and h, respectively, the stud 212 is stopped at a position substantially forwardly of the position s and a machine cycle is not initiated. Thus, a machine cycle cannot be initiated when both a total or subtotal key and one or more amount keys are in depressed position. That, however, does not prevent a machine cycle from being initiated either manually or automatically when the machine, as hereinafter explained, is automatically conditioned for total-taking or subtotal-taking while amount keys are in depressed position.

In rows of keys 255 or 256 in which no key is in depressed position at the time the arms 234 release the arms 239, the latch slides 275, 284, 287 and 288 are permitted to be moved by their spring 279 to their rearward limits where they are stopped by the rods 274 and where they do not cause arrest of the stud 222 at any position forwardly of the position d. Fully depressed keys 256 of the key-rows 13, 14—15 and 16, because of the forward extent of the notches under the latch hooks 285, also do not limit rearward movement of the latch slides 284 or 288 and so do not limit rearward movement of the stud 222. Because of the forward extent of the notches under the latch hooks 303 on the latch slide 302, the latter can be moved by its spring 279, when the arm 236 releases the arm 229, to the rearward limit provided by the rods 274, as well when one of the small motor bars 292, 293 or 294 is fully depressed as when none of those small motor bars is depressed.

In the key-rows 17 and 18 in which no key or bar is depressed when the arm 230 releases the arm 229, the latch slides 329 and 330 are also permitted to move rearwardly until stopped by the rods 331 in such positions that the stud 214, if not otherwise restricted, is arrested only when it has moved rearwardly to the position k. Because of the forward extent of the notches under the latch hooks 285 for the add keys 320 and 326 and under the latch hooks 303 for the non-add keys 317 and 323 and subtract bars 318 and 324, each of those keys and bars when fully depressed also permits full rearward movement of its latch slide 329 or 330 to the limit provided by the rods 331.

If either of the studs 214 and 222 moves to its rearmost position k or d and the other of said stud moves rearwardly at least as far as its position h or c, the stud 212 moves rearwardly to one of its position s or t, and in either case the shaft 194, arm 192 and lug 196 are moved clockwise far enough to close the motor switch and couple the machine drive clutch as previously described to start a machine cycle.

Thus, full depression of any of the "live" keys and bars 291, 292, 293, 294, 315, 316, 318, 321, 322 and 324 will initiate a machine cycle, if that is not prevented by any of the various interlock devices of the machine as described in my prior applications Serial Nos. 85,971 and 174,696, except when one or more keys or bars, excluding the main motor bar 291, is only partially depressed, or when both a total or subtotal key and one or more amount keys 255 is depressed, or when the error key 325 is partially or fully depressed.

*Locking of keys and bars before and during each machine cycle*

As the slide 339 moves forwardly and all of the latch slides 275, 284, 287, 288, 302, 329 and 330 move rearwardly sufficiently to permit the stud 212, the arm 209, the shaft 194, the arm 192 and the lug 196 to move sufficiently to initiate a machine cycle, the slide 339 moves its lug 338 into the notch 337 of the stem of the error key 325 to lock that key in its normal position and the flat portions of the upper edges of the latch hooks 278, 285, 303, 333 and 334 move rearwardly under the crossbars 272 of the stems of all of the other keys and bars except the main motor bar 291. All of the keys and bars of the keyboard, excepting only the main motor bar 291, are then locked against depression or return and remain so locked until they are released automatically in the course of the machine cycle as will be explained hereinafter.

*Release of keyboard by depression of error key*

As has just previously been explained, the forward movement of the slide 339 and its projection 338 to lock the error key 325 against depression is effected only by the stud 212 when it moves rearwardly sufficiently to permit a machine cycle to be initiated. Thus, if depression of a total or subtotal key 315, 316, 321 or 322 fails to initiate a machine cycle because of one or more amount keys also being in depressed position, the error key 325 is not locked against depression, but the entire keyboard with exceptions of the main motor bar 291 and the error key 325 is locked and remains locked until the error key 325 is depressed to release the depressed keys. Also, if depression of a "live" key or bar fails to initiate a machine cycle because of any key or bar being in a partially depressed position, the entire keyboard is locked excepting the error key, the main motor bar and the other keys or bars in the same row as the partially depressed key or bar. In such circumstances the error key can be depressed to release the depressed keys and/or bars after which the desired keys and/or bars can be depressed. The condition preventing the cycling of the machine may also be corrected by completing the depression of the partially depressed key or bar unless both a total or subtotal key and an amount key are then in depressed condition.

At their forward ends, each of the latch plates 275, 284, 287 and 288 for the key-rows 1 to 11, 13, 14—15 and 16 has a hook portion 400 (Figs. 17, 18, 22 to 25, 44 and 45) which projects downwardly in front of the upper edge of a flange or blade 401 (Figs. 18, 24 and 44) extending upwardly from a rock shaft 402 journalled in the side plates 27 and 28 of the machine frame. A slide 403 (Fig. 18) is laterally movably mounted on the forward face of the blade 401 by headed, shouldered screws 404 passing through laterally elongated slots in the slide 403. A tension spring 405 connected at its left end to an ear of the slide 403 and at its rightward end to a stud secured in the blade 401 normally holds the slide at the rightward limit of its lateral movement where projectors 406 extending upwardly from the upper edge of the slide 403 are immediately behind the downwardly directed hook portions 490 on the forward ends of the key latch slides 275 of the key-rows 1 to 11.

A second slide 407 (Figs. 18, 19 and 20) is laterally slidably mounted on the leftward portion of the blade 401 by means of headed studs 408 passing through laterally elongated slots in the slide 407 and secured in the blade 401. A tension spring 409 is connected at its rightward end to a stud secured in the blade 401 and at its leftward end to an upward arm of a detent lever 410 pivotally supported on a shouldered headed screw 411 threaded into the blade 401. The spring 409 urges the detent lever 410 clockwise so that the upwardly turned pointed end of a leftward arm of the detent lever is pressed against a lower edge of the slide 407 in which three notches are formed so that the detent can yieldingly hold the slide 407 in any one of three laterally adjusted positions. In the upper edge of the slide 407 are two wide notches 412 leaving three upward projections. When the slide 407 is in its leftward position as shown in Fig. 18, the leftward one of its upward projections is behind the downward hook portion 490 of the latch slide 284 for the key-row 16, its middle upward projection is behind the downward hook portions 490 of the latch slides 287 and 288 for the key-row 14—15, and the rightward one of its upward projections is behind the downward hook portion 490 of the latch slide 287 for the front three keys 256 of the key-row 13.

The shaft 402 and blade 401 are urged clockwise both by a tension spring 413 (Fig. 17) connected between the upper portion of the righthand edge of the blade 401 and a stud 414 secured in the frame side plate 27, and by a tension spring 415 (Fig. 46), the upper end of which is connected to a rearward arm of a four-armed lever 416 secured on a hub pinned on a right-hand end of the shaft 402. An arm 417 (Figs. 17, 18 and 45) is secured to the left-hand end of the shaft 402 and carries a stud 418 engageable by a lug 419 on a lever 420 which is pivoted on a stud 421 secured in the left-hand side plate 28 of the machine. A tension spring 422 anchored at its rearward end on a stud secured in the side plate 28 and connected at its forward end to a rightwardly extending portion of a stud 423 secured in the lever 420, urges the lever 420 clockwise to the position where its upper end bears against the end of the shaft 402. The spring 422 is strong enough to overcome the tensions of the springs 413 and 415 so that the arm 420 normally bears against the left end of the shaft 402 and, by its engagement with the stud 418, normally yieldingly holds the upper edge of the blade 401 in a position, considerably forward of the position to which it would otherwise be moved by the springs 413 and 415, such that there is normally only a slight clearance between the forward faces of the projections 406 and the rearward edges of the hooks 400 of the latch plates 275, between the forward face of the blade 401 and the rear edge of the hook 490 of the latch plate 288 for the rear nine keys of the key-row 13, and between the forward faces of the upward projections of the slide 407 and the rear edges of the hooks 490 of the remaining latch plates 284, 287 and 288 of the key-rows 13, 14—15 and 16.

The stem 327 of the error key 325 overlies a lug 424 (Fig. 29) on the rearward portion of a member 425 which is pivoted on a shoulder portion of the screw 260 which secures the front lug 262 of the second spacing plate 259 from the right side of the keyboard to side frame member 27. The member 425 is urged counterclockwise by a spring 426 connected between a stud in the lower forward portion of the member 425 and a stud 461 described hereinafter. A pawl 428 is pivoted on a stud 429 secured in the member 425 below its supporting screw 260. The forward end of the pawl 428 extends under a lateral lug 430 on a front upward arm of the four-armed lever 416. Near its forward end, the pawl 428 has a shoulder 431 which is slightly rearward of the lug 430 while the parts are in their normal positions. A spring 432 connected between the member 425 and a lug on the pawl 428 urges the latter clockwise and normally holds its upper edge engaged with a lug 433 on the member 425 which normally positions the shoulder 431 somewhat below the lug 430. Upon depression of the error key 325 prior to depression of any "live" key or motor bar, the member 425 and pawl 428 are rocked clockwise about the screw 260 until, after a very short movement, the shoulder 431 on the pawl 428 is raised to a position immediately behind the lug 430, after which the further depression of the key 325 causes the pawl 428 to be moved forwardly to rock the lever 416 and the shaft 402 and its blade 401 counterclockwise. If the slide 403 is in its rightward position and the slide 407 is in its most leftward position (both as shown in Fig. 18) when the blade 401 is thus rocked counterclockwise, all of the latch slides 275, 284, 287 and 288 are pulled forwardly to disengage the latch hooks 278 and 285 from the crossbars 272 in the stems of all depressed keys 255 and 256 which, thereupon, are restored to their normal positions by their springs 266.

Depression of the error key 325 also effects the release of any depressed small motor bar 292, 293 or 294 and of any depressed key or bar in the key-rows 17 and 18, excluding the repeat key 319. A stud 434 (Fig. 29) passing through a slot in the member 425 below the supporting screw 260 is secured in the forward end of a link 435 having, intermediate its ends, a guide slot 436 through which extends a headed and shouldered screw stud 437 secured in the side frame plate 27. The rear end of the link 435 carries a stud 438 (see also Fig. 16) which extends leftward through a slot in the left side arm of the bail 217. Thus, the member 425, when rocked by depression of the error key 325, pulls the link 435 and the stud 438, the yoke 217 and rod 215 forward so that the rod 215 pushes the two latch slides 329 and 330 forward far enough to release any depressed keys or bars in the key-rows 17 and 18, excepting the repeat key 319, for restoration by their spring 266. The rod 215 also pulls the link 369 (Fig. 28) and its stud 368 forwardly and the stud 368 acting on the step 370, moves the link 356, the stud 354 and the latch slide 302 forwardly far enough to release any depressed small motor bar 292, 293 or 294 for restoration by its spring 266.

When any small motor bar or any of the "live" keys or bars of the key-rows 17, 18 or 19 is depressed but the initiation of a machine cycle is blocked because of the improper conditioning of the keyboard, the shaft 139 is rocked to release the bail 217, arms 225 and 226, the shaft 218 and rods 223 and 215. Depression of the error key 325 restores the bail 217 and rod 215 as explained above. However, the rearward movement of the bail rod 223, the latch slides 275, and blade 401 when a "live" key or motor bar is depressed, moves the lug 430 rearwardly of the front edge of the shoulder 431 so that the pawl 428 cannot rock the blade 401 when the error key is depressed. Instead, when the member 425 is rocked by depression of the error key, a forward projection on the member 425 below the lug 433 acts on a roller stud 439 carried by the rearward arm of the four-armed lever 416 and rocks the blade 401 to release depressed keys 255 and 256.

Forward movement of the latch slides 275, 284, 287 and 288 by the depression of the error key 325 is not of sufficient extent to restore the rod 223, shaft 218 and arms 233 to normal position. Unless the shaft 218 and arms 233 are also restored to permit the shaft 139 and arms 230 and 234 to restore and relatch the arms 233, the rod 223, bail 217 and rod 215 in normal positions, the bail 217 and rod 215 as well as the rod 223 would, as the error key returns to normal, move rearwardly sufficiently to initiate a machine cycle before the operator could condition the keyboard in the desired manner. To prevent such improper cycling of the machine, the stud 438 extends leftwardly through an opening in the frame plate 27 and behind an arm 440 (Fig. 16) fixed on a hub pinned on the shaft 218 so that, upon depression of the error key, the stud 438 rocks the arm 440, shaft 218, arms 224, 225, 226, rod 223 and arms 233 to normal to permit the shaft 139 and arms 230 and 234 to return to normal and relatch the arms 229 and 233, the shaft 218 and rods 223 and 215 in normal position. The arm 229, being a part of the bail 217, is restored with the latter.

Thus at any time while the machine is not operating and not properly conditioned for operation, the entire keyboard may be cleared or restored to normal by depression of the error key 325. Only a short forward movement of the pawl 428 by the error key is required for releasing depressed keys 255 and 256 and the distance between the center of the stud 429 and the center of the screw 269 on which the member 425 is pivoted can be and is made only a fraction of the distance from the center of that screw 269 to the point of contact of the stem of the error key 325 on the member 425. That gives the error key 325 a large advantage in leverage which results in release of depressed keys 255 and 256 by a very easy and still comparatively short depression stroke.

Whenever downward movement of the arm 192 is arrested by any of the interlock devices disclosed in my prior applications Serial Nos. 85,971 and 174,696, all of the keys and motor bars on the keyboard are locked with the two exceptions of the "Main" motor bar 291, for which there is no latching means, and the error key 325 which remains free for depression to release all of the other keys and bars. The relative positions and proportions of the arms 192 and 209, the lug 196, the stud 212, the lever 213 and its studs 214 and 222, the bail rods 215 and 223, the latch slides 275, 284, 287, 288, 302, 329 and 330 and their lugs 290 and 352, the lever 341 and its lug cooperating with the stud 212, the slide 339 and its lug 338, and the error key stem, are such that all of the latch slides 275, 284, 287, 288, 302, 329 and 330 must move far enough rearwardly to lock all of the keys and bars with which they cooperate before the arm 192 can move downward far enough to engage and be arrested by any of the above-mentioned interlock devices, at which point, however, the stud 212 has not rocked the lever 341 to position the lug 338 of the slide 339 in the notch 337 in the stem of the error key. Immediately the arm 192 passes the point at which interlock devices could arrest it, the stud 212 engages and rocks the lever 341 to move the slide 339 to position its lug 338 in the notch 337 in the stem of the error key so that, except for the "Main" motor bar 291, the keyboard is completely locked before the beginning of any machine cycle.

Automatic release of keys and bars in machine cycle

As previously explained, the cams 236 and 240, in each machine cycle, cause the rods 215 and 223 to be moved forwardly beyond their normal positions. The high portion 251 of the cam 240 is proportioned to cause the rod 215 to be moved sufficiently foward of its normal position that, acting directly on the lugs 353 of the latch slides 329 and 330 and through the link 369, stud 368, shoulder 370, link 356, lever 365 and stud 354 on the lug 352 of the latch slide 302, it moves all three of these latch slides sufficiently forward of their normal positions as to disengage the latch hooks on those slides from the crossbars 272 of any keys or bars which they hold in depressed position and thus permit any such keys and bars of the key-rows 17, 18 and 19 to be restored to normal position at about the 315° point of the machine cycle, provided that the operator does not hold them down. As the link 356 and its stud 364 are moved forwardly of their normal positions, the member 362 is rocked counterclockwise and expands the spring 365 which, when the high portion 251 of the cam 240 passes the roller 242, returns the member 362, link 356, lever 355 and stud 354 to normal as the spring 220 and 211 return the rod 215 to normal and the latch slides 302, 329 and 330 are returned to normal by their springs 279.

The forward movement of the rod 223 by the cams 236 carries it only slightly forward of its normal position so that, through its engagement with the lugs 283 of the latch slides 275, 284, 287 and 288, it can move those latch slides forward of their normal positions only slightly and insufficiently to disengage the latch hooks 278 and 285 from the crossbars 272 of depressed keys 255 and 256. The release of depressed keys 255 and 256 during each machine cycle is effected at about the 185° point by automatic operation of the shaft 402 and its blade 401.

The four-armed lever 416 has a downwardly extending arm 441 (Fig. 29) carrying roller stud 442 which projects into the path of an upwardly extending hooked portion 443 on the forward end of a slide 444 having slots by which it is supported for forward and rearward sliding movement on studs 445, 446 and 447 (Fig. 2) secured to the right-hand side of the side frame member 27. The slide 444 carries a stud 448 (Fig. 29) engaging in a notch in a lower arm of a three-armed member 449 pivoted on a stud 450 also secured on the right-hand side of the frame member 27. An upper arm of the member 449 carries a roller 451 engaging a cam disk 452 secured on the shaft 126 and a forward arm of the member 449 carries a roller 453 engaging a cam disk 454 also secured on the shaft 126. The cam disks 452 and 454 are complementarily shaped so that the slide 444 is moved rearwardly from about the 138° point to about the 193° point of each rotation of the shaft 126. At about the 174° point, the hooked portion 443 of the slide engages the roller stud 442 and rocks the lever 416, the shaft 402 and the blade 401 counterclockwise so that the blade 401 engages the hook 400 of the latch slide 288 for the rear nine keys of the key-row 13 and the upward lugs of the slides 403 and 407, if they are in the positions of Fig. 18, engage the hooks 400 of all of the other latch slides 275, 284, 287 and 288 and all those latch slides are pulled forwardly far enough to disengage their latch hooks 278 and 285 from the crossbars 272 of the stems of all depressed keys 255 and 256 to permit those keys to be restored by their springs 266 at about the 185° point in the rotation of the shaft 126.

The cams 452 and 454 partially return the slide 444 forwardly from about the 200° point to about the 205° point in the rotation of the shaft 126, permitting the blade 401 to return to its normal position at about the 205° point and permitting the latch slides 264, 287 and 288 to relatch depressed keys 255 and 256 at about the 204° point so that new entries may be set up on the keys 255 and 256 immediately thereafter without waiting until the machine cycle is completed.

*Automatic release of amount keys disabled by depressing repeat key*

The stem 327 of the repeat key 319 (Fig. 27) overlies a lug 455 on a lever 456 pivoted on the fixed stud 254. The lever 456 has a slot through which the stud 386 extends to limit the rocking of the lever 456 on the stud 254. The forward part of the lever 456 normally is held at the upper limit of its movement by a tension spring 457 connected between the stud 386 and a downward projection of the lever 456. The forward end of the lever 456 has a downwardly extending cam portion 458 with a downwardly rearwardly sloping cam edge behind a stud 459 on a slide 460 which is slotted for sliding and pivotal support on a stud 461 fixed in the right-hand side plate 27 of the machine frame. Near its forward end the slide 460 has a stud 462 which projects through a slot in the forward end of a lever 463 which is pivoted on the stud 461. A tension spring 464 connected between the stud 462 and a lug projecting upwardly from the rearward portion of the lever 463 urges the slide 460 to its normal rearward position. The lever 463 carries a roller 465 (Fig. 29) which normally bears on the upper edge of the slide 444. The upper edge of the slide 444 has a raised cam portion 466 which, as the slide 444 is moved rearwardly in each machine cycle, cams the roller 465, the lever 463 and the slide 460 clockwise about the pivot stud 461 before the hook end 443 of the slide 444 acts on the roller 442 to rock the member 416 counterclockwise and move the blade 401 and slide 403 forwardly.

When the repeat key 319 is depressed, the lever 456 is rocked counterclockwise and the slide 460 is moved forwardly on the lever 463 to position the forward end of the slide 460 under a rightward arm 467 (Fig. 18) of a bell crank 467—468 which is pivoted on a stud 469 carried by a bent-over end of a forward arm of the member 416. The upward arm 468 of the bell crank carries a headed shouldered screw passing through the right end of the slide 403. While the repeat key 319 is held depressed, it holds the forward end of the pawl 460 under the arm 467 so that when, during the machine cycle, the lever 463 and slide 460 are rocked clockwise by the section of the cam 466 on the roller 465, the bell crank 467—468 is thereby rocked counterclockwise so that the lower edge of the arm 467 is aligned with the axis of the shaft 402 and the slide 403 is moved to the left to carry all of the lugs 406 out of register with the hooked ends 409 of the latch plates 275. The upper edge of the blade 401 is formed with a series of notches 470 which are normally masked by the upward lugs 406 of the slide 403 and which are so positioned and dimensioned that, when slide 403 is held in its leftward position as explained above, the blade 40 will not engage the hooks 400 of the latch slides 275 for the keys 255 when it is rocked counterclockwise. Thus, in a machine cycle during which the repeat key 319 is held or latched in depressed position, depressed amount keys 255 are not released but remain in depressed position for the next machine cycle. During the completion of the return of the slide 444 forwardly to its normal position, the roller 465 is lowered and the slide 403 is returned to its normal position, by the spring 405 to re-align the lugs 406 with the notches 470 and the hook portions 400 of the key latch slides 275.

It should be noted that upon depression of the repeat key 319, the slide 403 does not immediately move to the repeat position but remains in its normal key releasing position at all times except when the cam 466 is under the roller 465 in a machine cycle during which the repeat key 319 is held in depressed position. Consequently, depression of the error key 325 at any time when it is free for depression is effective to release all depressed keys 255 regardless of the position of the repeat key 319.

Though the latch hook 334 for the repeat key 319 is formed so that it is not acted upon by the crossbar 272 of the repeat key stem as that key is depressed, the crossbar 272 of the repeat key stem is, however, either above or below that latch hook, 334 while the latch slide 329 for the key-row 17 is rearward of its normal position and so prevents the repeat key from being either depressed or released during the time from the beginning until very near the end of each revolution of the shaft 126.

*Selective date repeat*

While the slide 407 is in its most leftward position, it pulls the latch slides 284 and 287 and the latch slide 288 for the key-row 14—15 forwardly to release any depressed keys 256 in the key-rows 16 and 14—15 and any depresed key among the front three keys of the key-row 13 as the blade 401 is rocked counterclockwise either manually by depression of the error key 325 or automatically in each machine cycle as previously described. The hook 400 of the latch slide 288 for the rear nine keys 256 of the key-row 13 is so proportioned that it is engaged by the upper edge of the blade 401 and pulled forwardly at the same time and to the same extent that the hooks 400 of the other latch slides 275, 284, 287 and 288 are engaged and pulled forwardly by the lugs on the slides 403 and 407. Accordingly, any depressed key among the rear nine keys 256 of the key-row 13 is released automatically during a machine cycle and by depression of the error key 325, but manually settable means are provided to permit such release of depressed keys 256 in the key-rows 16 and 14—15 and among the front three keys of the key-row 13 in machine cycles to be disabled.

The key release blade 401 also has, in its upper edge, a notch 471 (Fig. 20) in line with the hook portion 400 of the key latch slide 284 for the key-row 16, a notch 472 in line with the hook portions 400 of both the key latch slides 287 and 288 of the key-row 14—15 and a notch 473 aligned with only the hook portion 400 of the key latch slide 287 which cooperates with the front three keys 256 of the key-rows 13. The notches 471, 472 and 473 are so positioned and proportioned that when the slide 407 is in its most rightward position where the point arm of the detent 410 seats in the most leftward one of the notches in the slide 407, the latter will not engage the hooks 400 of the key latch slides 284 and 287 or the hook 400 of the latch slide 288 for the key-row 14—15 and will not pull those latch slides forwardly to release any keys 256 which they hold in depressed position. When the slide 407 is in its middle position, its middle upward lug between the notches 412 is behind the hooks 400 of both the key latch slides 287 and 288 for the key-row 14—15 but the upward lugs of the slide 407 outward of the two notches 412 are laterally clear of the hooks 400 of the latch slide 284 and of the latch slide 287 for the front three keys of the key-row 13 so that depressed keys 256 in the key-row 16 and among the front three keys of the row 13 will not be released but any depressed keys in the key-row 14—15 will be released automatically in each machine cycle.

To permit the operator to move the slide 407 to its different positions, the slide is formed with an upward extension 474 slotted to engage a stud 475 in a slide 476 which is mounted on a shaft 477 longitudinally slidably supported in the two neighboring keyboard spacing plates 259. The slide 476 also has a finger-piece 478 extending upwardly through a slot in the forward edge of the upper keyboard plate 257 for manipulation by the operator. The detent 410 yieldingly holds the slide 407 in any of the three positions to which it may be manually adjusted.

Figure 24:
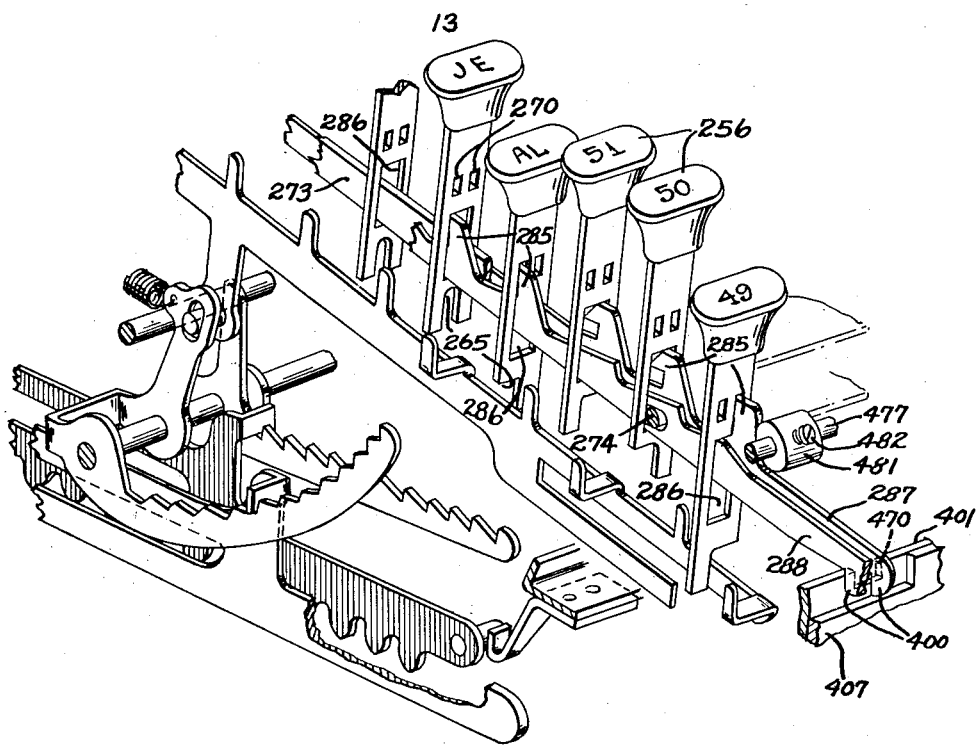
Figure 26:
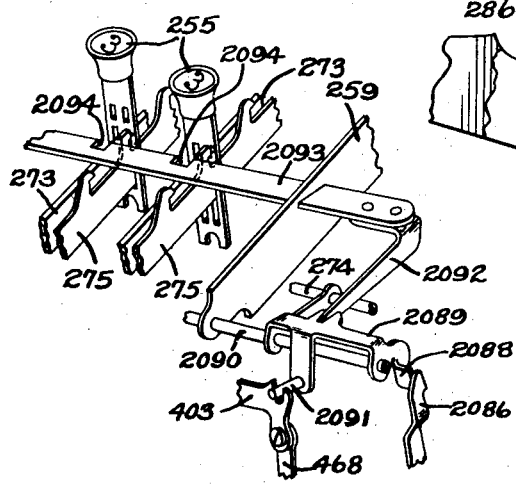
Fig. 26 is a detail of a lock means associated with the keyboard repeat means.
Figure 25:
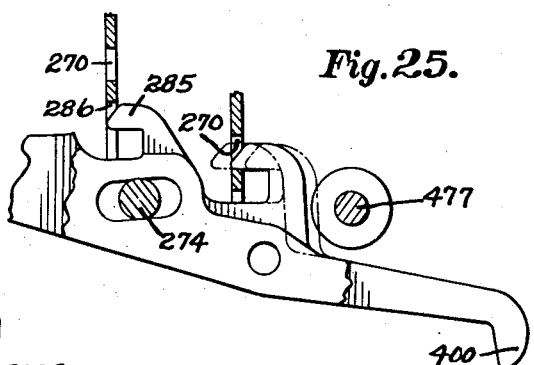
Fig. 25 is a detail perspective of a portion of Fig. 24.

To prevent accidental depression and accidental release of any keys in any group or groups of keys 256 in which depressed keys are not to be released automatically in machine cycles, three collars 479, 480 and 481 are secured on the shaft 477 by set screws 482. The collar 481 is located between the sides of the slide 476 and the set screw 482 which secures the collar 481 to the shaft 477 projects forwardly through an aperture in the front part of the slide 476 so that the shaft 477 is coupled to the slide 476 for movement by the finger-piece 478. The relative positions of the parts is such that when the finger-piece 478 is in its right-hand position (Fig. 20), the left-hand portion of the collar 479 is immediately in front of the forward edge of the foremost latch hook 285 of the latch slide 284 for the key-row 16 as shown in Fig. 22, the collar 480 is immediately in front of both the foremost latch hook 285 of the latch slide 287 and the laterally adjacent stub of the cut-off latch hook at the front of the latch slide 288 for the key-row 14—15 as shown in Fig. 30 and the right-hand portion of the collar 481 is immediately in front of the foremost latch hook 285 on the latch slide 287 for the key-row 13 as shown in Fig. 24. The stub of the cut-off front latch hook on the latch slide 288 for the key-row 13 is reduced so far that it is capable of passing under the collar 481 without interference when the last-mentioned latch slide moves forwardly of its normal position. When the finger-piece 478 is in its central position (Fig. 19), the right-hand portions of the collars 479, and 481 are immediately in front of the foremost latch hook 285 of the latch slide 284 for the key-row 16 and the front latch hook 285 of the latch slide 287 for the key-row 13, respectively, but the collar 480 does not block forward movement of either of the latch slides 287 and 288 for the key-row 14—15. When the finger-piece 478 is in its left-hand position (Fig. 18), the collars 479, 480 and 481 do not interfere with forward movement of any of the latch slides 284, 287 and 288 for the key-rows 13, 14—15 and 16. Thus, when, and only when, the finger-piece 478 and the slide 407 are in position to disable the automatic release of depressed keys of any group or groups of the keys 256 during machine cycled, the appropriate one or ones of the collars 479, 480 and 481 are also in position to prevent movement of the associated one or ones of the latch slides 284, 287 and 288 forwardly of their normal positions and thereby prevent both depression and release of any keys 256 of that group or groups.

It will be noted that manipulation of the member 478 directly shifts the slide 407. When the slide 407 is in either its middle position or its rightward position, any depressed keys 256 which will not be released automatically during a machine cycle, also cannot be released by the rocking of the blade 401 by depression of the error key 325 while the slide 407 remains in the same position.

The lower ends of the stems of the keys 255 of the orders 1 to 11 cooperate with eleven orders of a differential mechanism by which amounts entered on the keys 255 may be entered in one or more computing mechanisms or totalizers. In the machine of my applications Serial Nos. 85,971 and 174,696, the latter comprises an overflow 12th order for which differential mechanism is also provided. The lower ends of the stems of the keys 256 for the orders 13 to 16 also cooperate with the 13th to 16th orders of the differential mechanism, all sixteen orders of which control type carriers of a printing mechanism by which data entered on the keyboard and totals and subtotals drawn from the totalizers may be printed in various columns on papers carried in a traveling paper carriage. The keys of the key-rows 17 and 18, except the "Repeat" key 319 and the "Error" key 325, provide for manual control of the operations of the computing mechanisms or totalizers and control two type carriers of the printing mechanism, and the small motor bars 292, 293 and 294 provide for manual control of the lateral movements of the paper carriage in cycles of machine operation performed with said keys and bars depressed, all as disclosed in detail in my applications Serial Nos. 85,971 and 174,696.

The functions and operations of the various mechanisms of the machine are also controlled automatically by means controlled automatically in accordance with the columnar positions of the paper carriage as also disclosed in detail in my applications, Serial Nos. 85,971 and 174,696. Portions of such automatic control means are capable of disabling the automatic release of depressed keys and motor bars in selected machine cycles as will be explained following a brief general explanation of the automatic control means.

The automatic control means comprises a rectangular pan-like device 1731 (Figs. 2 and 49) which is mounted on the paper carriage for adjustment lengthwise of the latter by manual rotation of a shaft 1740 carrying a plurality of sets of column stops 1323 by which a plurality of sets of columnar positions of the carriage may be determined. The pan 1731 carries a like plurality of sets of bars 1750 to which may be secured members 1765 having downwardly extending control projections 1767. The projections 1767 may be of various lengths designated as #1 to #9, progressively shortening from #1, the longest to #8 the shortest, the #9 projection being of an intermediate length between #7 and #8.

Depending upon the position of the pan 1731 on the paper carriage and upon the columnar position of the paper carriage, the control projections 1767 of the several bars 1750 may be positioned over and in alignment with a line of sensing pins 1814 to 1827 vertically movable in a guide means, parts 1804, 1805, 1806 and 1809 of which are shown, mounted in the stationary frame of the machine. The sensing pins have pairs of lugs 1830 embracing the leftward ends of control levers 1834 to 1847. The latter have portions near their leftward ends slotted for guidance by the stationary rods 1849 or rod 1850 and have their rightward ends guided in a comb plate 1554. With an exception of no consequence to the present invention, each control lever 1834 to 1847 has intermediate its ends a depending lug carrying a cam-follower roller 1913 bearing upon a repsective one of a series of cams, two of which are designated by reference numbers 1909 and 1910 in Fig. 49, mounted between spacing collars 1912 on a shaft 1874 driven through one complete revolution in each machine cycle by means disclosed in my applications Serial Nos. 85,971 and 174,696. Tension springs 1873 anchored at their lower ends on a rod 1872 supported in the machine frame are connected at their upper ends to the respective control levers 1834 to 1847 at points between the cam-follower rollers 1913 and the comb plate 1554 whereby both ends of the control levers and the sensing pins 1814 to 1827 are normally held in lowered position. A series of bell cranks 1856 to 1869 arranged in two groups are pivotally mounted on shouldered spacing collars on rods 1547 and 1870 secured to the machine frame. The rearward ends of rearward arms of the bell cranks 1856 to 1869 underlie the rightward ends of respective ones of the control levers 1834 to 1847.

As the shaft 1874 is rotated and very early in the machine cycle, the cams thereon elevate the mid-portions of the control levers 1834 to 1847. The springs 1873 resist upward movement of the rightward ends of the control levers and so cause the leftward ends of the control levers and the sensing pins 1814 to 1827 to rise. If and when the sensing pins encounter control projections 1767 above them, they are arrested so that the rightward ends of the respective control levers are forced upwardly and rock the respective ones of the bell cranks 1856 to 1869 counterclockwise to extents which are determined by the lengths of the control projections 1767 encountered by the respective sensing pins. Such rocking of the bell cranks 1856 to 1869 is utilized to control various function performing mechanisms of the machine such as the computing mechanisms or totalizers, the printing mechanism, the paper carriage operating mechanism, etc. Certain of the bell cranks 1856 to 1869 are formed with latch points 1924 to cooperate with the latch bails 1921, 1927 or 1928, pivoted on studs 1922 and 1929 secured in the frame plate 27, to hold them in rocked position during such portion of the machine cycle for which the various controls must be maintained, as disclosed in detail in my applications Serial Nos. 85,971 and 174,696, to which reference may be had for further details of the construction and operation of the automatic control mechanism and of the various mechanisms controlled thereby. As explained in said applications, the control projections 1767 for the several controls are arranged in parallel lanes extending lengthwise of the carriage above the respective sensing pin locations in the sensing pin guide means and the trains of control mechanism extending from the sensing pins to the controlled devices are identified by numbers designating the lanes in which the projections 1767 controlling them are located. Two of the trains of control means, those for lanes 18 and 21, and the mechanism controlled by them are of particular signficance to the present invention.

*Lane 18.—Automatic repeat cycle from small motor bar*

In a machine cycle in which the "Return" bar 294 is latched in depressed position by the latch slide 302 and in which the rise of the sensing pin 1825 is limited by a #5 control project on 1767 in lane 18, the previously described means for operating the latch slide 302 to release the small motor bars 294, 293 and 292 is disabled by lifting the stud 368 (Figs. 28 and 48) clear of the of the shoulder 370. Consequently, the "Return" bar 294 is not restored in that machine cycle which, therefore, is followed automatically by another machine cycle just as though the "Return" bar 294 had been held depressed manually. That function of the lane 18 control is, however, suppressed in machine cycles in which either the "Vertical" bar 293 or the "Skip" bar 292 is in depressed position. It is without effect in machine cycles initiated by depression of the "Main" motor bar 291, which is not latched down by the latch slide 302, and in all other machine cycles in which no small motor bar is in depressed position.

A stud 2062 (Figs. 48 and 49) secured in the downward arm of the bell crank 1867 projects rightwardly through an elongated slot in the rear end of a link 2063. A tension spring 2064 connected at its rear end to the lower end of the downward arm of the bell crank 1867 and at its forward end to a downward projection of the link 2063, normally holds the stud 2062 at the forward end of the slot in the link 2063 and urges the rearward arm of the bell crank 1867 downward against a stud 1871 secured in the frame plate 27. The forward end of the link 2063 (Fig. 48) is pivotally connected to the downward arm of a lever 2065 which is pivotally mounted on a stud 2066 secured in the frame side plate 27. The upward arm of the lever 2065 has a vertically elongated slot in its upper end embracing a stud 2067 secured in the lower end of a downward arm of a bell crank 2068 which is pivotally mounted on a stud 2069 secured in the frame side plate 27. The bell crank 2068 has a forward arm which has a rightwardly turned projection 2070 and underlies a stud 2071 secured in the rear end of the link 369.

Figure 29:
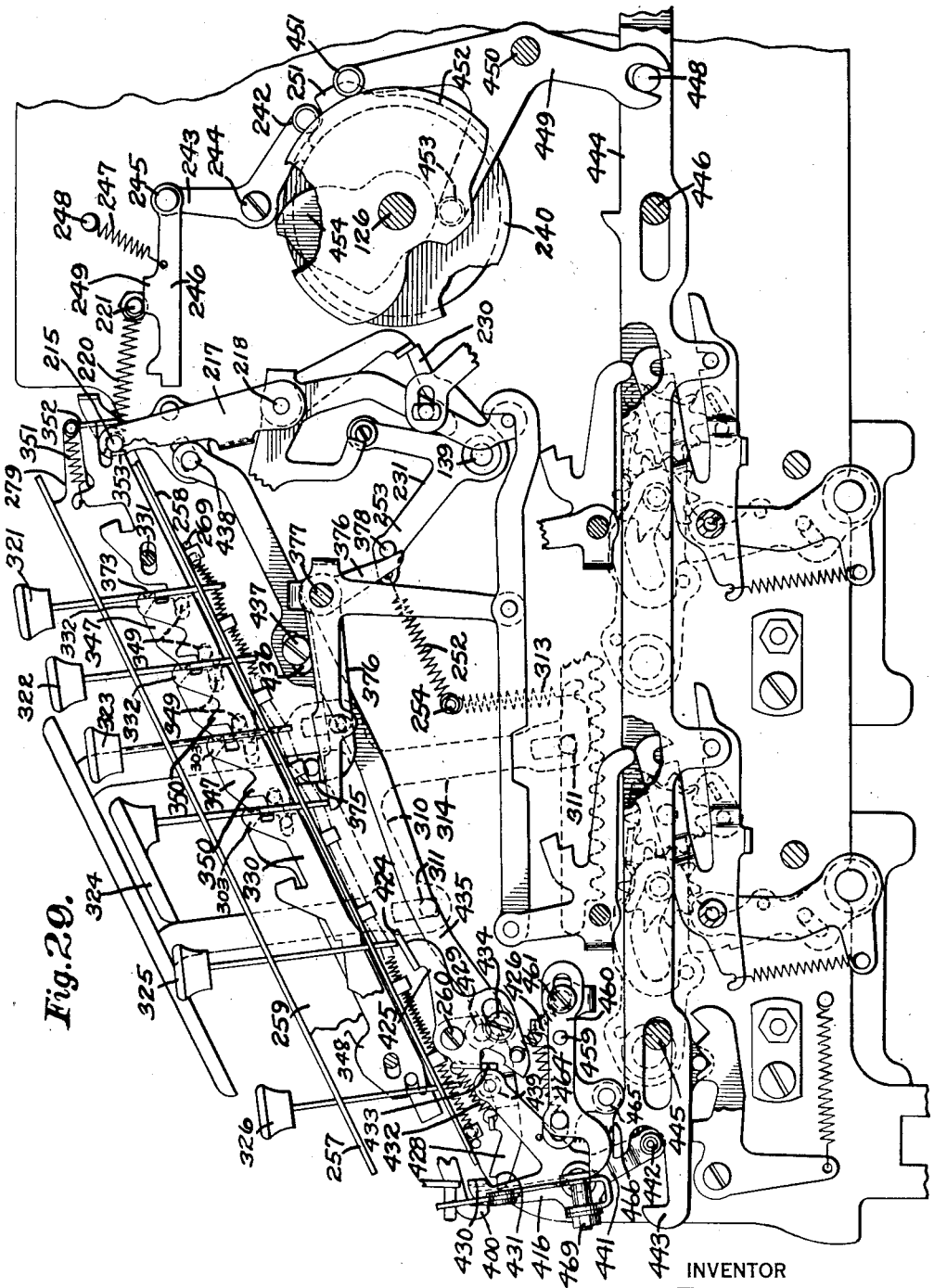
Fig. 29 is a right side elevation of the error key and keyboard controlling elements associated therewith and of certain control keys and some of the totalizer controlling elements associated therewith.

When the rise of the sensing pin 1825 is limited by a #5 control projection 1767 in lane 18 in a machine cycle initiated otherwise than by depression of either the "Skip" bar 292 or the "Vertical" bar 293, the bell crank 1867 is rocked to place a latching projection 1924 on its downward arm behind the latching flange of the bail 1928 which holds the bell crank 1867 in its rocked position until after the link 369 has been pulled forwardly by the projection 251 of the cam 240 upon the roller 242 (Fig. 29). The bell crank 1867 acts through the spring 2064, the link 2063, the lever 2065, the bell crank 2068 and the stud 2071, to lift the rear end of the link 369 sufficiently to raise the stud 368 clear of the shoulder 370 so that, in that machine cycle, the link 356 is not actuated as previously described to move the latch slide 302 to releasing position. Thus, if the "Return" bar 294 is held down by the latch slide 302, it will remain held down to initiate a further machine cycle.

Upon restoration of the latching bail 1924, the bell crank 1867, link 2063, bell crank 2068 and stud 368 are restored to normal by the springs 371 and 2064 so that the "Return" bar 294 will be restored in the next machine cycle if, in such cycles, the rise of the sensing pin 1825 is not again restricted by a #5 control projection 1767.

Figure 51:
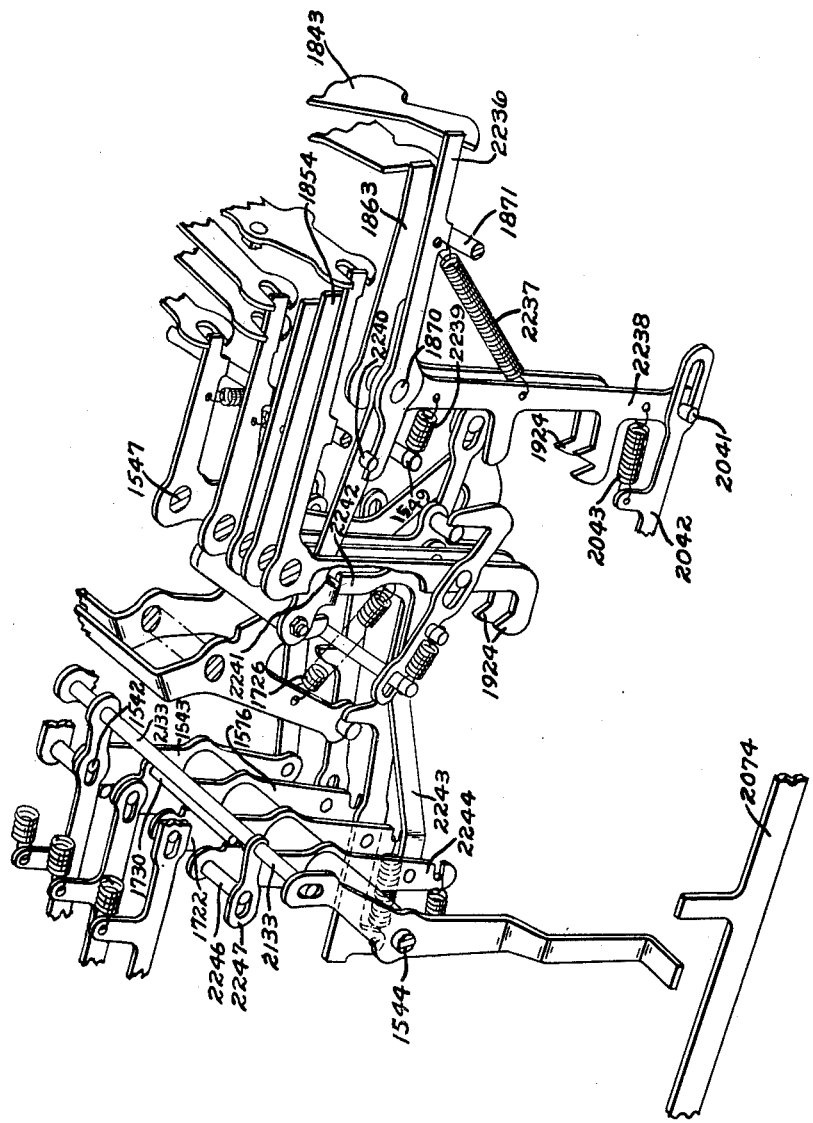
Fig. 51 shows a modified form of automatic control means associated with the automatic cycling and keyboard repeat control means and with the small motor bars.

Each of the three levers 381, 384 and 388 (Fig. 27) which are rocked counterclockwise by depression of the three small motor bars 292, 293 and 294, respectively, has an upward arm connected with the forward end of a respective one of three links 1540, 1530 and 1573, the rearward ends of which are connected to the upper arms of levers 1543, 1722 and 1576, respectively (Figs. 47, 48 and 51) which are pivoted on a fixed stud 1544 and effect certain controls of the carriage operating mechanism. Each of the links 1530 and 1540 which are thus pulled forwardly by depression of the "Vertical" bar 293 and of the "Skip" bar 292, respectively, has an upwardly and forwardly directed hook projection 2072 (Fig. 48) rearwardly and, normally, just clear of the path of the projection 2070 on the forward arm of the bell crank 2068. When either of the links 1530 or 1540 is forward because of the respective one of the "Vertical" and "Skip" bars 293 and 292 being in depressed position, its hook 2072 is in the path of the projection 2070 and prevents the bell crank 2068 from raising the stud 268 from its normal position behind the shoulder 370 regardless of the rocking of the bell crank 1867 when the rise of the sensing pin 1825 is restricted.

The lane 18 control can easily be made to render the "Skip" bar 292 effective to cause repeat cycles of the machine by merely omitting or removing the hook 2072 from the link 1540. Also, provisions to enable the latch slide 302 to latch the main motor bar 291 down will enable the lane 18 control, described above, to render the "Main" motor bar 291 effective to cause repeat cycles.

*Lane 21.—Automatic machine operation: Keyboard repeat: Locking keyboard between machine operations*

Each machine cycle, initiated otherwise than by depression of the "Skip" bar 292, the "Vertical" bar 293 or the "Return" bar 294, in which the rise of the sensing pin 1826 is limited by any #5 to #8 control projection 1767 in lane 21, is followed by an automatically initiated machine cycle. As disclosed in my applications Serial Nos. 85,971 and 174,696, if also the rise of the sensing pin 1823 is restricted by a #7 or longer control projection 1767 in lane 15, then regardless of how the machine cycle is initiated, the automatically initiated cycle will follow. In either case, if the rise of the sensing pin 1826 is restricted by a #5 control projection 1767 in lane 21, the previously-described slide 456 is rocked counterclockwise just as it would be by depression of the "Repeat" key 319, to disable the means for releasing any depressed keys 255 in the key-rows 1 to 11 and such depressed keys 255 are held depressed for the automatically initiated machine cycle so that the item which was set up on the keys 255 at the start of the first cycle can be printed and/or entered into one or both of the crossfooters during the automatically initiated machine cycle.

The downward arm of the bell crank 1868 (Figs. 47 and 49) has a latching projection 1924 to cooperate with the latching bail 1928 and carries a stud 2073 which projects rightwardly through an elongated slot in the rear end of a long link 2074. A tension spring 2075, connected at its rear end to the projection 1924 of the bell crank 1868 and anchored at its forward end on the stud 1929, urges the bell crank 1868 clockwise against the stud 1871. Another tension spring 2076, connected at its rear end to the downward arm of the bell crank 1868 and at its forward end to an upstanding ear on the link 2074, normally holds the stud 2073 at the forward end of the slot in the link 2074.

The forward end of the link 2074 (Figs. 27 and 46) has an elongated slot by which it is forwardly and rearwardly movably supported and guided upon the stud 386. Near its forward end, the link 2074 has an upward projection 2077 (Fig. 27), the forward portion of the upper edge of which normally stops the laterally turned end of a forward arm 2078 of a three-armed lever 2078, 2079, 2080, formed on the right-hand side of a yoke pivotally supported on the stud 254. The rearward arm 2079 has a shouldered rear end normally positioned slightly below the stud 378 and the downward arm 2080 is pivotally connected to the forward end of a link 2081, the rearward portion of which is supported and guided for forward and rearward movement between spacing collars on the stud 446 and on a reduced portion of one of the collars. A tension spring 2082, anchored at its rear end in an ear of the brace member 219 (Fig. 2) and connected at its forward end to a stud secured in an upward projection in the link 2081, urges the latter rearwardly and the three-armed lever 2078, 2079, 2080 counterclockwise. The rear end of the link 2081 is located forwardly of and normally above the path of a stud 2083 secured in a lever 594 which, as fully explained in my applications Serial Nos. 85,971 and 174,696, is rocked clockwise prior to printing and returned counterclockwise subsequent to printing in each machine cycle.

The downward arm of the lever 2080 is also pivotally connected with the rear end of a link 2084, the forward end of which has an elongated slot through which extends a stud 2085 secured in a rearward projection of an arm 2086 which is pivotally supported on the stud 445. The stud 2085 is normally held at the rear end of the slot in the link 2084 by a tension spring 2087 which is connected at its forward end to an ear on the rearward projection of the arm 2086, and, at its rear end, is anchored on the stud 286. The upper end of the arm 2086 is normally positioned a little distance forwardly of a rightwardly turned lug 2088 on the right side of a yoke member 2089 (see also Fig. 26) which is slidably supported on a short rod 2090 supported in the forward ends of the most rightward two of the spacing plates 259, and has, on its left end, a rearward arm apertured for guidance on the forward one of the rods 274. A downward arm of the yoke 2089 carries a stud 2091 extending forwardly through an upwardly open slot in the slide 403 which, as previously explained, is shifted leftwardly to disable the releasing means for the keys 255.

A pair of rearward projections of the yoke 2089 embrace between them the forward end of a projection 2092 on a slide 2093 which extends leftwardly between the stems of the "2" and "3" keys 255 and across the tops of all of the latch slides 275 for the key-rows 1 to 11 and is supported for rightward and leftward sliding movement in slots in each of the spacing plates 259 excepting the outermost two of said spacing plates. The slide 2093 has, in its rearward edge, eleven notches 2094, one for each of the latch slides 275, normally positioned to receive the latching projection for the "3" key 255 on each of the latch slides 275 whenever the latter is moved forwardly, as previously explained, by depression of a key 255 in its key-row or by the key releasing means.

A stud 2095 (Fig. 27) secured in the link 2074 extends rightwardly a little to the front of a downward arm 2096 of the lever 456, which, as previously explained, is rocked counterclockwise by depression of the "Repeat" key 319 to cause the releasing means for the keys 255 to be disabled.

As previously explained, whenever a machine cycle is initiated manually, that is, by depression of one of the "live" keys or motor bars, the stud 378 is moved upwardly and rearwardly to rock the lever 231 and the shaft 139 clockwise against the tension of the spring 252 whereby the arm 230 releases the arm 229, and the arms 233 release the arms 234 so that, if the machine is properly conditioned for operation, the bail rods 215 and 223 are permitted to be moved rearwardly by the springs 229 and 228 to lock the keys and bars of the key-rows 17, 18 and 19 and all of the keys 255, and the arm 209 and shaft 194 are permitted to be rocked clockwise by the spring 211 to cause the main drive clutch to be coupled and the motor switch to be closed to initiate a machine cycle.

When, in a machine cycle initiated otherwise than by depression of the "Return" bar 294, "Vertical" bar 293 or "Skip" bar 292 when no #7 or longer control projection 1767 is effective in lane 15, the rise of the sensing pin 1826 is limited by any #5 to #8 control projection 1767 in lane 21, the bell crank 1868 (Fig. 47) is rocked to pull the link 2074 rearwardly so that the projection 2077 (Fig. 27) is positioned rearwardly of the laterally bent end of the arm 2078. Thereupon, the three-armed lever 2078, 2079, 2080 is rocked counterclockwise by the spring 2082 which pulls the link 2081 rearwardly and positions the notched rearward end of the arm 2079 in latching position under and in front of the stud 378. This occurs after the stud 2083 has been moved forwardly under the rear end of the link 2081 and, therefore, does not interfere with the rearward movement of the latter. When, in the final portion of the machine cycle, while the cams 236 still hold the shaft 218 in restored position and the arm 229 is restored to normal position momentarily, the arm 2079 holds the arms 230 and 234 against returning to their normal positions to latch the arms 229 and 233 in their normal positions. Consequently, the bail rod 223 is permitted to return rearwardly to key-locking position as soon as the high portions of the cams 236 pass the rollers 238 and the bail rod 215 also is permitted to return to key-locking position as soon as the high portion 251 of the cam 240 passes the roller 242 so that the arm 209 and shaft 194 can rock clockwise to initiate a further machine cycle automatically.

Upon the return of the arm 594 and stud 2083 to normal, the rear end of the link 2081 is pulled down into the path of the stud 2083 by the spring 2082 so that, early in the automatically initiated machine cycle, the stud 2083 pushes the link 2081 forwardly to rock the three-armed lever 2078, 2079, 2080 back to normal, whereby the laterally bent end of the arm 2078 is raised clear of the projection 2077. That permits the spring 2075 to move the link 2074 forwardly to place its projection 2077 under the arm 2078, so that the three-armed lever 2078, 2079, 2080 is again latched in normal position, unless at this time the rise of the sensing pin 1826 has again been restricted by another #5 to #8 control projection 1767 in lane 21, in which case the lever 231 is again latched in position to cause another machine cycle to be initiated automatically. However, in any machine cycle in which the projection 2077 is permitted to relatch the lever 2078, 2079, 2080 in its normal position, the arm 230 of the lever 231 relatches the arm 229 and shaft 218 in their normal positions near the end of the machine cycle to prevent a further machine cycle unless and until one of the "live" keys or motor bars is depressed.

When the rise of the sensing pin 1826 is limited by a #5 control projection 1767 in lane 21, in a machine cycle initiated otherwise than by depression of the "Skip" bar 292, the "Vertical" bar 293 or the "Return" bar 294, when no #7 or longer control projection 1767 is effective in lane 15, the latching point 1924 on the downward arm of the bell crank 1868 is moved rearwardly of the latching bail 1928 and the link 2074 is pulled so far rearwardly that the stud 2095 acts on the arm 2096 to rock the lever 456 to the position to which it would be moved by depression of the repeat key 319. In that position, the bell crank 1868 is held by engagement of its latching projection 1924 behind the latching flange of the bail 1928 until after the slide 444 has completed its reciprocation and has returned to normal. As previously explained, in a machine cycle in which the lever 456 is held in that position, the slide 403 is shifted leftwardly to disable the releasing means for the keys 255 which, therefore, are not restored but remain depressed for the next machine cycle. Upon restoration of the latching bail 1928, the spring 2075 rocks the bell crank 1868 clockwise and moves the link 2074 forwardly to place the point of the latching projection 1924 of the bell crank 1868 forwardly of the latching flange of the bail 1928 so that the lever 456 and the slide 460 are permitted to be restored by their springs 457 and 464. Complete restoration of the link 2074 at that time is prevented by engagement of the projection 2077 against the rear face of the lug of the arm 2078 which is still in position to cause automatic initiation of the next machine cycle, during which, if the rise of the sensing pin 1826 is not limited by a control projection 1767 in lane 21, the parts are fully restored as previously described. In the automatically initiated machine cycle, if the rise of the sensing pin 1826 is not limited by a #5 control projection 1767, the lever 456 remains in its normal position so that the keys 255 are restored in that cycle in the manner previously described.

As the cycle preceding the automatically initiated cycle is completed, the bail rods 223 and 215 are both in restored position momentarily so that, if the operator were "riding" one or more of the keys 255 at that time, the amount set on the keyboard could be altered between the machine cycles if that were not prevented by the next described means. As the slide 403 is shifted to disable the automatic release of the keys 255, it acts through the stud 2091, to shift the yoke 2089 leftwardly so that the upper end of the arm 2086 which is pulled rearwardly into engagement with the lug 2088 when the link 2084 is pulled rearwardly, is freed to move further rearwardly to a position immediately rightward of the end of the lug 2088 whereby the yoke 2089 is held in its shifted position. As the yoke 2089 is shifted leftwardly, it moves the slide 2093 also leftwardly so that the notches 2094 are disaligned with the latching projections 278 for the "3" keys and the rear edge of slide 2093 is immediately in front of those latching projections so that the latch slides 275 are locked against forward movement and, in turn, lock all of the keys 255 against depression if they are not already in depressed position. While the slide 2093 remains in such locking position, no alteration can be made in any item set up on the keys 255.

The arm 2086 remains in its locking position to prevent restoration of the yoke 2089 and locking slide 2093 until the stud 2083, early in the next machine cycle, restores the links 2081 and 2084 to normal. Thus, in a machine cycle in which a #5 control projection 1767 in lane 21 is effective, undepressed keys 255 cannot be depressed accidentally or otherwise when and after the bail rod 223 is restored forwardly by the cams 236, as they can in other machine cycles. The keys 255 remain locked until the time of restoration of the bail rod 223 in a machine cycle in which there is no #5 control projection 1767 effective in lane 21. When the arm 2086 is restored to normal, the spring 405 (Fig. 18) restores the slide 403, yoke 2089 and locking slide 2093. This happens prior to that point in the machine cycle at which the rise of the sensing pin 1826 is limited by a #5 control projection 1767 in lane 21 or the slide 403 is moved leftward to disable the releasing means for the keys 255 when the repeat key is in depressed position.

Immediately leftward of the frame side plate 28 is an arm 2097 (Fig. 45) fixed at its upper end on a hub secured on the left end of a shaft 500 which is rocked first clockwise and then counterclockwise in each machine cycle. The lower end of the arm 2097 carries a stud 2098 projecting through an elongated slot in the rear portion of a link 2099 pivotally mounted at its forward end on the stud 423. As the shaft 500 rocks clockwise in each machine cycle, the stud 2098, reaching the forward end of the slot in the link 2099, moves the link forwardly and rocks the arm 420 counterclockwise to withdraw its lateral lug from the stud 418 on the arm 417 whereby the springs 413 (Fig. 17) and 415 (Fig. 46) rock the shaft 402 and blade 401 clockwise far enough that the lugs 406 of the slide 403 are positioned rearwardly clear of the hooks 400 of the latch slides 275 at the time at which the arm 2086 is rocked forwardly to release the member 2089. Thus, the hooks 400 of the latch slides 275, while the latter are held rearwardly by the lock slide 2093, cannot block rightward movement of the slide 403 and thereby, through the stud 2091, member 2089 and arm 2092, prevent the lock slide 2093 from moving rightward to place its upper edge behind the "3" key latch hooks 278 on the key latch slides 275.

In a machine cycle initiated by depression of either the "Skip" bar 292, the "Vertical" bar 293 or the "Return" bar 294, in which no #7 or longer control projection is effective in lane 15, the lane 21 control is ineffective. A stud 2100 (Fig. 27) positioned immediately behind the downward arms of the levers 381, 384 and 388 which, as previously explained, are rocked counterclockwise by depression of the "Skip" bar 292, the "Vertical" bar 293 and the "Return" bar 294, respectively, is secured in the upper arm of a lever 2101 which is pivotally mounted on the shaft 139. The stud 2100 is located at a greater distance from the shaft 218 than is the stud 382. The lower arm of the lever 2101 is pivotally connected with the forward end of a link 2102, the rearward end of which (Fig. 47) is connected with the forward end of a tension spring 2103, the rear end of which is anchored on the stud 1926. The rearward part of the link 2102 has an elongated slot through which projects a stud 2104 secured in a downward arm on the left side of a latching bail 2105 which is pivotally mounted on the stud 2066 and has a latching flange 2106, the forward edge of which is normally above but very slightly rearward of the rear edge of an upward projection 2107 on the link 2074. A tension spring 2108, connected at its forward end to an ear on the link 2102 and at its rear end to the downward arm of the bail 2105, normally holds the stud 2104 at the front end of the slot in the link 2102.

When either the "Skip" bar 292, the "Vertical" bar 293 or the "Return" bar 294 is depressed in a machine cycle in which the rise of the sensing pin 1823 is not restricted by a #7 or longer control projection 1767 in lane 15, the lever 2101 is rocked to pull forwardly the link 2102 which, through the spring 2108, rocks the bail 2105 to place its flange 2106 immediately behind the projection 2107 so that the link 2074 is blocked and cannot be moved rearwardly to render effective the means for causing an automatic cycle and the means for disabling the releasing means for the keys 255.

By shortening the downward arm of any of the levers 381, 384 or 388 so that it cannot act on the stud 2100, depression of the respective small motor bar 292, 293 and 294 will be disabled from rendering the lane 21 control ineffective to cause a keyboard repeat operation or automatic machine cycling regardless of the lane 15 control.

*Lane 15.—Automatically disabling the control of automatic machine cycling and keyboard repeat by small motor bars*

One function of the lane 15 control is to block the disabling effect of depressions of the "Return" and "Skip" bars 294 and 292 upon the automatic machine cycling control of lane 21 to be described hereinafter. If the rise of the sensing pin 1826 is limited by a #3 or longer control projection 1767 in lane 21 in a machine cycle in which the sensing pin 1823 encounters a #7 or longer control projection 1767 in lane 15, such machine cycle, if initiated otherwise than by depression of the "Vertical" bar 293, will be followed by an automatically initiated further cycle of operation in the machine. If the rise of the sensing pin 1823 is limited by a #8 or longer control projection 1767 in lane 21 in a machine cycle in which the sensing pin 1823 does not encounter a #7 or longer control projection 1767 in lane 15, such machine cycle, only if initiated otherwise than by depression of any of the small motor bars 292, 293 and 294, will be followed by an automatically initiated machine cycle.

The downward arm of the lane 15 bell crank 1865 (Fig. 49) has a stud 2041 secured in its lower end. The stud 2041 projects through an elongated slot in the rear end of a link 2042 and is normally held in the forward end of the slot by a tension spring 2043 connected at its rear end to the downward arm of the bell crank 1865 and at its forward end to an ear on the link 2042. The forward end of the link 2042 has a slot through which the stud 2104 also projects, so that, if the rise of the sensing pin 1823 is limited by a #7 or longer control projection 1767 in lane 15, the consequent rocking of the bell crank 1865 pulls the link 2042 rearwardly and returns the latching bail 2105 to its normal position clear of the projection 2107 on the link 2074 because the spring 2043 is substantially stronger than the spring 2108. Thus, in a machine cycle in which a #7 or longer control projection 1767 in lane 15 is effective, the lane 21 control cannot be rendered ineffective by depression of the "Skip" bar 292, the "Vertical" bar 293 or the "Return" bar 294.

It is preferable that depression of the "Vertical" bar 293 should always disable the lane 21 control from causing automatic cycling and keyboard repeat operations. For that and other purposes explained in detail in my applications Serial Nos. 85,971 and 174,696, the lane 15 control may be modified as shown in Fig. 54 wherein the previously-mentioned lane 15 bell crank 1865 is replaced by a flexible two-part lever comprising a straight lever 2236 (Fig. 45) which is pivotally supported on the stud 1870 and, at its rear end, overlies the right end of the lane 15 control lever 1843. The rearward arm of the lever 2236 is connected, through a tension spring 2237, with the downward arm of a bell crank 2238 also pivotally mounted on the stud 1870 at the left side of the lever 2236 and urged clockwise by a tension spring 2239 which is considerably lighter than the spring 2237 and is connected between the downward arm of the bell crank 2238 and a stud 1549 secured in the frame plate 27. The bell crank 2238 is similar to the bell crank 1865 except that its rearward arm is cut off short so that it is not acted upon directly by the control lever 1843, and its forward arm has secured in it a stud 2240 which is normally held against the upper edge of the forward arm of the lever 2236 by the spring 2237. The forward arm of the bell crank 2238 also has, on its lower edge, a leftwardly turned lug 2241 normally overlying the end of an upward projection 2242 on a link 2243. The link 2243 is pivotally mounted at its rear end on a stud in the downward arm of a bell crank 1854 pivoted on the stud 1547. The forward end of the link 2243 is pivotally mounted on a stud secured in the lower arm of a lever 2244 which is pivotally mounted on the stud 1544 rightward of the lever 1722 from which it is separated by a spacing collar on the stud 1544. A tension spring 2245 connected at its rear end to the lower arm of the lever 2244 and at its forward end to the stud 595 urges the lever 2244 clockwise so that a stud 2246 in the upper arm of the lever 2244 is normally positioned in the rear end of an elongated closed slot in the forward part of a short link 2247 pivoted on the rightward portion of a stud 2133 fixed in the rearward end of the link which is pulled forward by depression of the "Skip" bar. Also, the upper end portion of the lever 2244 is immediately in front of a stud 1730 extending rightwardly from the upper end portion of the lever 1576 which is rocked counterclockwise by depression of the "Return" bar.

In cycles of operation initiated by depression of the "Vertical" bar 293, the projection 2242 remains under the lug 2241 so that if the rise of the lane 15 sensing pin 1823 is restricted by a control projection 1767, the rocking of the control lever 1843 merely lifts the rear arm of the lever 2236 and tensions the spring 2237 without rocking the bell crank 2238 to disable the latching bail 2105, 2106 which the depression of the "Vertical" bar rocked to effective position to block the lane 21 control from causing an automatic machine cycle or a keyboard repeat operation.

When the "Skip" bar is depressed, the stud 2133 acts through the link 2247 and stud 2246 to rock the lever 2244 counterclockwise. When the "Return" bar is depressed, the stud 1730 rocks the lever 2244 counterclockwise. In either case, the lever 2244 moves the link 2243 rearwardly so that the projection 2242 is moved rearwardly clear of the lug 2241. Consequently, if a #5 control projection 1767 in lane 15 limits the rise of the sensing pin 1823 in the ensuing machine cycle, the lever 2236 and bell crank 2238 are rocked to pull the spring 2043 and the link 2042 rearwardly to disable the latch bail 2105, 2106 from blocking the lane 21 control from causing an automatic machine cycle or keyboard repeat operation.

I claim:

1. A calculating machine having power driving means, a plurality of groups of depressible keys, a control means movable toward an operating position to cause said power means to drive the machine through a cycle of operation but normally in a non-operating position, means to move said control means to operating position, means controlled by the keys of one of said groups to cause said moving means to act, latching means for each of said groups of keys normally in key-latching position and movable in one direction from normal position by partial depressions of their keys, and back to normal upon full depressions of their keys, said latching means being also movable in another direction to lock the keys, means to move the key-latching means to locking position, and means controlled by the last-named means to limit movement of said control means to a position short of operating position when any key-latching means is unable to move to key-locking position.

2. A calculating machine having power driving means, first and second groups of depressible keys, a control means movable toward an operating position to cause said power means to drive the machine through a cycle of operation but normally in a non-operating position, means to move said control means to operating position, manipulative means to enable said moving means, a first movable member, means controlled by keys of the first group to restrict movement of said movable member to a first position when any of those keys is in depressed position and allow movement of said movable member to a second position when none of those keys is depressed, a second movable member, means controlled by keys of the second group to restrict movement of said second movable member to a first position when any of the latter keys is depressed and allow movement of said movable member to a second position when none of the latter keys is depressed, a differential connection between said first and second movable members and said control means to limit movement of said control means to an intermediate position short of its operating position when both of said movable members are limited to their first positions and permit movement of said control means to its operating position when either of said movable members moves to its second position while the other of said movable members moves to either its first or second position.

3. A machine according to claim 2, wherein said key-controlled means have portions cooperating with portions of each of the keys controlling them when such keys are in partially depressed positions to position said key-controlled means to limit the respective movable member to a third position in which, through said differential connection, it limits said control means to an intermediate position short of its operating position when the other movable member moves to either its first or its second position.

4. A calculating machine according to claim 3 wherein the keys of each of said groups are arranged in a plurality of rows, and the means controlled by the keys of each group to restrict the respective one of the movable members is constituted by a plurality of key-latching members, one for each row of keys in the group of keys, each of said latching members having a portion in the path of movement of said movable member for the respective group of keys, each of said latching members and the keys of its key-row having cooperating portions to move said latching member to and hold it in a position to restrict movement of said movable member to said third position, at least some of the latching members for each of said key groups and at least selected keys in respective key-rows having provisions to restrict movement of such latching members to one key-locking position to limit movement of the movable member for the respective key group to said second position while such selected keys are depressed but to permit movement of said latching member to a second key-locking position to permit movement of the respective movable member to said first position when no keys of the respective key-rows are in partially depressed condition and none of such selected keys in the key-row are in depressed position.

5. A calculating machine having means to drive it through cycles of operation, depressible keys, key-latching members to latch depressed keys in depressed condition, said members being normally in latching position but movable by keys being depressed to key-releasing position and returning to latching position upon completion of depression of the keys, release means operable by said driving means in a machine cycle to move said latching members to releasing position at a point in the machine cycle, repeat control means to disable said release means in a selected machine cycle and to cause said driving means to drive said machine through a further cycle automatically following said selected cycle, and means conditioned by said repeat control means to prevent movement of said latching members to releasing position during a time starting in the latter part of said selected cycle and running into said further cycle.

6. An accounting machine having means to drive it through cycles of operation, keys depressible to set up data to be entered into the machine in cycles of operation thereof, means normally effective to latch depressed keys in depressed condition, said means being operable in one way to release depressed keys, and operable in another way to lock undepressed keys against depression, means automatically operating to place said key-latching means in locking position at the beginning of each machine cycle, releasing means normally operating at a later time in each machine cycle to operate said key-latching means to release depressed keys, control means operable to disable said releasing means in a predetermined machine cycle and to control said driving means to cause it automatically to drive the machine through a further cycle of operation, and means controlled by said control means to prevent key-releasing operation of said latching means during a time extending through the end of said predetermined cycle and into the beginning of said further cycle.

7. A calculating machine having a power driving means, a plurality of manipulative control members to cause said driving means to drive the machine through cycles of operation, a keyboard with depressible keys and means to latch depressed keys in depressed position, means normally operating in a cycle of operation of the machine to operate said latching means to release depressed keys, a carriage movable to a plurality of positions, means controlled by said carriage in accordance with its position and operating in a cycle of operation of the machine to disable said releasing means, means conditioned by at least a predetermined one of said manipulative control members to disable said carriage controlled means, and another means controlled by said carriage in accordance with its position to disable said means conditioned by said predetermined manipulative member.

8. A calculating machine having a power driving means, at least three manipulative control members to cause said driving means to drive the machine through cycles of operation, a keyboard with depressible keys and means to latch depressed keys in depressed position, means normally operating in a cycle of operation of the machine to operate said latching means to release depressed keys, a carriage movable to a plurality of positions, a first means controlled by said carriage in accordance with its position to be operated in cycles of operation of the machine initiated with said carriage in predetermined ones of said positions to disable said releasing means, means conditioned by a plurality but less than all of said manipulative control members to disable said carriage controlled means, a second means controlled by said carriage in accordance with its position to disable said means conditioned by said plurality of manipulative control member in cycles of operation of the machine initiated with said carriage in at least one of said predetermined positions, and means to prevent operation of said second carriage controlled means, said preventing means being controlled by at least one but less than all of said plurality of manipulative control members.

9. A calculating machine having a power driving means, a plurality of manipulative control members to cause said driving means to drive the machine through cycles of operation, a carriage movable to a plurality of positions, means controlled by said carriage in accordance with its position and operating in a cycle of operation of the machine to cause said driving means to drive the machine through a further cycle of operation, means conditioned by at least a predetermined one of said manipulative control members to disable said carriage controlled means, and another means controlled by said carriage in accordance with its position to disable said means conditioned by said predetermined manipulative control member.

10. A calculating machine having a power driving means, at least three manipulative control members to cause said driving means to drive the machine through cycles of operation, a carriage movable to a plurality of positions, a first means controlled by said carriage in accordance with its position to be operated in cycles of operation of the machine initiated with said carriage in predetermined ones of said positions to cause said driving means to drive the machine through a further cycle of operation, means conditioned by a plurality but less than all of said manipulative control members to disable said carriage controlled means, a second means controlled by said carriage in accordance with its position to disable said means conditioned by said plurality of manipulative control member in cycles of operation of the machine initiated with said carriage in at least one of said predetermined positions, and means to prevent operation of said second carriage controlled means, said preventing means being controlled by at least one but less than all of said plurality of manipulative control members.

11. A calculating machine having means to drive it through cycles of operation, a plurality of groups of depressible keys, a key-latching member for each group of keys, provisions on each of said key-latching members and on the keys of its group to move the latching member momentarily to key-releasing position by depression of a key in its group and thereafter to latch the depressed key in depressed position and, when movement of said latching member to releasing position is blocked, to prevent depression of undepressed keys in its group, a member shiftable to a series of positions relative to said latching members and having blocking elements so positioned thereon as, in a plurality of different positions of said series, to block movement to key releasing position of different selections of said latching members, a manipulative means to shift said shiftable member to the several positions of said series, a member movable by said driving means in a cycle of operation of said machine transversely to the direction of shiftability of said shiftable member, and a further member mounted on said movable member for movement therewith and connected with said shiftable member for shifting with the latter relatively to said movable member, said further member having elements so positioned thereon in relation to the blocking elements on said first shiftable member as, in each of said positions of the latter as said movable member is moved by said driving means, to move to key-releasing position each latching member not blocked by a blocking element.

THOMAS M. BUTLER.

References Cited in the file of this patent

UNITED STATES PATENTS

| Number | Name | Date |
|---|---|---|
| 1,351,082 | Wing | Aug. 31, 1920 |
| 1,877,802 | Britten, Jr. | Sept. 20, 1932 |
| 1,913,510 | Racz | June 13, 1933 |
| 1,914,401 | Butler | June 20, 1933 |
| 2,059,652 | Pott | Nov. 3, 1936 |
| 2,088,434 | Racz | July 27, 1937 |
| 2,088,662 | Ott et al., | Aug. 3, 1937 |
| 2,263,033 | Fettig | Nov. 18, 1941 |
| 2,307,245 | Sundstrand | Jan. 5, 1943 |
| 2,344,377 | Vigborg | Mar. 14, 1944 |
| 2,346,834 | Friden et al. | Apr. 18, 1944 |
| 2,350,979 | Avery et al. | June 13, 1944 |
| 2,390,041 | Avery et al. | Dec. 4, 1945 |
| 2,391,089 | Friden et al. | Dec. 18, 1945 |
| 2,470,300 | Gang | May 17, 1949 |
| 2,526,734 | Davidson et al. | Oct. 24, 1950 |